United States Patent [19]
Kuwashima et al.

[11] Patent Number: 5,764,786
[45] Date of Patent: Jun. 9, 1998

[54] MOVING OBJECT MEASUREMENT DEVICE EMPLOYING A THREE-DIMENSIONAL ANALYSIS TO OBTAIN CHARACTERISTICS OF THE MOVING OBJECT

[76] Inventors: Shigesumi Kuwashima, 2-26-2-406 Chidori, Ohta-Ku, Tokyo 152; Masao Shimizu, 3-29-503 Kosugi-cho, Nakabara-ku, Kawasaki, Kanagawa 211; Toru Nakamura, 838-39 Ishibayashi, Nishinasuno-cho, Nasu-gun; Dairoku Sekiguchi, 2-23-3 Kakinokizaka, Meguro-ku, Tokyo 152, all of Japan

[21] Appl. No.: 381,864

[22] PCT Filed: Jun. 10, 1994

[86] PCT No.: PCT/JP94/00934

§ 371 Date: Jun. 27, 1995

§ 102(e) Date: Jun. 27, 1995

[87] PCT Pub. No.: WO94/29670

PCT Pub. Date: Dec. 22, 1994

[30] Foreign Application Priority Data

| Jun. 10, 1993 | [JP] | Japan | 5-138805 |
| Jun. 10, 1993 | [JP] | Japan | 5-139629 |
| Oct. 19, 1993 | [JP] | Japan | 5-261223 |

[51] Int. Cl.$^6$ ............ G06K 9/00; G06K 9/36; G06K 9/32; G03B 13/18

[52] U.S. Cl. .......... 382/107; 382/285; 382/291; 354/402

[58] Field of Search .............. 382/107, 285, 382/291, 302; 354/402

[56] References Cited

U.S. PATENT DOCUMENTS

| 5,055,926 | 10/1991 | Christensen et al. | 382/107 |
| 5,243,418 | 9/1993 | Kuno et al. | 382/107 |
| 5,422,700 | 6/1995 | Suda et al. | 354/402 |
| 5,515,448 | 5/1996 | Nishitani | 382/107 |

FOREIGN PATENT DOCUMENTS

| 50-148024 | 11/1975 | Japan | H04N 5/24 |
| 57-201914 | 12/1982 | Japan | G05D 3/00 |
| 61-45910 | 3/1986 | Japan | G01B 11/00 |
| 63-261102 | 10/1988 | Japan | G01B 11/00 |
| 1-263703 | 10/1989 | Japan | G05D 3/12 |
| 2-140073 | 5/1990 | Japan | H04N 5/232 |
| 4-1473 | 1/1992 | Japan | G06F 15/70 |
| 4-95806 | 3/1992 | Japan | G01B 11/00 |
| 4-117077 | 4/1992 | Japan | H04N 5/232 |
| 4-184577 | 7/1992 | Japan | G06F 15/70 |
| 4-329790 | 11/1992 | Japan | G06F 15/70 |

*Primary Examiner*—Andrew W. Johns
*Assistant Examiner*—Monica S. Davis
*Attorney, Agent, or Firm*—Cushman Darby & Cushman IP Group of Pillsbury Madison & Sutro LLP

[57] ABSTRACT

The present invention defines the area where the targeted moving object can move in the three-dimensional real spatial coordinate system, then maps it to the two-dimensional area corresponding to the capturing method and the capturing range of the capturing device, and by limiting the image processing for obtaining the coordinate to that area, obtains the coordinate of the moving object in the three-dimensional real space rapidly by using the signal which is capturing the moving object. Furthermore, the present invention is able to control the capturing direction and the capturing range which correspond to the movement of the capturing target, to overlap the image signal with the data which is always changing by the capturing condition and the movement of the measurement data, to improve the detection precision, and to track automatically and smoothly.

38 Claims, 34 Drawing Sheets

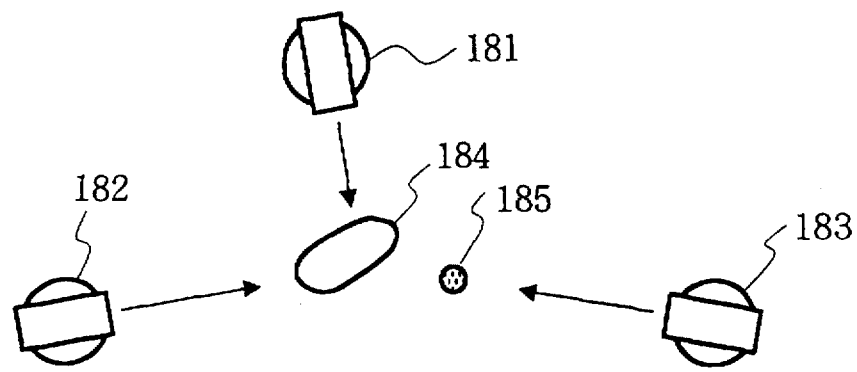
Fig. 29
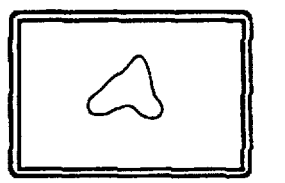 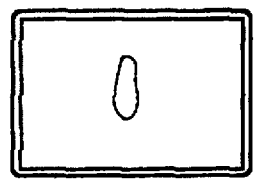 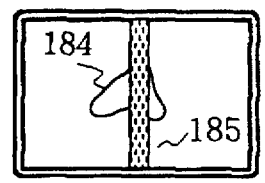
Fig. 30a     Fig. 30b     Fig. 30c
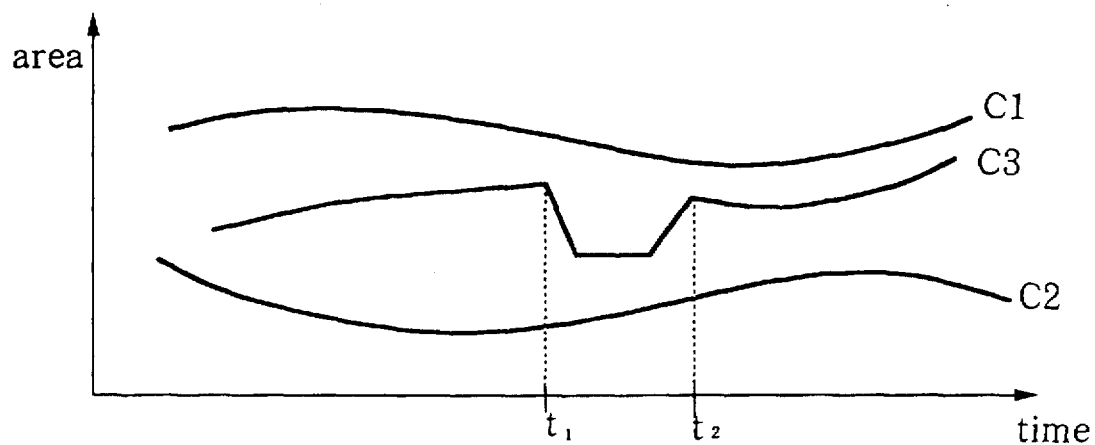
Fig. 31

Record the image with the three-dimensional location information

MOVING OBJECT MEASUREMENT DEVICE EMPLOYING A THREE-DIMENSIONAL ANALYSIS TO OBTAIN CHARACTERISTICS OF THE MOVING OBJECT

RELATED APPLICATIONS

This application is a National Phase application of PCT Application No. JP 94/00934 filed Jun. 10, 1994.

BACKGROUND OF THE INVENTION

1. Field of the Invention

The present invention is used for measuring moving objects. Especially, it is related to the component for quickly calculating the coordinate of the captured moving object.

2. Description of the Related Art

As a means to measure characteristics of moving objects, images of the moving objects have been captured and processed as an image signal. In this way, moving objects have to be always captured within a screen. Therefore, the following methods have been employed.

(1) When the moving object moves in a wide range, the object is measured by placing the moving object in the angle of view of the capturing device using a wide angle lens.

(2) The moving object is measured while placing the moving object in the angle of view of the capturing device by restricting the movement of the moving object.

(3) Putting the capturing device on a universal head equipped with an angle-encoder, tracking the moving object while moving the universal head manually, and calculating the coordinate of the moving object for every frame by digitizing, etc. using the recorded images and the angles of the universal head.

Also, the characteristics of the moving object have been obtained by measuring the two-dimensional coordinate of the moving object simultaneously using two cameras, and calculating the three-dimensional coordinate of the moving object by using the two two-dimensional data.

However, in method (1), the photographed image of the moving object itself is too small when a wide angle lens is used. Therefore, it is difficult to separate the moving object and the background. Also, because the image processing device, which calculates the geometric center of gravity (centroid) by inputting images, processes images in the unit of pixels; it had not been possible to measure the small movement of the moving objects.

In method (2), the measurable targets are limited because the moving range of the moving objects is limited.

These problems also arise when two cameras are used simultaneously. Moreover, when a wide angle lens is used, the precision of the three-dimensional coordinate measurement of the moving objects is lowered. Therefore, these measurement methods are used only in the laboratory. Moreover, the image processing depends on the measurement of the two-dimensional coordinates and does not utilize the characteristics of the movement of the moving objects in the three-dimensional measurement space. Therefore, it sometimes outputs invalid readings as a result of noise included in the image or the noise produced when separating the moving objects from the background.

When measuring the motion or actions of athletes outdoors, or in a stadium, method (3) can be used. However, a normal image signal, one frame corresponds to 1/60 second, therefore, for example, it is necessary to digitize the image of 432000 frames in order to investigate the record for two hours, and 600 processing hours are required, assuming that it takes 5 seconds to digitize one frame.

The present invention solves these problems and provides a measurement device which can capture the moving objects without using wide angle lenses even if the moving objects move in a wide range, and rapidly calculate the coordinate of the captured moving objects.

SUMMARY OF THE INVENTION

According to the first point of view of the present invention, the moving object measurement device includes one or more combinations of capturing an image of means to capture the moving objects, a driving means to set the capturing direction and the capturing range for the capturing means, an image processing means to calculate the location in the screen of the moving objects included in the image signal obtained by the capturing means, and a location calculation means to calculate the coordinate in the real space of the moving objects based on the information of the location obtained by the image processing means and the capturing direction and the capturing range of the capturing means when obtaining the image signal. The moving object measurement device also includes a three-dimensional area setting means to set the area where the targeting moving objects can move, an area mapping means to map the area in the three-dimensional real space coordinate system on the two-dimensional area corresponding to the capturing direction and the capturing range of the capturing means, and a two-dimensional area setting means to set the mapped two-dimensional area to the corresponding image processing means, wherein the image processing means includes an area limiting means to limit the targeting area of the calculation to the defined two-dimensional area by the two-dimensional area setting means.

A three-dimensional vector setting means sets the moving velocity vector of the targeting moving objects in the three-dimensional real space coordinate system. A vector mapping means maps the moving velocity vector in the three-dimensional real space coordinate system on the two-dimensional moving velocity vector corresponding to the capturing direction and the capturing area of the capturing means. A vector setting means sets the captured two-dimensional moving velocity vector for each corresponding capturing means, wherein the image processing means includes a means to detect the change of the location of the moving objects of the screen of some frames defined beforehand and of the current screen in the two-dimensional area limited by the area limiting means, and can provide a means to start up the location calculation means on the condition that the detected change of the location is in the area defined beforehand for the two-dimensional moving velocity vector defined by the vector setting means.

The capturing means includes the universal head which is rotatable around at least one axis and the capturing device fixed on the universal head, wherein the driving means includes the angle setting means to set the rotation angle around each axis of the universal head and a zoom lens attached on the capturing device.

When the precision of the zoom lens and the angle setting means are high enough so that there is almost no difference between the defined objective value and the actual value, it is possible to use the objective value itself for the data of the capturing direction and the capturing area of the capturing means. However, in practice, it is better to use the actual value for the data of the capturing direction and the capturing area of the capturing means by feedback control which reduces the difference between the actual value and the objective value. That is, the angle setting means must include a motor which rotates the universal head on each at least one axis, an angle encoder which detects the actual rotation angle, and an angle controlling means to control the motor for reducing the difference between the detected angle and the objective bearing angle defined by the upper-device, and the zoom lens must include a zoom driving motor to define the zooming position, a zoom encoder to detect the actual zooming position, and a zoom controlling means to control the zoom driving motor which reduces the difference between the detected zooming position and the targeting position defined by the upper-device, and the output of the angle encoder and the output of the zoom encoder must be supplied to the position calculation means as the data on the capturing direction and the capturing area of the capturing means.

In the present invention, the coordinate of the moving object is obtained by mapping the area of the three-dimensional real space coordinate system where the targeting moving objects can move on the two-dimensional area and by limiting analysis to that area. For example, when the movement of the moving objects is partially known beforehand, such as skiing, skating, athletics, car racing, horse racing, bicycle racing, or speedboat racing, it is not necessary to measure outside of that area. Therefore, processing on such area should be omitted.

By this, it is possible to reduce the image signal which is the target for processing, and it is possible to calculate the coordinate of the moving object in real-time.

In some cases, it is possible to predict the velocity of the moving object beforehand. In such cases, defining the moving velocity vector of the moving objects in the three-dimensional real space coordinate system, mapping them on the two-dimensional moving velocity vector, and begin measuring after detecting the moving object in the defined two-dimensional area and measuring the velocity vector which satisfies a certain condition for the specified velocity vector. By this, the possibility of measuring the object other than the targeting moving objects when the object moves in the capturing area by mistake becomes small.

The present invention is suitable for the situation where multiple capturing means (e.g., TV cameras) are positioned on the movement lane of the targeting moving object, and a driving means, an image processing means, and a location calculation means are provided, and all of them are systematically managed by a common calculation device. In such a case, the calculation device systematically manages the coordinate of the moving object captured by each capturing means and the status of each capturing means, and it is possible to measure the location of the moving objects which is moving fast in a wide area effectively and precisely by the measurement data from the multiple angles and the characteristics of the movement of the moving objects which is registered beforehand. Also, it is possible to control the direction and the capturing area of the capturing means corresponding to the movement of the moving objects, to display the comparison data for the image obtained by each capturing means, to display the measurement precision, and to display other data on the capturing means.

When capturing the moving objects, in some cases, it is possible to partially predict the movement of the moving object. For example, in skiing, skating, athletics, car racing, horse racing, bicycle racing, and speedboat racing, the course on which the moving objects move is partially known, and their velocity is distributed within a certain range. In such cases, it is better to control the capturing direction and capturing area of the capturing means based on them.

One such method is to define the movement data which is predicted for the moving objects on the three-dimensional real space coordinate system, and to control the capturing direction and area based on them. In this case, it is possible to prevent from changing the capturing direction to the velocity more than the two-dimensional vector by setting the movement vector of the moving objects in the three-dimensional real space coordinate system, and mapping it on the two-dimensional vector.

As another method, it is possible to detect the location of the moving object in the image from the captured image signal, and to control the capturing direction and area based on them. When there are multiple moving objects, it is better to use the weighted averages of each location, especially geometric center of gravity.

It is also possible to control the capturing direction and the area by calculating the coordinate of the moving objects in the three-dimensional real space. For this, it is necessary to calculate the coordinate of the moving objects rapidly. In order to do such calculations, it is necessary to define an area in the three-dimensional real space coordinate system, and map it on the two-dimensional area based on the capturing direction and the area, and process the location detection in that area only.

Even if the direction and the area of the capturing means are controlled, sometimes the moving objects get out of the capturing area of the capturing means. To cope with such cases, it is necessary to measure the motion data of the captured moving object beforehand and to keep controlling based on the past motion data if the moving object get out of the capturing area when it is captured. In this case, it is desirable to predict the direction of movement of the moving object based on the past motion data, however, it is also possible to control the capturing direction to the direction defined beforehand.

It is also possible to define the shape and its motion data to compare in the three-dimensional real space coordinate system, and to map it on the two-dimensional area data based on the capturing area of the capturing means, and to overlap it on the image signal output by the capturing means. That is, not simply overlapping the past images on the current image, but overlapping the image on the actual image by obtaining the image that is as if captured with the capturing means at the present time based on the shape and the motion data to compare.

For example, when capturing the athletics, ski contest, or swimming contest, it has not been possible to compare the record with a potential record of past record holders until the record is obtained after capturing the contest to the end. When broadcasting, especially relaying this, an audience does not know the result until the contest is ended. However, in many cases, the images of the past record holder have been recorded, and not only the final times but also the halfway times have been analyzed. In such cases, it is possible to overlap the image signal output by each capturing means by generating the three-dimensional shape and the motion data of the past record holders in the three-dimensional real space coordinate system, and generating the image of the record holders by mapping the three-dimensional shape and the motion data of the record holders on the two-dimensional area for each capturing means.

In the athletics, or swimming contests, lanes are defined in advance, therefore motion data can be defined on the specific lanes. If the three-dimensional shape of the record holder is generated in detail, much calculation is needed to map from the three-dimensional to the two-dimensional. Therefore it is better to limit the shape to the minimum requirement.

By overlapping images as mentioned above, it is possible to obtain the image signal resulted from overlapping the actual athlete with the past record holder as if he is playing at the stadium according to the capturing area and the capturing direction of each camera head. An audience can watch the relay along with the data of the past record holders.

Moreover, it is possible to estimate the measurement precision in the three-dimensional real space coordinate system by positioning multiple capturing means and map them on the data of two-dimensional area according to the capturing area of the capturing means, and overlap them on the image signal outputted by the capturing means.

The precision of the three-dimensional location measurement is determined by the relative position of the moving objects and each capturing means. For example, if the three-dimensional location is measured with two capturing means, the highest measurement precision averaged for each axis direction can be obtained when the two capturing means and the moving object make an equilateral triangle. Assuming the moving object on the vertex the smaller the angle on the vertex becomes, the lower the precision of the direction of the moving object and the capturing means. That is, the if the positions of each capturing means are determined, the measurement precision of the measurement object is also determined.

It is possible to grasp the measurement precision intuitively by watching the density of three-dimensional grid by generating the data, of the measurement precision as three-dimensional shape data such as the three-dimensional grid in the three-dimensional real space coordinate system, and by displaying the precision range using the data obtained by mapping the three-dimensional shape data on the two-dimensional area for each capturing means according to its capturing area. Then it is possible to change the location of the capturing means add the capturing means in order to raise the measurement precision of the place where the moving object will move, and it is also possible to confirm the change of the measurement precision after the change or addition.

Moreover, it is also possible to overlap the capturing area of other capturing means with images. In such a case, also, the data of the capturing area of each capturing means in the three-dimensional real space is displayed by mapping on the two-dimension. When operating the measurement system or broadcasting system that uses multiple capturing means, it is necessary to monitor images output by each capturing means separately. However, it becomes difficult to do so as the number of capturing means increases. When the objective is to measure the moving objects, it is necessary to monitor all images from the capturing means to make sure that they are appropriate. It can be judged whether the moving objects are captured properly. However, it becomes difficult to judge and it is almost impossible if many capturing means are used.

Therefore, it is desirable to overlap the image signal output by each capturing means with the data which indicate the capturing area of other capturing means such as a pyramid or capturing-center-line when it is displayed. By this, it is possible to monitor the image output by the main capturing means and the capturing area and/or capturing-center-line of other capturing means output by overlapping, and it is possible to judge whether other capturing means are capturing moving objects properly. If the capturing-center-line of other capturing means is crossing on the moving object, the capturing means is properly capturing the moving object.

It is also possible to increase the reliability of the measurement data by using multiple image processing means which have different extraction level or different valid calculation area, and by monitoring the reliability of the output data. To put it concretely, calculate the multiple location data for the same moving object by using one of the following methods, and select the credible one among them:

1. Separate the moving objects from the background by using the multiple binarization thresholds for the same image;
2. By applying the valid areas that have different size for the same image, obtain the location of the moving objects in each area; and
3. Obtain the location of the moving objects from the images that are captured separately.

Not only images but also the coordinate of the three-dimensional spatial location in the real space can be measured when capturing the targeted object, then it can be recorded or output while synchronizing with images. The coordinate of the three-dimensional spatial position is measured for the three-dimensional coordinate of the targeted object itself, the three-dimensional coordinate of the captured area, or the main point of the capturing area, such as the center of it.

Calculation of the coordinate of the three-dimensional spatial location of the targeted objects should be done as follows. That is, let the focusing position of the lens of the video camera equipment the projection center O. and consider the projection plane VT that is the point of symmetry of the capturing surface of COD for the projection center O. On the projection plane VT, the image of the subject can be obtained that is reverse of the captured image on the capturing surface of CCD. Then define the vector that is from the projection center O to the subject on the projection plane VT. Then based on this vector from the projection center O. the three-dimensional spatial coordinate of the subject is calculated based on the distance and the angle to the constraint plane where the subject exists.

Also, when calculating the three-dimensional spatial coordinate of the subject, the necessary parameters, such as the coordinate transformation coefficients, and the parameters, such as the camera equipment and zoom, can be determined by capturing the reference point that is on the actual constraint plane and is on the known three-dimensional spatial coordinate while moving the zoom of the camera equipment or the universal head.

Also, when controlling the universal head or zoom lens, because the number of capturing by the camera equipment has been determined by the capturing method, sometimes it is impossible to track the movement of the targeted object when controlling the universal head or zoom lens at the interval of capturing, based on the location information of the targeted object obtained from the captured images. Therefore it is possible to control auto-tracking smoothly by predicting the location of the targeted object multiple times during the capturing interval and sending the control objective value to the driving means based on the predicted value.

Moreover, it is also possible to extract the targeted object from the background by identifying colors with the color camera equipment. Also, it is possible to adjust the diaphragm of the camera equipment by generating the illuminance distribution or the map of white-balance in the area where the targeted objects can move in advance.

Controlling the direction and the capturing area of the capturing means, overlapping other data with the image area of the capturing means, selecting the location data for enhancing the reliability of the measurement data, three-dimensional spatial calculation, auto-tracking control, extracting the targeted object by color-identification, and adjusting the diaphragm and white-balance of the capturing means can also be done independently of the above first point of view.

That is, according to the second point of view of the present invention, in the moving object measurement device providing a capturing means to capture the moving objects, and a driving means to define the capturing direction and the capturing area of the capturing means, the moving object measurement device is characterized in that it includes a motion data setting means to set the motion data predicted for the targeted moving objects on the three-dimensional real spatial coordinate system, and a drive-control means to control the driving means based on the above motion data.

The motion data setting means can include a vector setting means to set the vector of the possible moving velocity of the moving objects, and the drive-control means can include a vector mapping means to map the vector of moving velocity on the vector of two-dimensional moving velocity based on the capturing area of the capturing means, and the drive-control means to control the driving means for preventing the direction of the capturing means from changing faster than the velocity of the mapped vector of the two-dimensional moving velocity.

According to the third point of view of the present invention, in the moving object measurement device having a capturing means to capture the moving objects, a driving means to define the capturing direction and the capturing area of the capturing means, and an image processing means to calculate the location of the moving object in the image included in the image signal obtained by the capturing means, the moving object measurement device further includes a drive control means to control at least the setting of the capturing direction or the capturing area of the capturing means by the driving means based on the location in the image obtained by the image processing means. The geometrical center of gravity can be used as the location in the image.

The image processing means can include a means to calculate the weighted averages of the location of multiple moving objects in the image. According to the fourth point of view of the present invention, in the moving object measurement device providing a capturing means to capture the moving objects, a driving means to define the capturing direction and the capturing area of the capturing means, an image processing means to calculate the location of the moving object in the image included in the image signal obtained by the capturing means, and a location calculation means to calculate the coordinate in the real space of the moving object based on the information of the capturing direction and the capturing area of the capturing means when obtaining the location in the image and the image signal obtained by the above image processing means, the moving object measurement device includes a drive control means to control at least the setting of the capturing direction or the capturing area of the capturing means by the driving means based on the real space coordinate obtained by the location calculation means.

The present invention also provides a vector setting means to set the moving velocity vector that the moving objects can have, and the drive control means can include a vector mapping means to map the above moving velocity vector on the two-dimensional moving velocity vector based on the capturing area of the capturing means, and a drive-limitation means to control the driving means for preventing the direction of the capturing means from changing faster than the mapped two-dimensional moving velocity.

According to the fifth point of view of the present invention, in the moving object measurement device providing a capturing means to capture the moving objects, a driving means to define the capturing direction and the capturing area of the capturing means, and an image measurement means to measure the motion data of the moving objects included in the processed image signal obtained by the capturing means, the moving object measurement device includes a recording means to record the motion data measured with the image measurement means and a means to detect if the moving objects move out of the capturing area of the capturing means based on the motion data measured with the image measurement means, and a driving-control means that includes a means to keep controlling based on the past motion data recorded on the recording means responding to the output of the detection means.

The means to keep controlling can include a means to predict the motion direction of the moving objects based on the past motion data. Moreover, it can include a means to control the capturing direction of the capturing means to the direction defined in advance.

According to the sixth point of view of the present invention, in the moving object measurement device providing a capturing means to capture the moving objects, and a driving means to set the capturing area of the capturing means (capturing direction and the capturing range), the moving object measurement device includes a means to set the shape and its motion data to compare with the targeted moving object in the three-dimensional real space coordinate system, a means to map the shape and the motion data in the three-dimensional real space coordinate system to the data of two-dimensional area based on the capturing area of the capturing means, and a means to overlap the mapped data on the image signal output by the capturing means.

According to the seventh point of view of the present invention, in the moving object measurement device providing multiple combinations of the capturing means to capture the moving objects, a driving means to set the capturing area of the capturing means, an image processing means to calculate the location of the moving object in the image, e.g., the geometric center of gravity (centroid), included in the image signal obtained by the above capturing means, and a motion data calculation means to calculate the motion data of the moving object based on the information on the location in the image obtained by the above image processing means and the capturing area of the capturing means, the moving object measurement device also includes a precision estimation means to estimate the measurement precision of the motion data in the three-dimensional real space coordinate system obtained by the motion data calculation means based on the location of the capturing means, a precision mapping means to map the measurement precision in the above three-dimensional real space coordinate system according to each capturing area of the capturing means, and a means to overlap the precision information, which is based on the mapped measurement precision, with the image signal outputted by the corresponding capturing means.

According to the eighth point of view of the present invention, in the moving object measurement device providing the multiple capturing means where each of which capture the moving object, and a driving means to set the capturing area of the multiple capturing means separately, the moving object measurement device includes a means to overlap at least one output image signal of the capturing means with the information of the capturing area of other capturing means.

In the above composition, the overlapping means can include a means to obtain the mutual relationship of the capturing area of the multiple capturing means by obtaining the setting value by the driving means, a means to distribute the obtained mutual relationship to the corresponding capturing means, and a processing means to process the image of the output of the corresponding capturing means based on the mutual relationship distributed by the above distribution means.

According to ninth point of view of the present invention, in the moving object measurement device which provides a capturing means to capture moving object, a driving means to set the capturing direction and the capturing range of the capturing means, a image processing means to calculate the location of the moving object in the image included in the image signal obtained by the capturing means, and a location calculation mean to calculate the real space coordinate of the moving object based on the information on the capturing direction and the capturing range of the capturing means when the location and the image signal are obtained by the image processing means, the moving object measurement device includes a multiple image processing means, wherein the multiple image processing means have different binarization threshold value which separate the moving objects and the background, and the location calculation means can include a means to select the credible location data from the output of each image processing means.

The image processing means should be composed so that it is possible to output the result by calculating the geometrical center of gravity of the moving object, or centroid. To make the calculation faster, the present invention sets the valid range for detecting the moving object and calculates the geometrical center of gravity of the moving object within that range.

The capturing means should include a universal head which is rotatable around at least one axis, and a capturing device fixed on the universal head. The driving means should include an angle setting means to set the rotation angle for each axis of the universal head, and a zoom lens means attached on the capturing device.

If the precision of the angle setting means and the zoom lens means are high enough and there is almost no difference between the defined objective value and the actual value, objective value itself can be used as the information of the capturing direction and the capturing range of the capturing means. However, in practice, feedback control should be done in order to reduce the difference between the actual value and the objective value, and the actual value should be used as the information of the capturing direction and the capturing range of the capturing means. That is, the angle setting means should include a motor to rotate the universal head on at least one axis, an angle encoder to detect the actual rotation angle, and an angle control means to control the motor to reduce the difference between the detected angle and the objective azimuth angle defined by the upper device. The zoom lens means should include a zooming-drive motor to set the zooming position, a zooming-encoder to detect the actual zooming position, and a zooming control means to control the zooming drive motor to reduce the difference between the detected-zooming position and the objective position set by the upper device. The output of the angle encoder and the output of the zoom encoder should be supplied to the location calculation means as the information on the capturing direction and the capturing range of the capturing means.

According to the tenth point of view of the present invention, the moving object measurement device includes a multiple image processing means, where each of these multiple image processing means has a different valid range for detecting moving objects, and the location calculation means provides a means to select the credible output location data from the output of each said multiple image processing means, is provided.

According to the eleventh point of view of the present invention, the moving object measurement device, is characterized in that it includes multiple capturing means and multiple image processing means, where each of these multiple image processing means has a different valid range for detecting moving objects, and a means to select the credible output location data from the output of each said multiple image processing means.

According to the twelfth point of view of the present invention, the moving object measurement device includes an image processing means that obtains not only the location of the moving object on the image but also its area, and a means to judge the certainty of the location obtained by the image processing means by using the change of the area obtained by the image processing means.

According to the twelfth point of view of the present invention, in the moving object measurement device which provides a capturing means to capture the moving objects, a driving means to set the capturing direction and the capturing range of the capturing means, an image processing means to calculate the location of the moving object in the image included in the image signal obtained by the capturing means, and a location calculation means to calculate the real space coordinate of the moving object based on the information on the capturing direction and the capturing range of the capturing means when obtaining the location in the image calculated by the image processing means and its image signal, the moving object measurement device includes a location calculation means defines the projection center of the camera's lens of the capturing means, and includes a means to transform the subject of the moving object, which was captured assuming the projection center as the point symmetry, to the location on the projection plane that is in the point symmetry of the capturing device. In addition, a means to calculate the three-dimensional spatial coordinate of the targeted object based on the rotation angle of the camera and the distance from the constraint plane where the moving object exists and the vector from the projection center to the subject of the image transformed by said transformation means, is provided.

Also, the present invention can include a means to capture the reference point of which spatial location is known and fixed on the constraint plane, and calculate its spatial location coordinate by specifying the temporary variables for transformation which is necessary to calculate the location of the projection center of the image which is also the central position of the lens of the capturing means camera and the three-dimensional spatial coordinate of the moving object, and a means to obtain the projection center and the variables for transformation by capturing the reference point again while changing the projection center of the camera and the transformation variable gradually based on the calculation results.

Also, the present invention can include a means to operate multiple operation points of the driving the capturing means and obtain the value to drive of the driving means as the electronic signal, and the location calculation means obtain the relation of the obtained electronic signal of the multiple operation points and the location of the projection center which is the focus of the camera lens, and a means to obtain the relation of the location of the projection center and the value to drive, based on the above relation of the multiple operation points, and calculate the three-dimensional spatial coordinate of the targeted objects.

Also, the present invention can include a motion prediction means to predict the direction of movement of the moving object based on the obtained real spatial coordinate of the moving object, and a drive control means to control the driving means by the prediction means, wherein the motion prediction means includes a means to predict the location of the moving object for multiple times at the interval shorter than the interval of the location calculation by the location calculation means, and the drive control means includes a means to output the control objective value based on the location predicted by the driving means at the interval shorter than the interval of calculation of the location calculation means.

Also, the capturing means includes a color camera, and the image processing means includes a color extraction means to separate the moving objects of the measurement target in the captured image from the background based on colors.

Moreover, the present invention can provide a motion prediction means to predict the moving direction of the moving object based on the obtained real spatial coordinate of the moving object, and a drive control means to control the driving means by the prediction means, wherein the driving control means includes a means to obtain the distribution of illumination in the capturing range of the capturing means, or the distribution of white-balance in advance, and based on this information, adjust the diaphragm of the camera of the capturing means or white-balance by controlling the above driving means.

BRIEF DESCRIPTION OF DRAWINGS

FIG. 4a, FIG. 4b, and FIG. 4c are simplified figures of the structure of the camera head, wherein FIG. 4a is a plan view, FIG. 4b is a front view, FIG. 4c is a side view.

FIG. 17a and FIG. 17b are figures showing an example of the relation of the coordinate of the measurement target and the control of the capturing direction, wherein FIG. 17a is the coordinate of the measurement target, FIG. 17b is the direction control of the camera.

FIG. 19a and FIG. 19b are figures illustrating the case when the measurement target is lost, wherein FIG. 19a shows the location of the measurement target, FIG. 19b shows the area of the measurement target.

FIG. 25a through FIG. 25e are figures showing the example of the measurement when different binarization threshold values are specified in the same valid range for four image processing devices, wherein FIG. 25a is an input image, and from FIG. 25b to FIG. 25e are images obtained by using different binarization threshold values.

FIG. 26a to FIG. 26c are figures showing the example of the measurement when different valid range is specified for two image processing devices, wherein FIG. 26a is an input image, FIG. 26b and FIG. 26c are the examples of the measurement.

FIG. 29 is a plan view showing an example of the measurement condition.

FIG. 30a, FIG. 30b, and FIG. 30c are figures showing the example of the images obtained by three TV cameras.

FIG. 31 is a figure showing the change of area of the measurement target in the three images.

THE BEST FORM TO EMBODY THE INVENTION

Figure 1:
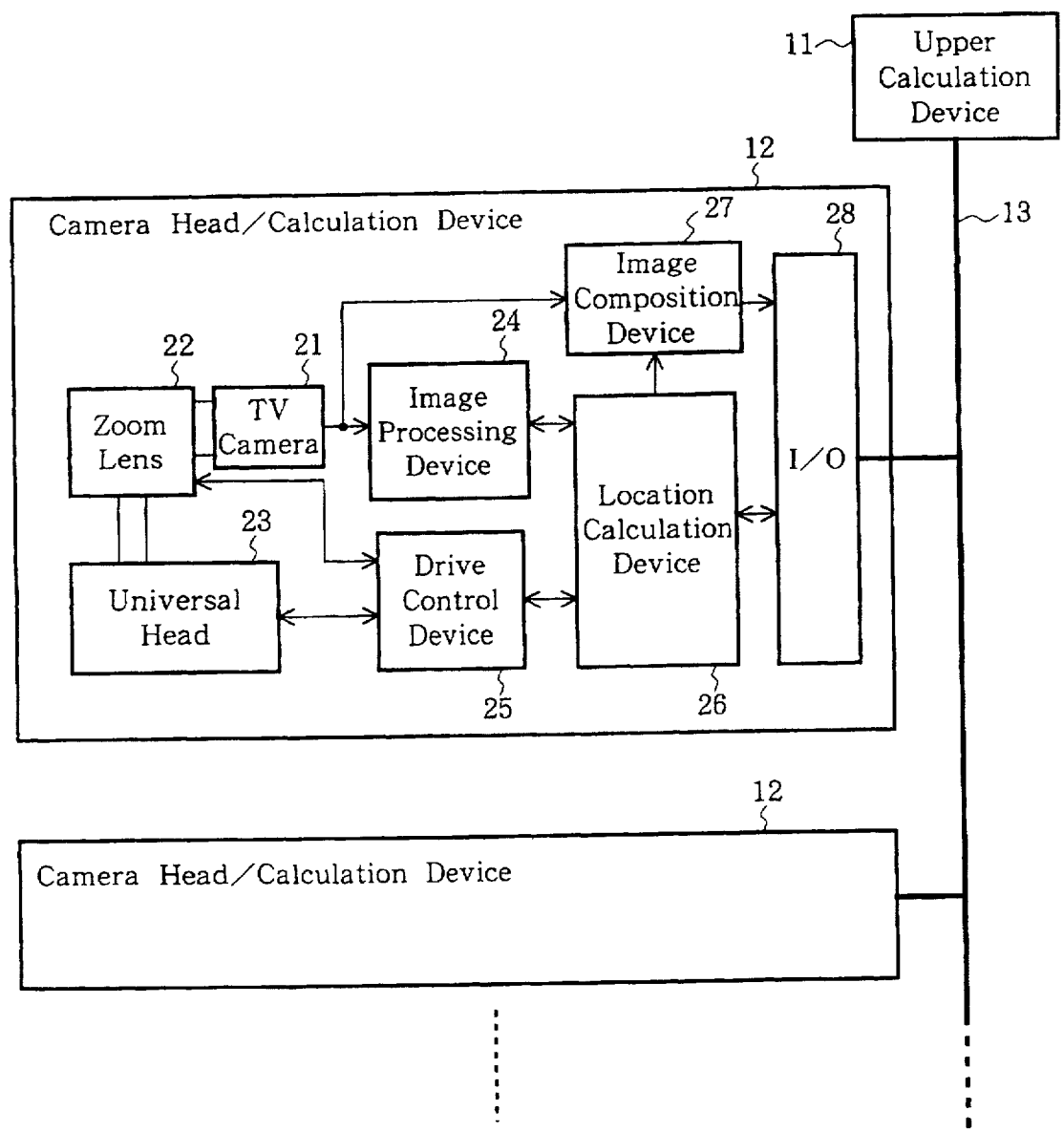
FIG. 1 is a block diagram which shows the moving object measurement device of the present invention.

FIG. 1 is a block diagram showing the moving object measurement device of the present invention.

This measurement device provides a video camera 21 as a capturing means to capture the image of moving objects, and provides an electric zoom-lens 22, an electric universal head 23, and drive control device 25 as a driving means to set the capturing direction and the capturing range of the above video camera 21, and provides an image processing device 24 as an image processing means to calculate the location of the moving object in the image (in this example, geometric center of gravity) which is included in the image signal obtained with the video camera 21, and provides the location calculation device 26 as the location calculation means to calculate the real spatial coordinate of the moving object based on the information on the location obtained with the above image processing device 24 and the capturing direction and the capturing range of the video camera 21 when obtaining its image signal.

A video camera 21, an electric zoom lens 22, an electric universal head 23, and part of the drive control device 25 are included in the camera head. Including these, the image processing device 24, drive control device 25, and location calculation device 26 are included in the camera head/calculation device 12. Multiple camera heads/calculation devices are provided and each of them is connected to the upper calculation device 11 through the data link 13. The camera head/calculation device 12 is also provided with the image composition device 27 for overlapping the additional information with the image signal output by the video camera 21, and with the input-output device 28 for data input and output through the data link 13.

Each camera head/calculation device 12 outputs coordinate data to the data link 13 at a measuring interval. The camera heads/calculation devices 12, except the one that is outputting the coordinate data, are able to capture its data. The upper calculation device 11 totally manages the multiple camera heads/calculation devices 12, and outputs the result of coordinate measurement on a display or to other output devices. When each camera head/calculation device 12 has finished outputting coordinate data, the upper calculation device 11 can output instructions individually to each camera head/calculation device 12 depending on the measurement condition.

The number of camera head/calculation device which can be connected to the data link 13 is limited by the transmitting speed of the data link 13 and the calculation speed of the upper calculation device 11.

Each of camera head/calculation device 12 can calculate the three-dimensional coordinate, though, the upper calculation device 11 can also calculate the three-dimensional coordinate using multiple two-dimensional data.

The video camera 21 is fixed on the electric universal head 23 with the electric zoom lens 22, and outputs an image signal to the image processing device 24 and image composition device 27. The image processing device 24 calculates the geometric center of gravity of the moving object included in the image signal from the video camera 21, and outputs it to the location calculation device as the centroid data. The drive control device 25 outputs the zooming control signal to the electric zoom lens 22, and receives a zooming position signal. The drive control device 25 also outputs the universal head control signal to the electric universal head 23, and receives a universal head direction signal. The drive control device 25 also generates zooming position and universal head direction data from the received zooming position signal and universal head direction signal, and outputs them to the location calculation device 26. The location calculation device 26 outputs these control data to the drive control device 25 in order to control the zooming position and the direction of the universal head. The location calculation device 26 also calculates the coordinate of the moving object from the centroid data from the image processing device 24 and the zooming position and universal head direction data from the drive control device 25, and sends the obtained real spatial coordinate data to the data link 13 through the input-output device 28.

The location calculation device 26 receives the coordinate data output by other camera heads and the calculation device 12, and instructions output by the upper calculation device 11, through the data link 13 and the input-output device 28.

Corresponding to this, the location calculation device 26 outputs the overlapping image data to the image composition device 27, and the image composition device 27 outputs the composed image signal by overlapping the data with the image signal from the video camera 21. By doing this, it is possible to output images used for measurement overlapped with various information.

Here, the characteristic of the present invention is that it provides a three-dimensional area setting means to set the area where the targeted moving object can move on the three-dimensional real spatial coordinate system as the control program in the upper calculation device 11, and provides an area mapping means to map the area on the three-dimensional real spatial coordinate system to the two-dimensional area corresponding to the capturing direction and the capturing range of each video camera 21 as the control program in the location calculation device 26, and the output of the location calculation device 26 is connected as to set the mapped two-dimensional area in the image processing device 27, and the image processing device 27 includes an area limiting means to limit the targeted area for calculation to the two-dimensional area which is set by the two-dimensional area setting means. These are described referring to FIG. 2 and FIG. 3.

Figure 2:
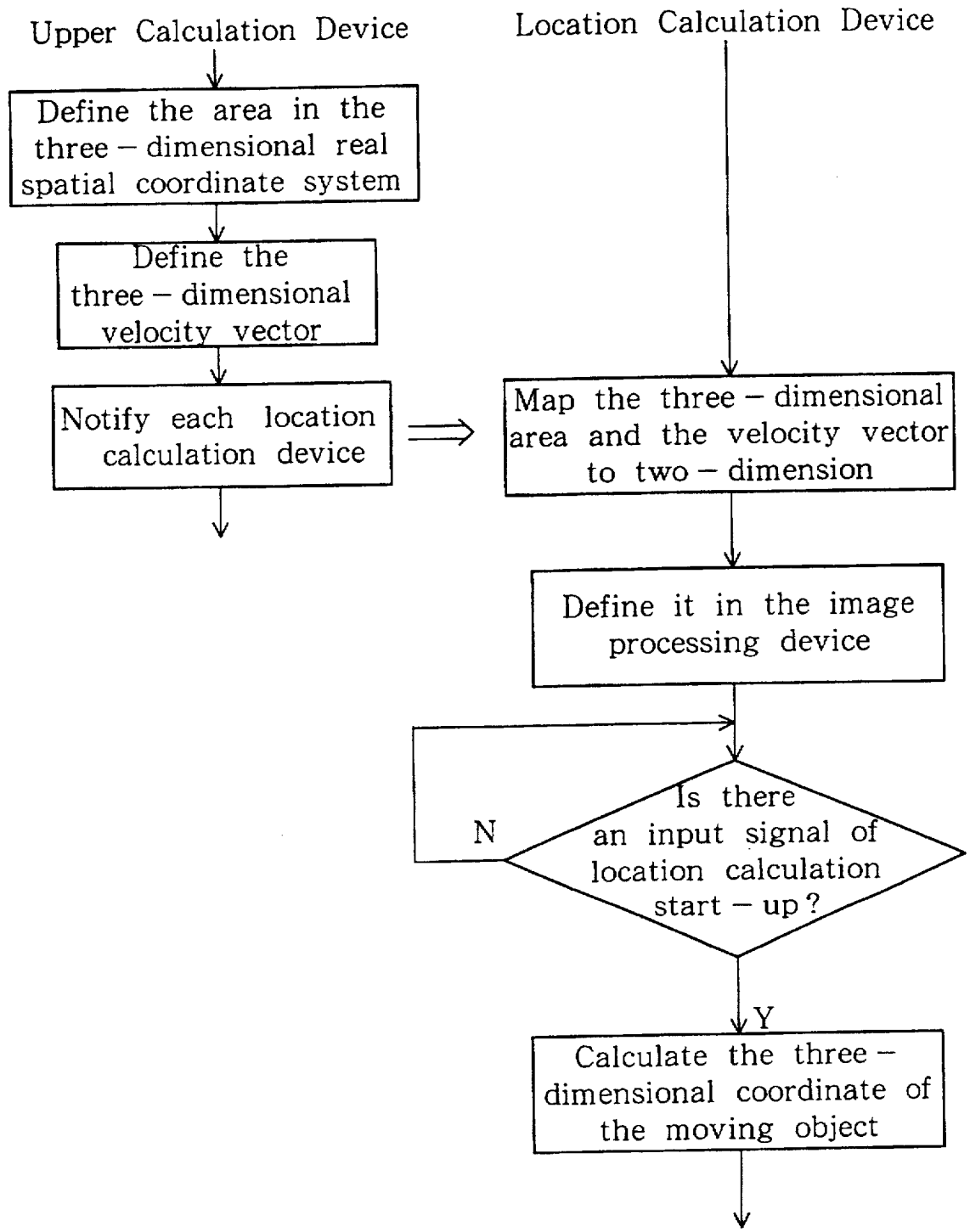
FIG. 2 is a flowchart which shows the upper calculation device for specifying the area for location calculation and the process associated with the location calculation means.

FIG. 2 is a flowchart showing the part of the process of the upper calculation device 11 and the location calculation device 26. The upper calculation device 11 totally manages multiple camera heads and the calculation devices 12. Here, the description is limited to the setting of the capturing images area and the velocity vector, and the three-dimensional measurement.

Before each video camera 21 starts capturing images, the area where the targeted moving object can move and its moving velocity vector are input to the upper calculation device 11, in the three-dimensional real spatial coordinate system. The upper calculation device 11 provides the area and moving velocity vector to the location calculation device 26. When the capturing begins, the location calculation device 26 receives the capturing direction and the capturing range of the video camera 21 from the drive control device 25, and corresponding to this, maps the area in the three-dimensional real spatial coordinate system and moving velocity vector to the two-dimensional area and velocity vector. The mapped area and velocity vector are output to the image processing device 24.

Figure 3:
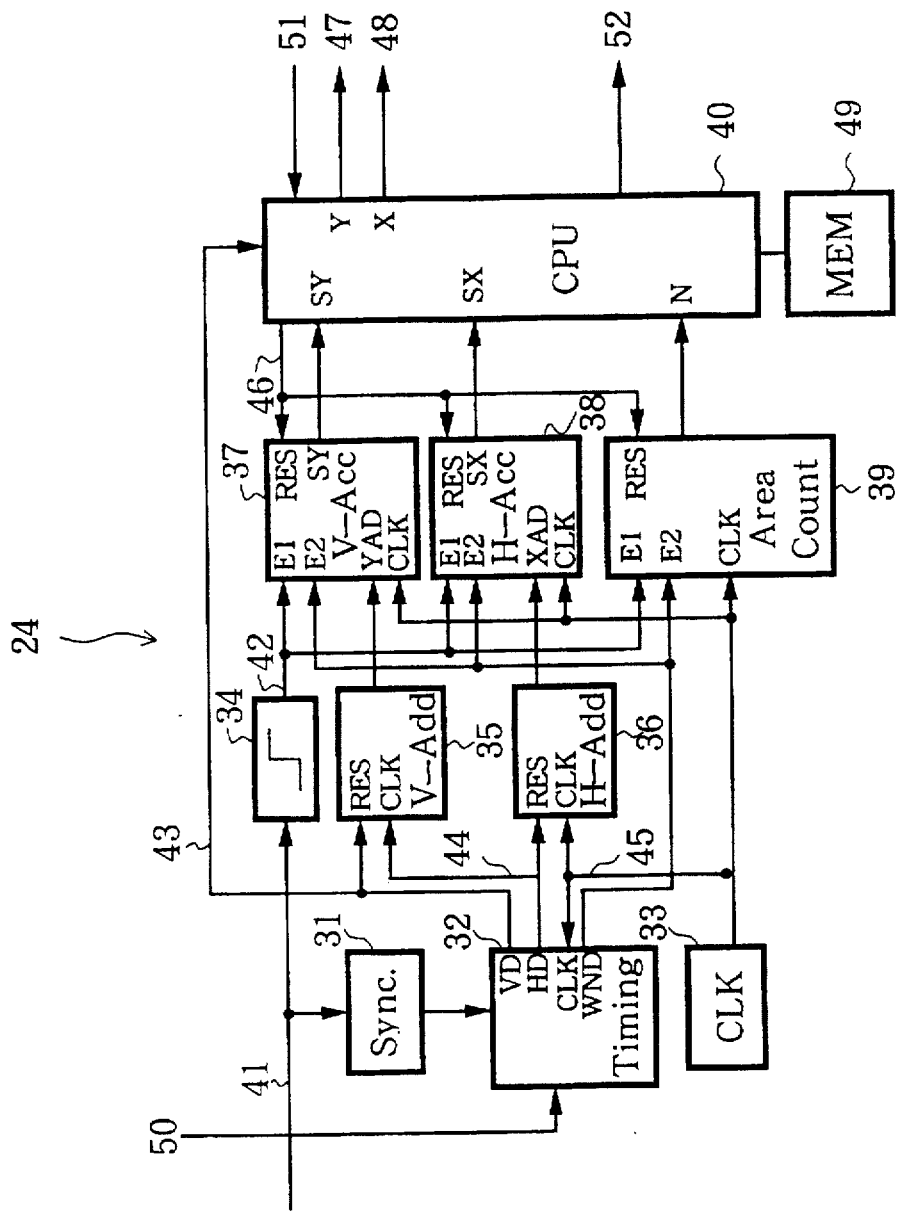
FIG. 3 is a block diagram which shows the detail of image processing device.

FIG. 3 is a block diagram showing the detail of the image processing device 24.

The image signal output from the video camera 21 shown in FIG. 1 is outputted to the synchronization separation circuit 31 and the binarization circuit 34 as the image signal 41. Also, the two-dimensional area setting data 50 from the location calculation device 27 is input to the timing generation circuit 32, and the velocity setting data 51 is inputted to the central processing unit 40.

The synchronization separation circuit 31 extracts horizontal synchronization signal and vertical synchronization signal included in the input image signal 41, and sends it to the timing generation circuit 32. The timing generation circuit 32 generates the vertical timing signal 43, the horizontal timing signal 44, and the valid range signal 45 to the clock signal output by the clock generation circuit 33. The vertical timing signal 43 has the same frequency as the vertical synchronization signal, and is matched to the timing of the horizontal synchronization signal by narrowing pulse width. The horizontal timing signal 44 has the same frequency as the horizontal synchronization signal and has narrower pulse width. The valid range signal 45 is a signal to limit the targeted area for calculation to the area set by the two-dimensional area setting data 50, and is output only in the valid range for measuring in the image signal, based on the vertical timing signal 43 and horizontal timing signal 44.

The clock signal output by the clock generation circuit 33 is input to the clock input of the horizontal address generation circuit 36, the clock input of the vertical direction accumulation circuit 37, the clock signal of the horizontal direction accumulation circuit 38, and the input signal of the area counting circuit 39, as well as to the timing generation circuit 32. The frequency of the clock signal output by the clock generation circuit 33 is adjusted to the frequency of integer times of the horizontal timing signal 44. By adjusting it as above, it is possible to generate the moving object signal of which timing is stable to the image signal 41.

The vertical timing signal 43 output by the timing generation circuit 32 is input to the reset input of the vertical address generation circuit 35 and the input port of the central processing unit (CPU) 40. The horizontal timing signal 44 output by the timing generation circuit 32 is input to the clock input of the vertical address generation circuit 35 and the reset input of the horizontal address generation circuit 36.

The vertical address generation circuit 35 is a counter which is incremented every time the horizontal timing signal is input, and is reset by the vertical timing signal, and outputs the line number (vertical location) of the current image signal. The horizontal address generation circuit 36 is a counter which is incremented every time the clock signal is input, and is reset by the horizontal timing signal, and outputs horizontal location of the current image signal.

The valid range signal 45 output by the timing generation circuit 32 is input to the enable input E2 of the vertical direction accumulation circuit 37, the enable input E2 of the horizontal direction accumulation circuit 38, and the enable input E2 of the area counting circuit 39.

The binarization circuit 34 separates the luminance which show the moving object, and the luminance which show the background in the input image signal 41, and outputs the moving object signal 42. The moving object signal 42 is input to enable input E1 of the vertical direction accumulation circuit 37, the enable input E1 of the horizontal direction accumulation circuit 39, and the enable input E1 of the area counting circuit 39.

The vertical direction accumulation circuit 37 accumulates the vertical address signal which is input only when a signal is input to the enable input E1 and E2 simultaneously, and resets the accumulation counter when a reset signal is input to the reset input. That is, only when the moving object signal 42 indicates moving objects and the valid range signal 45 indicates the valid range, then the vertical address signal is accumulated at the timing of the clock signal. Therefore, the output indicates the first order moment of vertical direction of the moving object in the image signal.

The horizontal direction accumulation circuit 37 accumulates the horizontal address signal which is input only when a signal is input to the enable input E1 and E2 simultaneously, and resets the accumulation counter when reset signal is input to the reset input. That is, only when the moving object signal 42 indicates moving objects and the valid range signal 45 indicates the valid range, the horizontal address signal is accumulated at the timing of the clock signal. Therefore, the output indicates the first order moment of horizontal direction of the moving object in the image signal.

The area counting circuit 39 increments the output only when a signal is input to the enable input E1 and E2 simultaneously, and resets the accumulation counter when a reset signal is input to the reset input. That is, only when the moving object signal 42 indicates moving objects and the valid range signal 45 indicates the valid range, the output is incremented at the timing of the clock signal. Therefore, the output indicates the area (zero order moment) of the moving object in the image signal.

The accumulation output of the vertical direction accumulation circuit 37 is input to the input port SY of the central processing unit 40, and the accumulation output of the horizontal direction accumulation circuit 38 is input to the input port SX of the central processing unit 40, and the area output of the area counting circuit 39 is input to the input port N of the central processing unit 40.

The central processing unit 40 outputs the counter initialization signal 46 which is input to the reset input of the vertical direction accumulation circuit 37, the reset input of the horizontal direction accumulation circuit 38, and the reset input of the area counting circuit 39. The central processing unit also outputs the vertical direction centroid data 47 and the horizontal direction centroid data 48.

Moreover, in this embodiment, the recording device 49, which can record the geometric center of gravity of the image which is pre-defined steps before, is connected to the central processing unit 40. The central processing unit 40 detects the change of location between the geometric center of gravity recorded in the recording device 49 and the geometric center of gravity of the subtraction image, and outputs the location calculation start-up signal 52 when the change of location is in the pre-defined range for the velocity vector setting data 51.

The objective of this image processing device is to detect the moving object signal in the input image signal in a limited two-dimensional area, and to output its centroid data. The operation is described in detail below.

When image signal 41 is input, the timing generation circuit 32 generates the vertical timing signal 43, which is input to the central processing unit 40. The central processing unit 40 outputs the counter initialization signal in order to indicate that the image signal has begun. By this, the accumulation circuit 37 and 38 and the area counting circuit 39 are reset. Also, the vertical timing signal 43 resets the vertical address generation circuit 35.

When the vertical timing signal 43 is finished, the timing generation circuit 32 outputs the horizontal timing signal 44 and the valid range signal 45. Also, because the binarization circuit 34 outputs the moving object signal 42, the accumulation circuit 37 and 38 output the vertical direction first moment and the horizontal direction first moment of the moving outputs respectively. Simultaneously, the area counting circuit 39 outputs the area of the moving object.

When one field of the image signal 41 is finished and the timing generation circuit 32 outputs the vertical timing signal 43 again, after finishing reading these first moments and the area (zero-th moment), the central processing unit 40 calculates (vertical direction first moment area) and (horizontal direction first moment/area). The results of the calculation are the centroid of the vertical direction and the centroid of the horizontal direction of the moving object respectively. These centroid data are output to the output port, and then, outputs the counter initialization signal 46. After this, the above sequence is repeated.

When centroid data are obtained, the central processing unit 40 also detects the change of location by comparing them with the centroid data a few frame before recorded in the recording device 49. Moreover, when the detected change of location is within the range defined beforehand for the vertical vector setting data 51, it outputs the location calculation start-up signal 52 to the location calculation device.

Figure 4A:
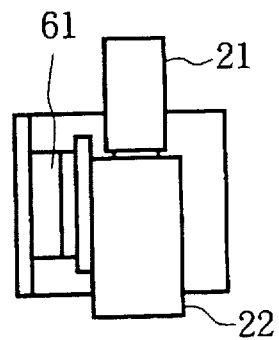
Figure 4B:
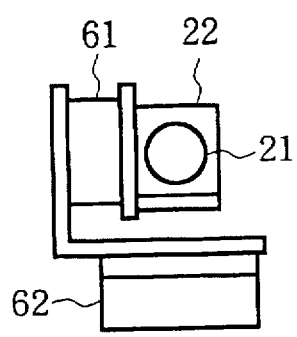
Figure 4C:
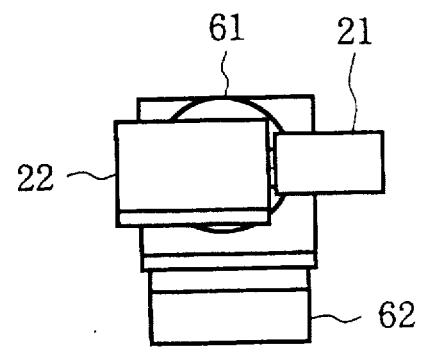

FIG. 4a, FIG. 4b, and FIG. 4c are the simplified figures of the structure of the camera head, wherein FIG. 4a is a plan view, FIG. 4b is a front view, FIG. 4c is a side view. Here, the degree of freedom of the universal head is two, that is, it shows the example when it has two rotatable axes.

The universal head can rotate around the vertical axis and the horizontal axis. On this universal head, the video camera 21 and the zoom lens 22 are fixed. On the vertical axis of the universal head, the vertical axis drive motor and the angle encoder 61 are provided and output a pulse for each constant angle.

The video camera 21, the zoom lens 22, and the vertical axis drive motor and the angle encoder 61 are rotatable around the horizontal axis of the universal head. On the horizontal axis of the universal head, the horizontal axis drive motor and the angle encoder 62 are provided and output a pulse for each constant angle.

Figure 5:
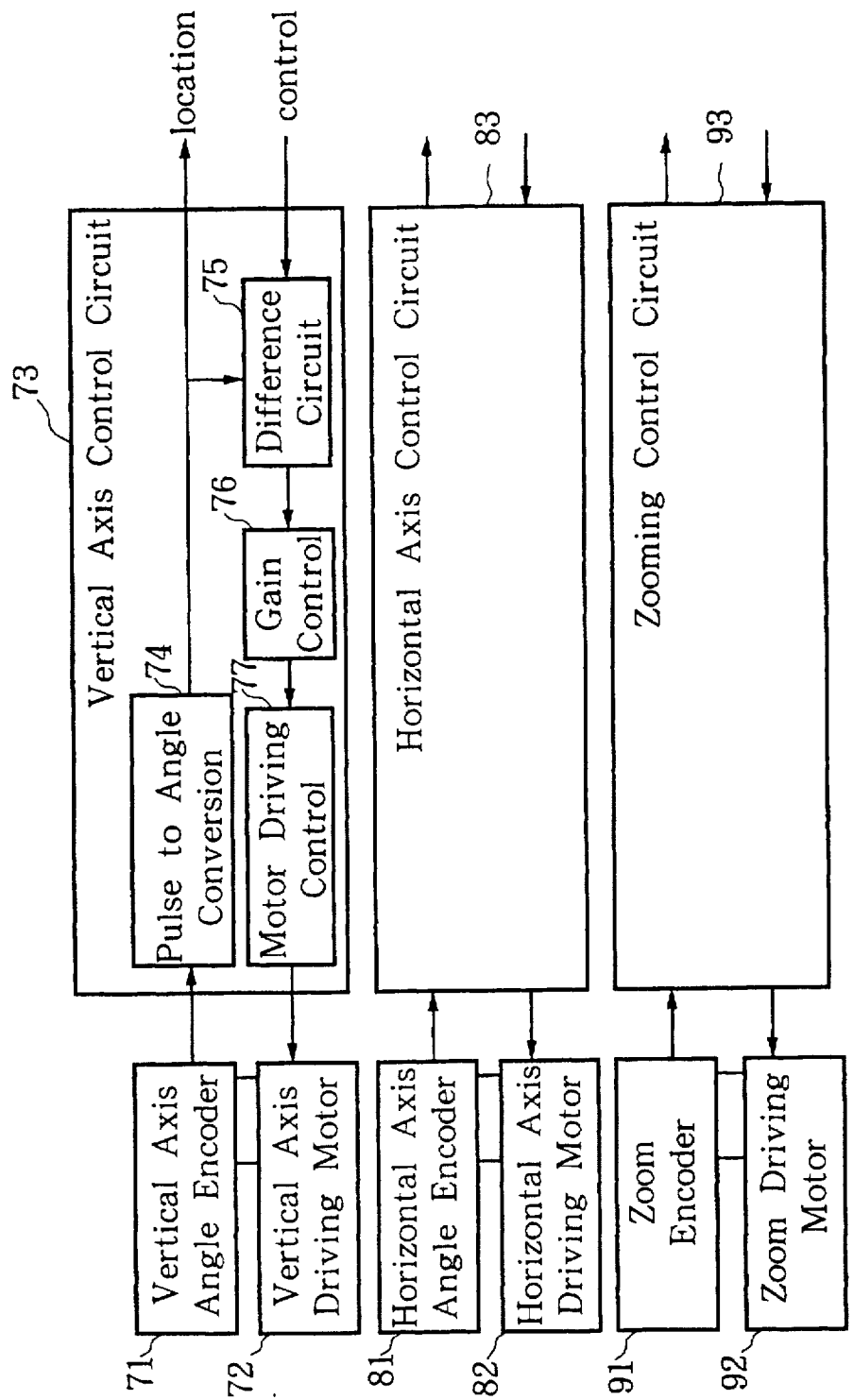
FIG. 5 is a block diagram which shows an example of the drive control means.

FIG. 5 is a block diagram showing an example of the drive control device 25.

The drive control device 25 includes the vertical axis angle encoder 71, the vertical axis driving motor 72, the vertical axis control circuit 73, the horizontal axis angle encoder 81, the horizontal axis driving motor 82, the horizontal axis control circuit 83, the zoom encoder 91, the zoom driving motor 92, and the zooming control circuit 93. The vertical axis angle encoder 71 and the vertical axis driving motor 72 consist of the vertical axis driving motor and the angle encoder 61 in FIG. 4a–FIG. 4c, and the horizontal axis angle encoder 81 and the vertical axis driving motor 82 consist the horizontal axis driving motor and the angle encoder 62.

Each axis and zooming driving motor and the encoder are mechanically connected, and when the rotation angle of the driving motor changes, it is transferred mechanically, and the encoder outputs the encoder pulses which include the information on the rotation angle. The driving way of zooming of the vertical and the horizontal axis and the electric zoom lens are essentially the same, and the structure and the operation of the vertical axis control circuit 73, the horizontal axis control circuit 83, and the zooming control circuit 93 are practically the same. Next, the operation of the vertical axis is explained.

The vertical axis control circuit 73 provides the pulse-to-angle conversion circuit 74, the difference circuit 75, the gain control circuit 76, and the motor driving control 77. The encoder pulses outputted from the vertical angle encoder 71 are input to the pulse-to-angle conversion circuit 74. The pulse-to-angle conversion circuit 74 converts the pulses to the signal indicating angle (voltage, or digital data), and supplies it to one of the inputs of the difference circuit 75 and outputs it to the location calculation device as the angle signal.

The objective angle signal is input to another input of the difference circuit 75 by the location calculation device. By this, the difference circuit 75 calculates the difference between the objective angle signal and the angle signal, and outputs the difference angle. The difference angle is input to the gain control circuit 76. The gain control circuit 76 control the driving power of the vertical axis driving motor 72 based on the input difference angle, that is, the difference to the objective angle. At this time, the gain control circuit 76 control the driving power of the vertical axis driving motor 72 to eliminate the overshoots or offset errors. The motor driving control signal output by the gain control circuit 76 is input to the motor driving circuit 77. The motor driving circuit 77 amplifies the power of the input signal and outputs the motor driving signal and drives the vertical axis driving motor 72. By doing this, the driving motors are driven in order to eliminate the difference between the objective angle and the actual angle.

In the above, the case when the encoder outputs the angle information using pulse signal is explained, however, it is also possible to use potentiometer for the encoder. In such cases, the angle information is output as the voltage signal, and because it is not necessary to convert the information to enable the calculation in the difference circuit 75, the pulse-to angle conversion circuit 74 is unnecessary.

Figure 6:
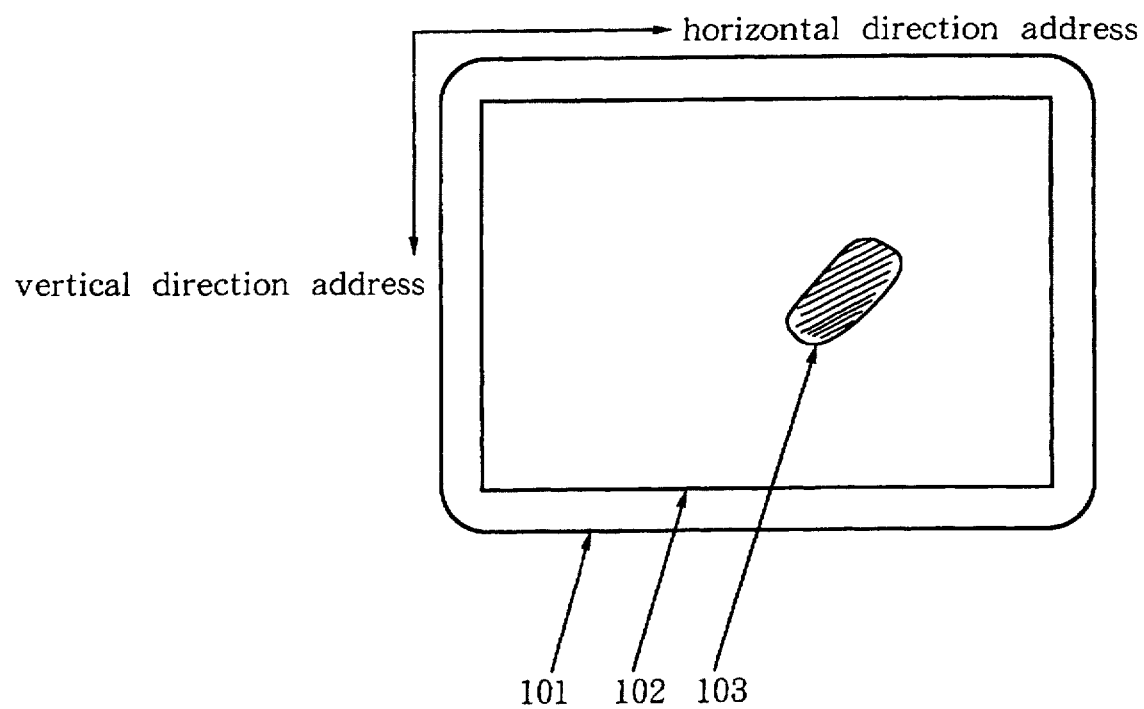
FIG. 6 is a figure showing the relation of the horizontal and vertical address.

FIG. 6 shows the relation between the horizontal and the vertical address. For the TV screen range 101, the valid range 102 is defined restrictively. (In the figure, not restricted so much), and detects the moving object 103 in it.

Figure 7:
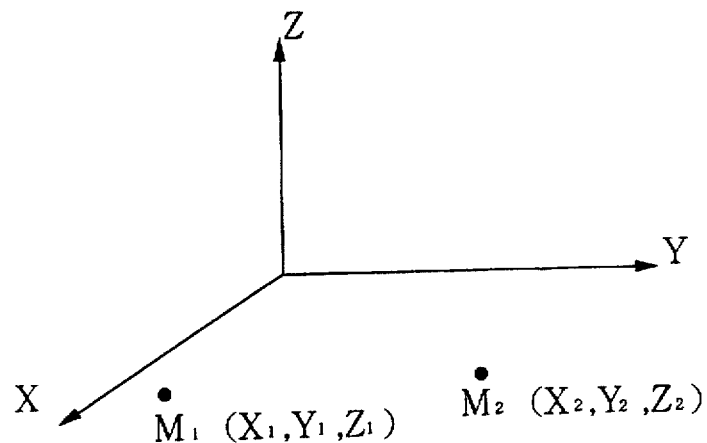
FIG. 7 is a figure showing the location of the camera head in the measurement spatial coordinate system.
Figure 8:
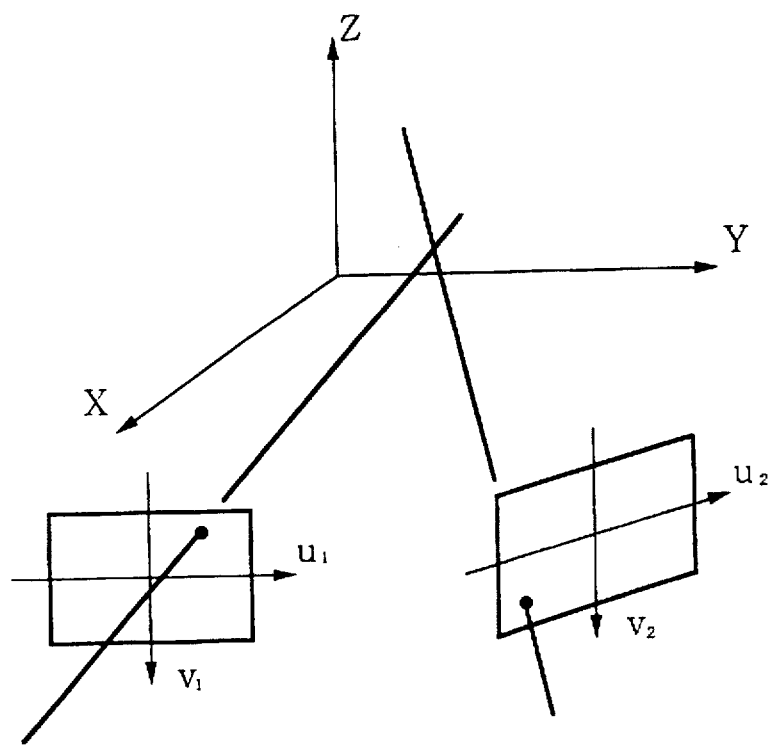
FIG. 8 is a figure showing the relation of the measurement spatial coordinate system and the coordinate system of the image processing device.

Next, by referring to FIG. 7 and FIG. 8, the method to calculate the location in the location calculation device 26 is described. FIG. 7 is a figure showing the location of the camera head in the measurement space coordinate system, and FIG. 8 is a figure showing the relation of the measurement space coordinate system and the coordinate system of the image processing device.

First, the method for location calculation of a moving object by using two camera heads is described.

The coordinate system (X,Y,Z) which represents the coordinate of a camera head in the measurement space is a coordinate system fixed on the measurement space, that is, the ground or the floor, and is independent of the direction of the camera head. Let the coordinate of the camera heads be defined as follows:

camera head 1: M1(X1, Y1, Z1)

camera head 2: M2(X2, Y2, Z2).

Let the direction of the camera head, that is, the direction (angle) of the center of image observed by the camera head be defined as follows:

camera head 1: ($\theta_1$, $\psi_1$), camera head 2: ($\theta_2$, $\psi_2$).

The angle is a vector fixed on the coordinate system (X,Y,Z), e.g., the azimuth and the elevation angle (or, angle of depression) with the reference of (1,0,0), and is the direction of the universal head outputted by the drive control device 25 shown in FIG. 1.

Let the capturing range (angle) of the camera head be defined as:

camera head 1: ($\alpha_1$, $\beta_1$), camera head 2: ($\alpha_2$, $\beta_2$).

In general, the ratio of horizontal and vertical of the capturing range is 4:3. Therefore, for each camera head, tan ($\alpha$ 1/2):tan ($\beta$ 1/2)=4:3 tan ($\alpha$ 2/2):tan ($\beta$ 2/2)=4:3.

Also, the capturing range of the camera head and the zooming position (focusing distance of a lens) has a constant relation. That is, it can be calculated by using the zooming position data outputted by the drive control device 25 in FIG. 1.

As shown in FIG. 8, let the coordinate of the center of gravity of the moving object in the image observed by the camera head be defined as follows:

camera head 1: (u1, v1), camera head 2: (u2, v2).

These coordinates are the coordinate system of the image in the screen, that is, the coordinate system output by the image processing unit 24 in FIG. 1. The origin of the coordinate system is the center of the screen, and its horizontal length in the effective range (the number of pixels of horizontal direction) and its vertical length (the number of pixels of vertical direction) are respectively.:

2 * umax,

2 * vmax, and is same as the capturing range. Assume that they are common constant for both camera heads.

The equation of a line which passes on the moving object for each camera head can be obtained by using the coordinate of the camera head and the direction of the moving object, and can be represented by:

camera head 1: p1=(X1,Y1,Z1)+A1 *t camera head 2: p2=(X2,Y2,Z2)+A2 *t, where, p1, p1 are points on the line, t is a parameter variable, A1, A2 are vectors which can be represented as:

A1=(cos $\Psi_1$×cos $\Theta_1$, cos $\Psi_1$×sin $\Theta_1$,sin $\Psi_1$)

A2=(cos $\Psi_2$×cos $\Theta_2$, cos $\Psi_2$×sin $\Theta_2$,sin $\Psi_2$), where, $\Theta$, $\Psi$ are the azimuth and the elevation (or, the angle of depression) from the camera head to the moving object:

$\Theta_1 = \theta_1 + \tan^{-1}((u1/umax) \times \tan(\alpha\ 1/2))$ $\Psi_1 = \psi_1 - \tan^{-1}((v1/vmax) \times \tan(\beta\ 1/2))$ $\Theta_2 = \theta_2 + \tan^{-1}((u2/umax) \times \tan(\alpha\ 2/2))$ $\Psi_2 = \psi_2 - \tan^{-1}((v2/vmax) \times \tan(\beta\ 2/2))$.

The intersection of these two lines is a coordinate of the moving object. Actually, by the effect of errors of each part, in some cases it is impossible to obtain the intersection from the two lines made by the observed values. In such cases, obtain the coordinate of the nearest point to the two lines. That is, let the coordinate of the middle point of the distance of the two lines the coordinate of the moving object.

Next, the method to measure the three-dimensional coordinate by using one camera head considering the constraint condition of the moving object is described. The constraint condition in such cases is the movement condition of each athlete in the stadium, for example. Assume the vertical movement of each athlete is much smaller than the horizontal movement, then the condition that each athlete is moving on a plane can be obtained.

Here, the coordinate of the camera head is:

M1(X1,Y1,Z1).

Let the direction of the camera head, that is, the direction (angle) from the camera head to the center of the observed image:

($\theta_1$, $\psi_1$).

The angle is a direction of the universal head output by the drive control device 25. Also, let the capturing range (angle) of the camera head:

($\alpha_1$, $\beta_1$).

In general, the ratio of horizontal and vertical of the capturing range is 4:3, therefore, tan($\alpha$ 1/2):tan($\beta$ 1/2)=4:3.

Here, $\alpha$ 1 and $\beta$ 2 can be calculated by using the zooming position output by the drive control device 25 in FIG. 1.

As shown in FIG. 8, let the coordinate of the center of gravity of the moving object in the image observed by the camera head:

(u1, v1).

This coordinate is the coordinate system of the image in the screen, that is, the coordinate system output by the image processing device 24 in FIG. 1. The origin of the coordinate system is the center of the screen, and its horizontal length in the effective range (the number of pixels of horizontal direction) and its vertical length (the number of pixels of vertical direction) are respectively,:

2 * umax,

2 * vmax, and is the same as the capturing range.

By using the coordinate of the camera head and the direction of the moving object, the equation of a line which passes on the moving object can be obtained by using following expressions:

p1=(X1, Y1, Z1)+A1×t, where, p1 is a point on the line, t is a parameter variable, A1 is a vector which can be expressed as:

A1=(cos Ψ1×cos Θ 1,cos Ψ1×sin Θ1, sin Ψ).

Here, Θ1 and Ψ2 are the azimuth and the elevation (or, the angle of depression) from the camera head to the moving object:

Θ1=θ1+tan-1 ((u1/umax)×tan(α 1/2))

Ψ1=ψ1−tan-1 ((v1/vmax)×tan(β1/2)).

On the other hand, by the constraint condition, the moving object is on the following plane.

(p—b)·B=0, where, p is a point on the constraint plane, b is a vector(the height of the plane, etc.) on the constraint plane, B is a normal vector of the constraint plane, indicates inner product of vectors. The coordinate of the intersection of this line and the plane is a coordinate of the moving object.

As described above, by measuring the centroid of the moving object with a camera head/calculation device 12 shown in FIG. 1, and transferring the two-dimensional data to all camera heads/calculation devices 12 through data link 13, as a result, each camera head/calculation device 12 can obtain the three-dimensional coordinate of the moving object. Also, in the upper calculation device 11, it is possible to compose for obtaining the three-dimensional coordinate.

In the above description, the example where two camera heads/calculation devices are used for measuring the three-dimensional coordinate of one moving object is described, however, it is also possible to measure the centroid of multiple moving objects in the screen by connecting multiple processing devices to one camera head. In such cases, depending on the location of the moving objects in the screen which are measured by each image processing device, generation timing of the valid range signal should be changed. By doing this, it is possible to measure the three-dimensional coordinate of multiple moving objects with two camera heads/calculation devices. Also, if multiple camera heads/calculation devices are provided, by combining them appropriately, it is possible to measure the three-dimensional coordinate of multiple moving objects.

Next, the method to receive the three-dimensional area on the upper calculation device 11 set by the location calculation device 26, and map the three-dimensional area to the two-dimensional area based on the direction of the camera head and the capturing range, is described.

This three-dimensional area represents the characteristic of the movement of the moving object. That is, it represents the area where it is impossible to move on, or possible to move on, the direction of movement, and the velocity of movement. The operator of the measurement device sometimes know the outline of the three-dimensional course of the moving object. In such cases, the operator can specify the three-dimensional area to the upper calculation device. For example, when measuring the coordinate of the airplane which is approaching a runway, it is impossible that the moving object is in the area that is far from the specified course, and the velocity on the course can not change so much.

Also, there are cases when the operator has no knowledge of the outline of the three-dimensional course of the moving object. In such cases, the operator can specify the moving course of the moving object for the image captured by each camera head. That is, the operator can specify the two-dimensional area from the location of each camera head. The upper calculation device integrates the two-dimensional areas from the location of each camera head and makes the three-dimensional movement characteristic area of the moving object. For example, when bringing a portable coordinate measurement device to the stadium and measuring the motion along the course of athletes, it is difficult to know the coordinate of the course in advance. However, it is possible to capture the athlete practicing before the competition with a camera head and grasp the course. By capturing the course with multiple camera heads, the coordinate measurement device can have the outline of the three-dimensional movement course of the moving object even if there are undulations on the course.

In both cases, you should specify the three-dimensional area based on spherical region. By specifying multiple overlapping spheres, it is possible to specify almost every three-dimensional area. Moreover, in order to specify a sphere, it is necessary to specify the center and the diameter of the sphere. If you try to represent a solid that has comers such as a rectangular parallelopiped by using spheres alone, a lot of spheres are needed, however, in general, such cases are rare in the characteristic of the movement of the moving objects. Also, spheres seems spheres from any angle, therefore, there are less calculations when mapping to the two-dimensional area observed from the coordinate of each camera head.

The upper calculation device has the three-dimensional area represented by a set of spheres for each characteristic such as the area on which it is impossible that the moving object move or possible to move, and transfers it to each camera head/calculation device through the data link. Each camera head/calculation device maps the three-dimensional area to the two-dimensional area seen from the capturing direction using the coordinate of the center of spheres and diameters, and judge the validity of the measured coordinate by comparing with the centroid data output by the image processing device.

Also, the velocity of the moving object measured with each camera head is different depending on the direction of movement of the moving object seen from each camera head. For example, the velocity of the moving object moving toward a camera is small, however, the measured velocity does not correspond to the moving velocity of the moving object. That is, for the usual coordinate measurement device, it has been impossible to output the three-dimensional coordinate of a moving object after satisfying a certain condition by comparing the moving velocity of the moving object with the velocity defined in advance. Each camera head of the present invention's coordinate measurement device grasps the three-dimensional coordinate in the real space of the moving object, therefore, it is possible to know the three-dimensional velocity vector of a moving object by observing the difference of the three-dimensional coordinate. By comparing it with the three-dimensional velocity vector defined in advance, it is possible to output the three-dimensional coordinate data of the moving object after satisfying a certain condition. For example, it is possible to output the three-dimensional coordinate data of a moving object after the moving object moves from a certain location to a certain direction with the velocity larger than a certain velocity. By outputting measurement data after a certain motion of the moving object as described above, it is not necessary to record and analyze the meaningless measurement data. It corresponds to the trigger function of the oscilloscope which starts recording after some desired phenomenon has occurred.

In the embodiments described above, a centroid is used as the location of the moving object measured from the image signal outputted by the capturing device, however, the location of which shape has the most similarity by using pattern matching can also be used as the location of the moving object, and the present invention can be embodied similarly.

Also, by using the infrared video camera as the capturing device, it is possible to reduce noises in the image when measuring the measurement target in a distant location. In such cases, by attaching an infrared emission element on the moving object, it is possible to reduce the effect of other light sources. By using a video camera with an optical filter on the capturing device, it is possible to select the band of wavelength including some specific colors, and it becomes easier to separate the moving object from the background.

The diaphragm of the capturing device can be controlled so that it is easy to separate the moving object from the background. In such cases, the diaphragm can be controlled based on the data of the measuring status, such as a histogram of brightness of the image signal including the moving object, and the area of the moving object. Focus of the electric zoom lens can be controlled based on the coordinate data of the moving object calculated by the calculation device. If one camera head measures the location of multiple moving objects, it is possible to control the diaphragm, the capturing range, and the focus in order to let all moving objects in the depth of field of the zoom lens.

As described above, the moving object measurement device of the present invention makes it possible to obtain the coordinate of the moving object in real-time because it is possible to reduce the amount of calculation considerably by setting the area of the three-dimensional real space coordinate system that corresponds to the moving object of the capturing target and mapping it to the two-dimensional area. Because of this, it is also possible to control the capturing direction and the capturing range automatically by tracking the moving object and to measure the three-dimensional coordinate of the measurement target precisely which is moving fast in a wide area.

Next, the embodiment which control the capturing direction and the capturing range that correspond to the movement of the moving object, that is, even if the moving object moves widely, control of at least the capturing direction or the capturing range by tracking it, is described.

Figure 9:
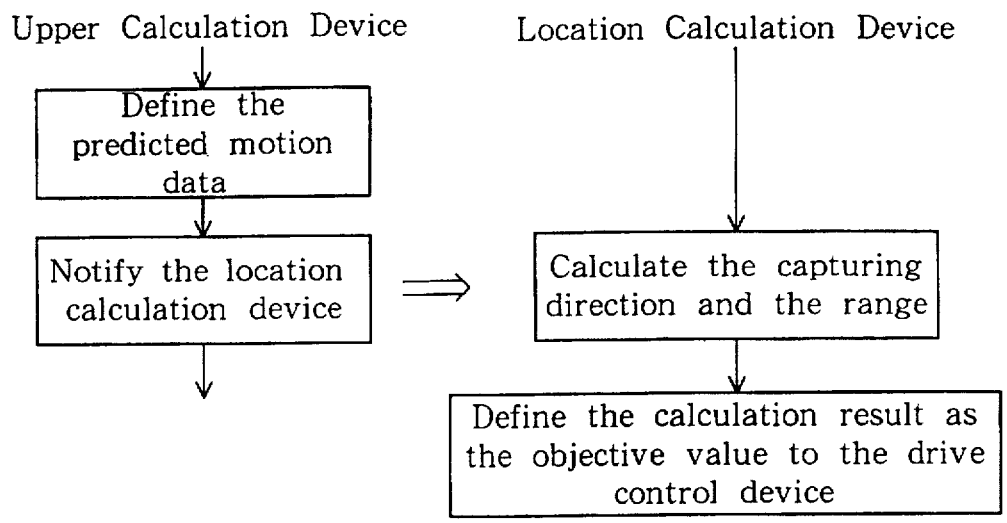
FIG. 9 is a flowchart showing the first example of processing for controlling the capturing direction and the capturing range of a TV camera.

FIG. 9 is a flowchart showing the first example of the processing which controls the capturing direction and the capturing range, and shows the part of the process with the upper calculation device 11 and the location calculation device 26. In this example, the upper calculation device 11 sets the motion data that is predicted for the targeted moving object in the three-dimensional real spatial coordinate system, and notifies the location calculation device 26 of it. The location calculation device 26 calculate the capturing direction and the range of the video camera 21 based on the motion data and sets it as the objective value to the drive control device 25. The drive control device 25 controls the zooming position and the direction of the universal head in order to achieve the objective value.

Figure 10:
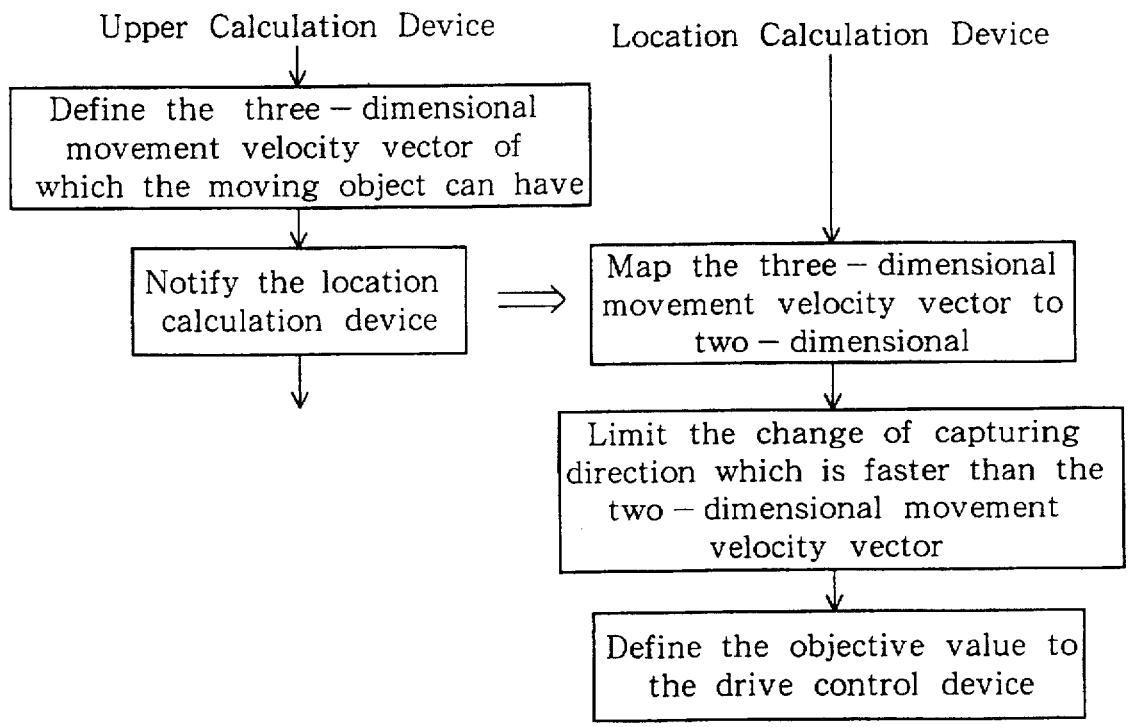
FIG. 10 is a flowchart showing the second example of processing for controlling the capturing direction and the capturing range of a TV camera.

FIG. 10 is a flowchart showing the second example of the processing which controls the direction of the capturing device and the capturing range, and shows the example in which it is desirable to combine with the process shown in FIG. 9. In this example, the upper calculation device 11 sets the moving velocity vector on the three-dimensional real space that the moving object can have. The moving velocity vector is sent to each location calculation device 26. Then each location calculation device 26 maps the moving velocity vector to the two-dimensional moving vector corresponding to the capturing range of the video camera 21. Then, sets the objective value on the drive control device to prevent the direction of the video camera 21 from changing faster than the velocity of the mapped two-dimensional moving velocity vector.

Figure 11:
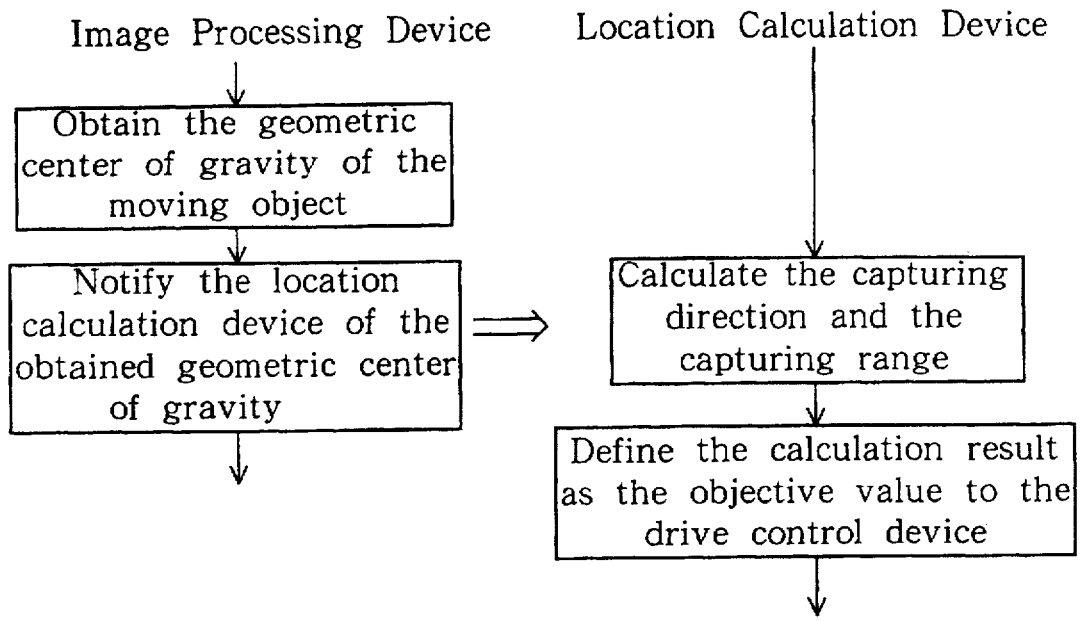
FIG. 11 is a flowchart showing the third example of processing for controlling the capturing direction and the capturing range of a TV camera.

FIG. 11 is a flowchart showing the third example of the process which controls the direction of the capturing device and the capturing range. In this example, without the upper calculation device 11, the capturing direction and the range are controlled based on the captured image signal. That is, the location calculation device 26 calculates the capturing direction and the range of the video camera 21 based on the geometric center of gravity obtained by the image processing means with the image processing device 24, and sets the result as the objective value to the drive control device 25. By doing this, at least the setting of either the capturing direction or the capturing range of the video camera 21 is controlled.

If the image processing device 24 can obtain the geometric center of gravity of multiple moving objects, or if geometric center of gravity of multiple moving objects provided with multiple image processing devices 24 for one location calculation device, it is possible to calculate the weighted averages of each geometric center of gravity of these multiple moving objects.

Figure 12:
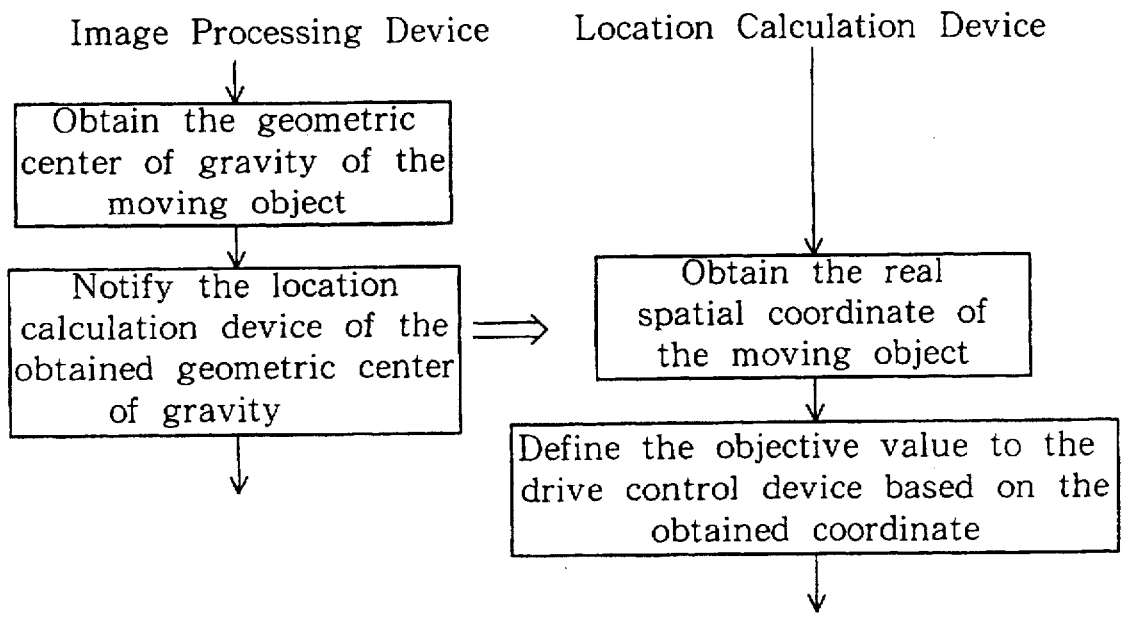
FIG. 12 is a flowchart showing the fourth example of processing for controlling the capturing direction and the capturing range of a TV camera.

FIG. 12 is a flowchart showing the fourth example of the process which controls the direction of the capturing device and the capturing range. In this example, the capturing direction and the range are controlled without the upper calculation device 11 as the example shown in FIG. 11. However, contrary to the example in FIG. 11 where it is controlled based on the geometric center of gravity in the screen, in the example in FIG. 12, it is controlled based on the coordinate of the moving object in the real space. That is, the location calculation device 26 obtains the coordinate of the moving object in the real space, and based on it, sets the objective value on the drive control device 25, and controls at least the setting of either the capturing direction and the capturing range of the video camera 21.

Figure 13:
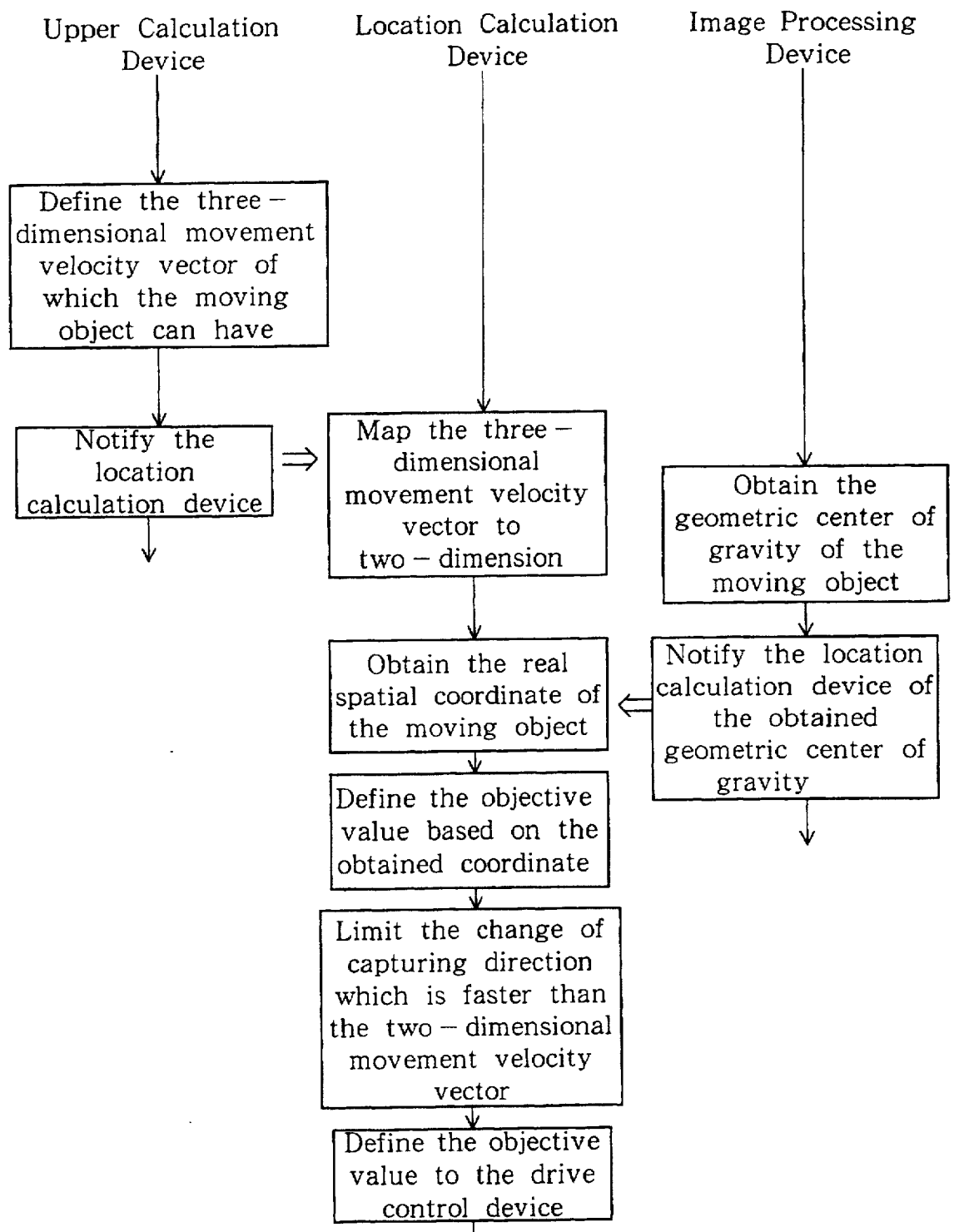
FIG. 13 is a flowchart showing the fifth example of processing for controlling the capturing direction and the capturing range of a TV camera.

FIG. 13 is a flowchart showing the fifth example of the process which controls the direction of the capturing device and the capturing range. This example corresponds to the process which combines the example shown in FIG. 10 and the example shown in FIG. 12. That is, the upper calculation device 11 sets the three-dimensional moving velocity vector that the moving object can have in advance, and notifies the location calculation device 26 of it. The location calculation device 26 maps the moving velocity vector to the two-dimensional moving velocity vector corresponding to the capturing range of the video camera 21. The location calculation device 26 controls the capturing direction and the capturing range of the video camera 21 based on the coordinate of the moving object in the real space. Here, it was controlled to prevent the direction of the video camera 21 from changing faster than the mapped two-dimensional moving velocity vector.

Figure 14:
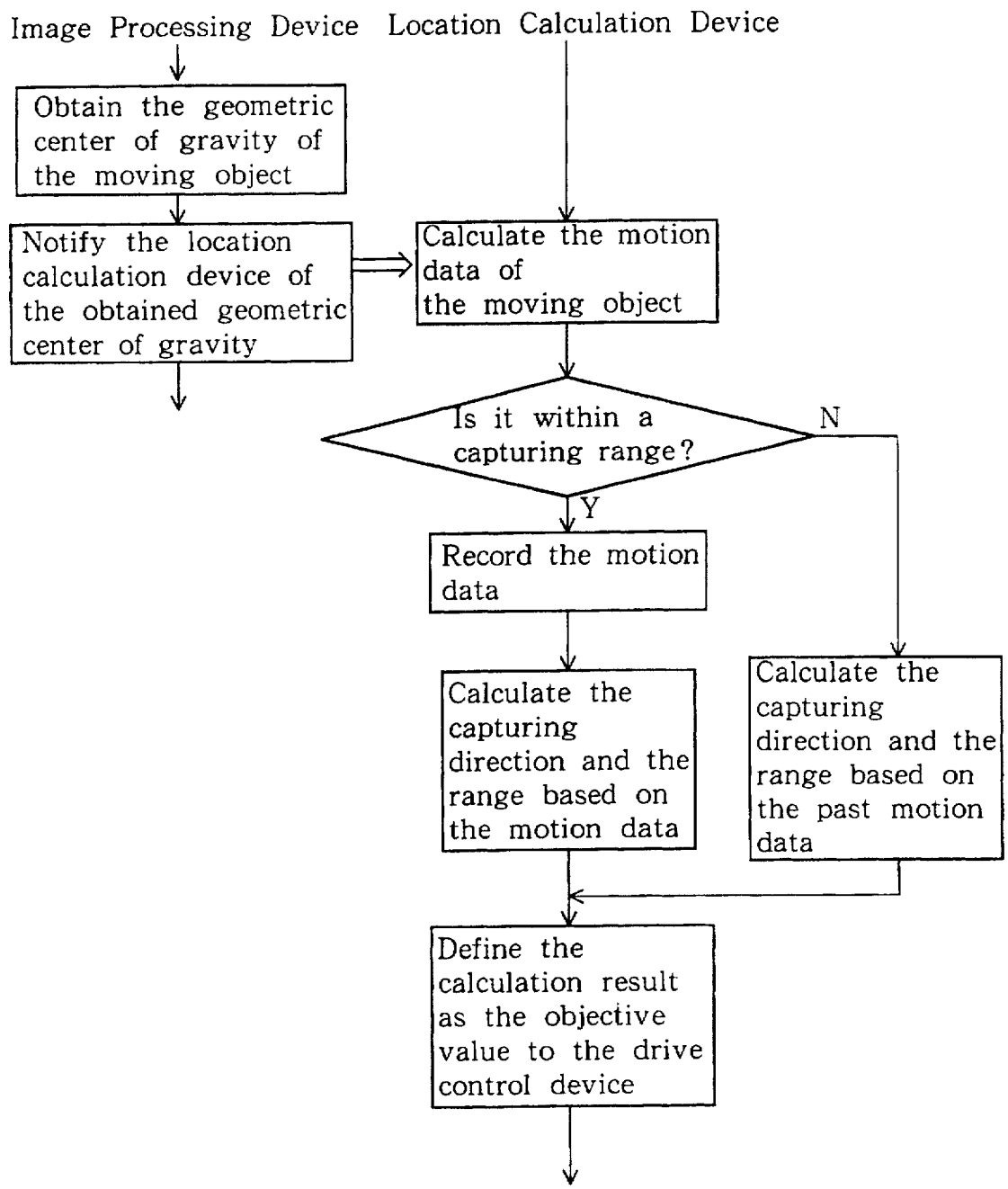
FIG. 14 is a flowchart showing the sixth example of processing for controlling the capturing direction and the capturing range of a TV camera.

FIG. 14 is a flowchart showing the sixth example of the process which control the direction of the capturing device and the capturing range. In this example, the location calculation device 26 measures the motion data and controls the capturing direction and the range based on the measurement data. However, the location calculation device 26 provides a means to record the measured motion data and detects if the moving object moves out of the capturing range of the video camera 21 based on the measured motion data. If the moving object moves out of the capturing range of the video camera 21, it keeps controlling based on the past motion data recorded in the recording means. In such cases, it can predict the direction of movement of the moving object based on the past motion data, and can keep the capturing direction of the video camera 21 with the direction defined in advance.

In the above examples, it is also possible to substitute a part of or all of the process of each device with other devices.

In most cases, it is quite effective to control the capturing direction and the capturing range by extracting the measurement target from the captured image, however, it is not always possible to extract it. For example, it is quite difficult to extract a green uniform steadily from the background of grass. In such cases, a human can recognize the location and the motion of the athlete using the characteristics of the athlete wearing a uniform. Considering costs, it is not practical to construct the intelligent and fast recognition device to cope with every situation. Therefore, in such cases, if the operator of the coordinate measurement device inputs the course of movement as well as the moving velocity of the moving object, and control the direction of each camera head along the course to respond to the moving velocity of the moving object, it is possible to record the image of the moving object even if the moving object is not extracted clearly. For example, when measuring the locus of the athlete in a ski jumping contest, it is possible to predict the locus and the speed. In such cases, even if the measurement target can not be extracted strictly, it is possible to predict the location and the velocity of the measurement target if the target can be extracted at some points. By controlling the direction of the camera head to the predicted location, it is possible to record the image which include the measurement target in other recording means.

Moreover, in such cases, the moving velocity of the measurement target seen from each camera head is obtained by mapping the predicted moving velocity of the measurement target to the direction and the capturing range of each camera head. However, if the measurement target is within the capturing range, it is meaningless to control the direction of the camera head faster than the angular velocity of the above moving velocity. If the limit of the angular velocity for controlling the direction of camera head is set too large, sometimes it is controlled to another direction suddenly when the measurement target is lost. However, the measurement target itself can not move suddenly. The approximate values of the upper limit and the lower limit of the moving velocity and the moving acceleration are often known. That is, if the moving velocity of the measurement target is estimated, it should be used as the limit of angular velocity for controlling the direction of each camera head, by using the velocity obtained by mapping the known velocity to the direction and the capturing range of each camera head.

Next, the case when extracting the measurement target from the captured image and controlling the capturing direction and the capturing range is explained. In this controlling method, even if there are multiple moving objects, it is possible to treat them as one moving object by calculating the weighted averages of them. As follows, the process where there are multiple moving objects is explained, and then the control of the capturing direction and the capturing range is explained.

Figure 15:
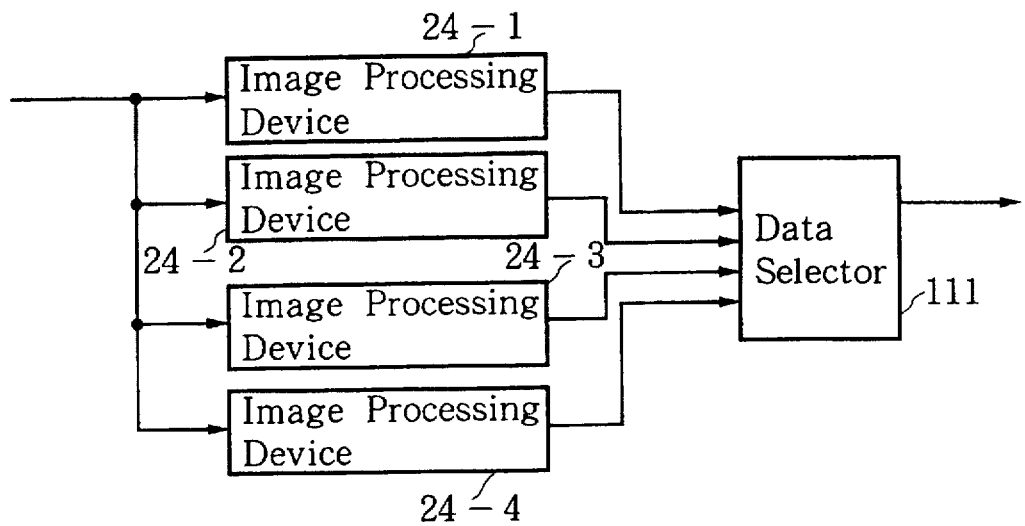
FIG. 15 is a figure showing an example of the structure for measuring the location of centroid of multiple moving objects.

FIG. 15 shows the composition when measuring the centroid of multiple moving objects. Here, multiple image processing devices are connected to one camera head. That is, in order to process the image signal obtained by the video camera, multiple (four, in this example) image processing devices 24-1~24-4 are provided and the outputs are provided to the location calculation device through the data selector 111.

The image processing devices 24-1~24-4 each has a generation timing of valid range signal independently, and outputs the centroid of a moving object in the different valid range. The data selector 111 selects the centroid data output by the image processing devices 24-1~24-4 and composes them and outputs them to the location calculation device. The composition can be achieved by using various methods, such as:

1. switching automatically after the image processing device finished calculating the centroid data, and outputting;
2. outputting by specifying the number of the required image processing device with the calculation device which uses the centroid data; and
3. outputting simultaneously by increasing the number of signal lines to output the centroid data.

Figure 16:
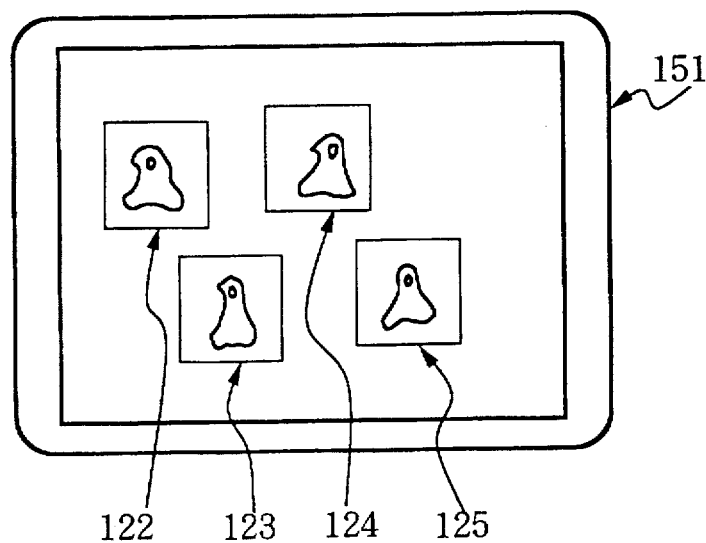
FIG. 16 is a figure showing an example of the display when processing multiple centroid data in the same screen simultaneously with multiple image processing devices.

FIG. 16 shows an example of the display when processing multiple centroid data in the same screen simultaneously with multiple image processing devices. In the screen region 121, different valid ranges 122~125 can be defined. By defining different valid ranges, it is possible to measure each centroid data of multiple moving objects.

Next, the method to receive the three-dimensional coordinate of the moving object defined by the upper calculation device 11 through the data link with each camera head/calculation device 12, and to control the direction and the capturing range of each camera head based on this three-dimensional coordinate, is described.

This measurement device is for measuring the three-dimensional coordinate of the moving object using the captured image, therefore, the direction and the capturing range of each camera should be controlled so that the moving objects are in the capturing range. The simplest way is to control the direction of the camera head so that the moving object is at the center of the capturing range. However, this method controls the direction of the camera head even for the small movement of the moving object, so too much energy is lost. Moreover, the captured image is monitored by the operator for most cases, and it is quite difficult to monitor the image where the direction of camera is changing for every small movement for a long time.

Therefore, the direction of the camera head is controlled using the three-dimensional coordinate data of the moving object. That is, the vertical movement of the moving object has a smaller weight for the control of the direction of the camera head, and the horizontal movement has a larger weight.

Figure 17A:
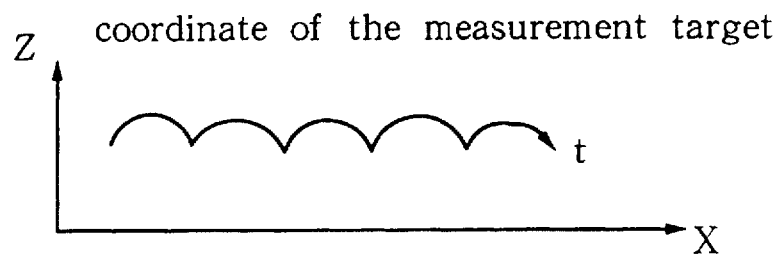
Figure 17B:
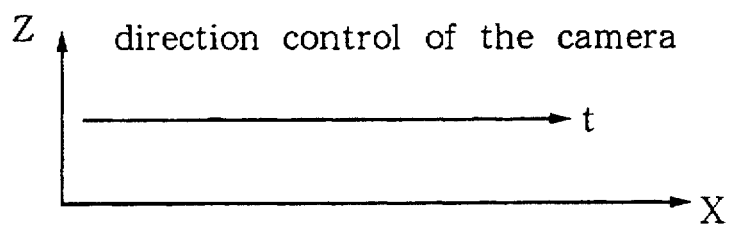

Such kind of an example is shown in FIG. 17a and FIG. 17b. Here, FIG. 17a shows the coordinate of the measurement target, FIG. 17b shows the control of the direction of the camera. By changing the response characteristics for controlling the direction of the camera head based on the direction of the movement of moving object, it is possible to obtain the images which response quickly to horizontal movement and does not response so quickly to the vertical movement.

In order to provide control as described above, the measurement result of vertical movement should be processed with a low pass filter having a low cut-off frequency, and the measurement result of horizontal movement should be processed with a low pass filter having a higher cut-off frequency. The capturing range should be controlled so that the high frequency component of the measurement result, or, the relatively small movement is within the capturing range.

Next, when measuring the movement of a soccer player, for example, who is playing, the measuring location is at the stands which is out of the playing field. Therefore, looking from the measuring location, the movement of players are horizontal in most cases. If looking from the measuring location, players move vertically when they move to the distance-direction to the measuring direction and when they jump at their position.

In both cases, better images can be obtained when tracking the direction of the camera head smoothly than changing it quickly for each vertical movement of a player. Also, players often move shortly in a relatively small area, although they sometimes move in a wide area. Therefore, the capturing range of the camera head should be controlled without changing the direction of the camera head too often for such relatively small movement. When using a measurement result for controlling the direction and the capturing range of the camera head, the three-dimensional coordinate of the moving object output by the location calculation device can be used, however, it is possible to use only centroid data output by the image processing device.

Here, the control when there is one measurement target has been described. When there are multiple measurement targets, it can be dealt with by increasing the number of camera heads. Also, as described by referring to FIG. 15, it is possible to measure the coordinate of multiple moving objects by connecting multiple image processing devices to one camera head.

Figure 18:
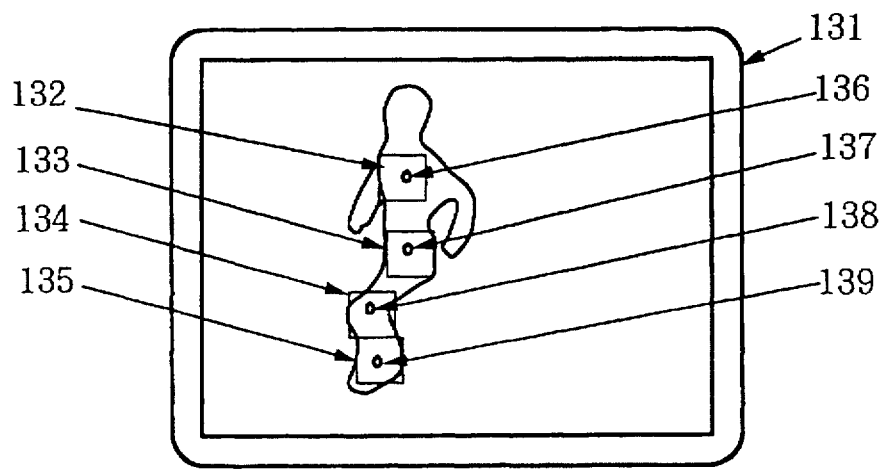
FIG. 18 is a figure showing an example of the image when measuring the movement of an athlete with multiple image processing devices.

However, it is better to use the device of the composition shown in FIG. 15 for measuring the motion of one athlete or one player than to use it for measuring the movement of multiple athletes. FIG. 18 shows such an example. In the screen range 121, there are independent valid ranges 132-135 by the image processing device. Also, measurement markers 136-139 are attached to the capturing target. The measurement markers 136-139 are made with the material which have some specific color or some specific reflection characteristics. By attaching them to the joints of the athletes, it is possible to measure the motion of the athletes. The image processing device outputs the centroid data of the measurement markers by extracting the measurement markers from the background.

FIG. 18 shows an example when measurement markers are attached to a shoulder, a waist, a knee, and an ankle of the athletes. Normally, in such cases, in a motion of an athletes, vertical movement of knees and ankles are large, and of shoulders and waists are small. Therefore, when controlling the vertical direction of the camera head, the measured coordinate obtained with measurement markers on shoulders and waists should be mainly used to avoid unnecessary control of vertical movement of the camera head. For horizontal movement, shoulders, waists, knees, and ankles each has a different motion, therefore, horizontal direction of the camera head should be controlled by using weighted averages of measured coordinates of each measurement markers, depending on the behavior of the athletes.

FIG. 17a and FIG. 17b described above are the example of measured coordinate of the measurement marker on an ankle shown in FIG. 18, and the result of controlling the direction of the camera head by judging totally using other markers. The measured coordinate of an ankle changes vertically for every step. The operator of the measurement device of course knows which measurement marker corresponds to an ankle. Therefore, it is possible to have lower weight for the measured coordinate of the measurement markers when controlling the horizontal direction of the camera head. The images obtained by doing above have no changes of the direction of the camera head for small movements of athletes and have higher quality because the direction of the camera head is tracked for large movements of athletes so no excess energy is lost.

The velocity of moving objects measured with each camera head are different depending on the direction of movement of the moving objects seen from each camera head. For example, the velocity of a moving object moving toward a certain camera is small, however, the measured velocity does not corresponds to the moving velocity of the moving object. That is, for usual coordinate measurement devices, it has not been possible to grasp the maximum moving velocity of the moving objects observed from the measurement location, even if the maximum moving velocity of the moving object is known in advance.

The moving velocity of a measurement target seen from each camera head is obtained by mapping the predicted moving velocity of the measurement target to the direction and the capturing range of each camera head. However, if the measurement target is within the capturing range, it is meaningless to control the direction of the camera head faster than the angular velocity of the above moving velocity. If the limit of the angular velocity for controlling the direction of camera head is too large, sometimes it may be controlled to another direction suddenly when the measurement target is lost. However, the measurement target itself can not move suddenly, and the approximate values of the upper limit and the lower limit of the moving velocity and the moving acceleration are known in many cases. That is, if the moving velocity of the measurement target is known, the velocity obtained by mapping the known velocity to the direction and the capturing range of each camera head, should be used for the limit of angular velocity for controlling the direction of each camera head.

When measuring the three-dimensional coordinate of the moving object in a wide measurement space, sometimes moving objects or measurement markers are not captured for a short period. For example, when measuring the movement of soccer players, the targeted player is invisible because he is hiding behind players of opponent team or structures of the stadium, or when measuring the flying course of an airplane, in some positional relation with the sun, halation are generated in the lens and the airplane can not be captured.

Figure 19A:
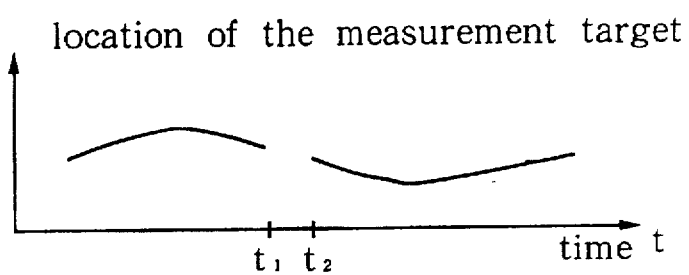
Figure 19B:
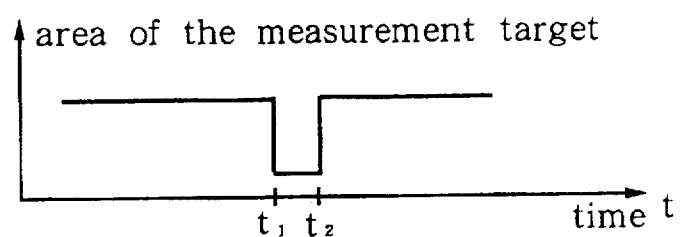

When moving objects are not extracted from the background, usually, the area of the moving object output from the image processing device becomes small. FIGS. 19a-19b show such case. In FIG. 19a, the moving object is not extracted from time t1 to time t2. During this period, the area data shows small value. Even in such cases, the moving velocity and the coordinate of the moving object are on the extension of the past measurement results. That is, if it is a short period, it is possible to estimate the moving velocity and the coordinate of the moving object by using Kalman filters for the past measurement results. It is possible to keep controlling the direction of the camera head for the estimated coordinate of the moving object.

Also, if the area data shows that the moving object has not been extracted from the background, then preparing for the time when the moving object has become extracted again, the capturing range should be set wider than usual because it is possible to capture the moving object in the capturing range when it is extracted again even if it moves unexpectedly during the time when moving objects is not extracted.

However, if the moving object has not been extracted, in some cases, the control of the direction of the camera head should be stopped immediately, and should direct the camera head to the initial position. Such cases include, for example, in track and field, the case when measuring only the coordinates soon after the start when many athletes are starting one after another from the starting position, and the case when measuring the coordinate of the tracer spouting successively from the nozzle. In such cases, it is possible to direct the camera head to a certain direction soon after the moving object has not been extracted. Moreover, at the same time it is possible to control the capturing range to the states which correspond to the initial position.

As described above, the moving object measurement device in the present invention can control the capturing direction and the capturing range of the capturing device so that the moving object does not move out of the angle of view even if the moving object is moving in a wide area. Especially, by registering the characteristics data of the three-dimensional movement of the moving objects and calculating the location of the moving objects using the characteristics transformed to the two-dimensional data corresponding to the capturing direction and the capturing range, it is possible to improve the weak point of usual measurement devices and to measure the three-dimensional coordinate of the measurement target moving fast in a wide area precisely.

Next, the display of the data relating to the moving object of the capturing target is described.

Figure 20:
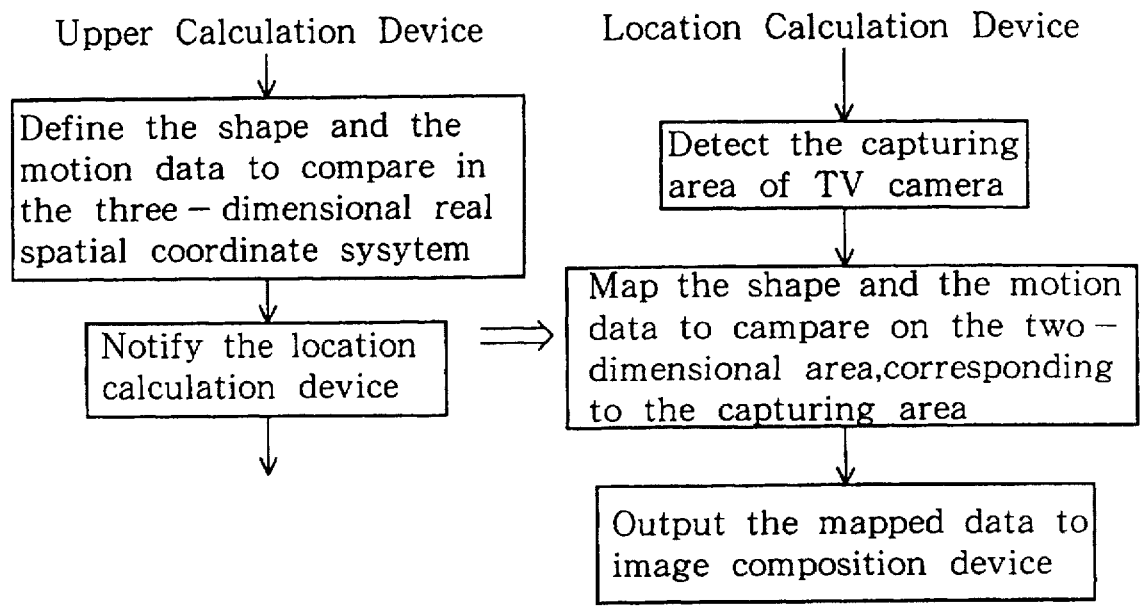
FIG. 20 is a flowchart showing the process of the upper calculation device for overlapping the shape and the motion data to compare with the captured image and the location calculation device.

FIG. 20 shows a flowchart showing the first example of processing of the display of additional data, showing part of the process of the upper calculation device 11 and the location calculation device 26. In this example, the upper calculation device 11 defines the shape and the motion data to compare with the targeting moving object in the three-dimensional real spatial coordinate system, and notifies the location calculation device 26 of it. The location calculation device 26 detects the capturing direction and the capturing range of the video camera 21 in advance, and maps the shape and the motion data in the three-dimensional real spatial coordinate system notified by the upper calculation device 11, to the data of the two-dimensional area corresponding to the capturing area of the video camera 21, and outputs the data to the image composition device 27 so that the mapped data is overlapped with the image signal outputted by the video camera 21.

Figure 21:
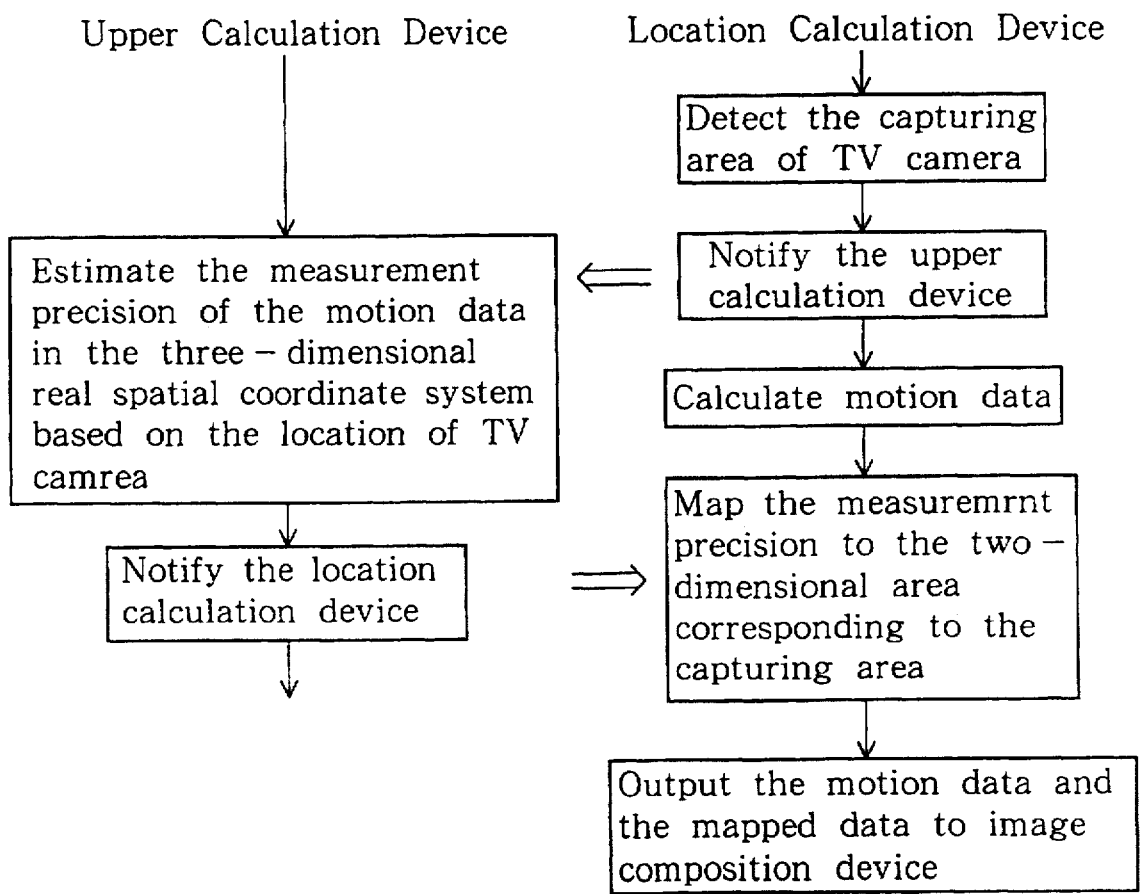
FIG. 21 is a flowchart showing the process of the upper calculation device for overlapping the motion data and its measurement precision with the captured image, and the location calculation device.

FIG. 21 is a flowchart showing the second example of processing to display additional data. Each location calculation device 26 detects the capturing area of the video camera 21 of which it manages, and notifies the upper calculation device 11 of it. The location calculation device 26 also calculates the coordinate and the motion data of the captured moving object. The upper calculation device 11 estimates the measurement precision of the motion data of the location calculation device 26 in the three-dimensional real spatial coordinate system, based on the location of each video camera 21 notified by the multiple location calculation devices 26. The estimation results are sent to each location calculation device 26. Each location calculation device 26 maps the measurement precision to the two-dimensional area corresponding to the capturing area, and outputs the mapped data to the image composition device 27 with the obtained motion data.

Figure 22:
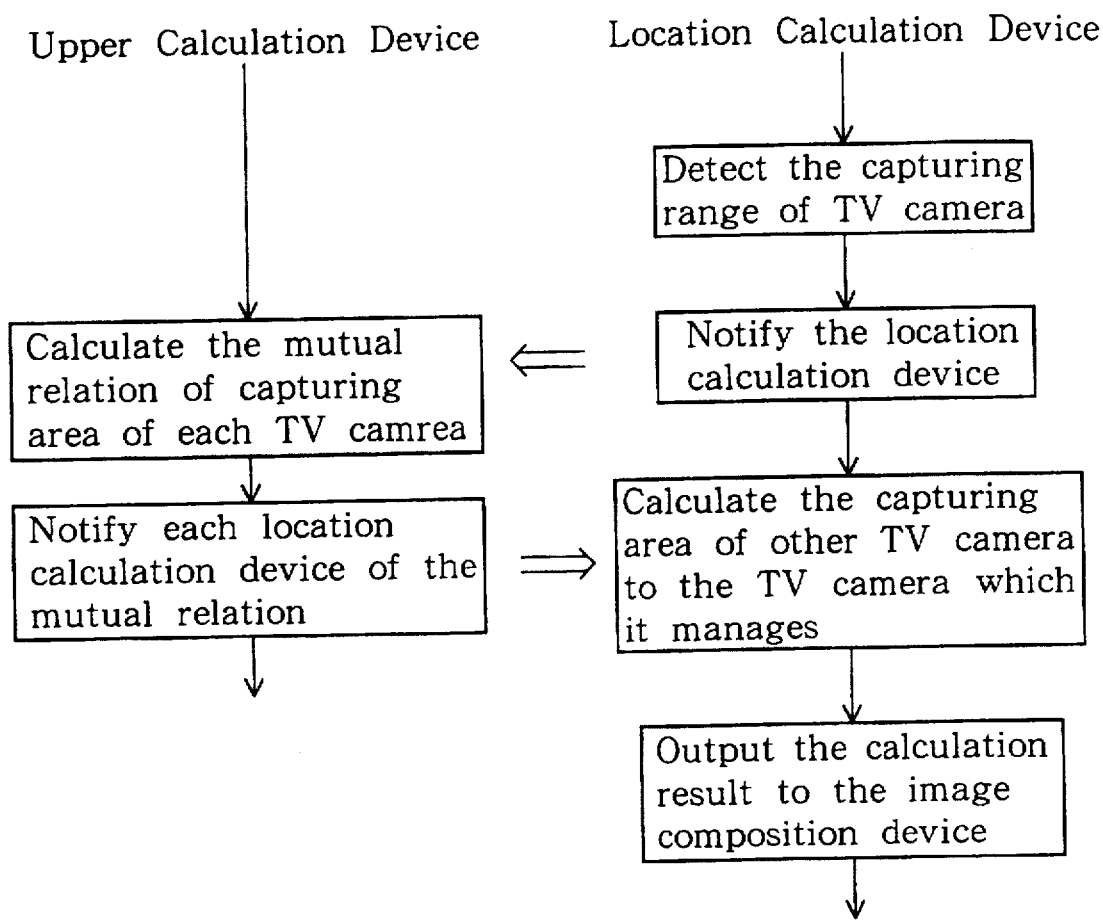
FIG. 22 is a flowchart showing the process of the upper calculation device for overlapping the capturing range of another TV camera with the captured image, and the location calculation device.

FIG. 22 is a flowchart showing the third example of processing to display additional data. Each location calculation device 26 detects the capturing area of the video camera of which it manages and sends it to the upper calculation device 11. The upper calculation device 11 obtains the mutual relationship of the capturing areas of each video camera 21 and sends it to each location calculation device 26.

The location calculation device 26 calculate the image area of other video cameras for the video camera 21 it manages, and outputs the calculation result to the image composition device 27.

In the above processing examples, image signal is overlapped with other data for each camera head/calculation device 12, however, it is possible to overlap other data with only one image signal, and to capture the image signal in the upper calculation device 11 and overlap the data there. Also, the present invention can be embodied if the process sharing of the upper calculation device 11 and the location calculation device 26 is modified.

As described above, the moving object measurement device of the present invention can overlap the additional data for the captured moving object with image signals. For example, it can overlap the shape and the motion data to compare, the measurement precision, or the capturing area of other capturing means, with image signals.

In the embodiments described above, it is possible to control the capturing direction and the capturing range of the capturing device so that the moving object does not move out of the angle of view if it is moving in a wide area, and it is possible to calculate the location of the moving object by utilizing the characteristics data of the three-dimensional movement of the moving object. Therefore, it is possible to measure the three-dimensional coordinate of the measurement target moving fast in a wide area precisely.

However, with the usual technique, of course, and the embodiments described above, it is not possible to obtain the coordinate during the time when the moving object could not be extracted by obstacles, and all it can do is to have the passive way, such as not updating the coordinate data during that period. Also, in the embodiments described above, fast coordinate calculation is done after detecting that the geometric center of gravity of the moving object is in the valid range of centroid calculation in the screen, however, if the background which has the same extraction condition as the moving object is the valid range of centroid calculation, the reliability of the centroid data of the moving object may decrease. The composition which can obtain the coordinate data of high reliability by solving these problems is described below.

Figure 23:
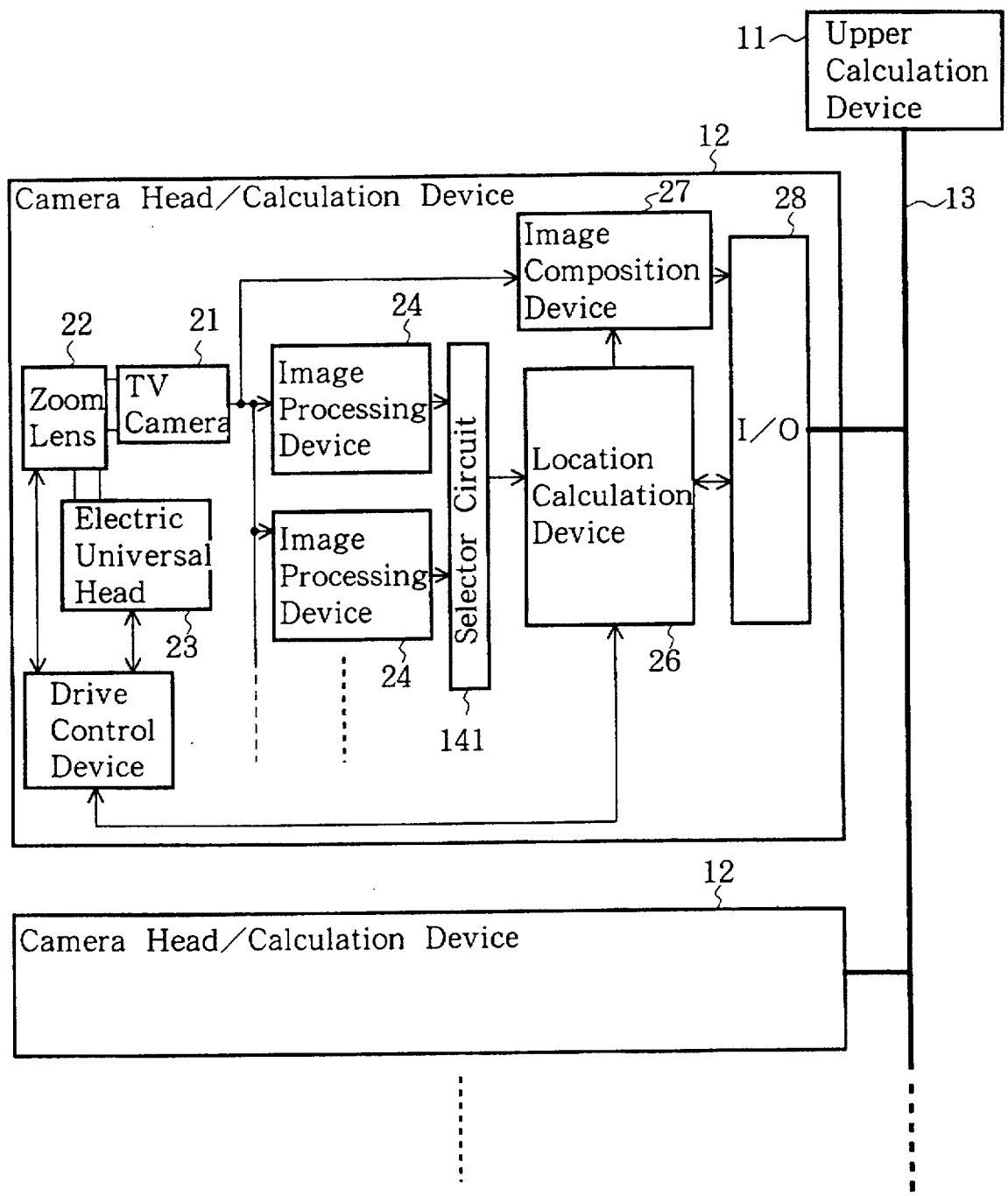
FIG. 23 is a block diagram showing an example of the structure of the measurement device when processing images based on the multiple threshold values for one captured image.

FIG. 23 shows the embodiment which modifies the embodiment shown in FIG. 1. The embodiment provides multiple image processing devices 24 in the camera head/ calculation device 12, wherein the multiple image processing devices have different thresholds which separate the moving object from the background and different valid ranges which can detect the moving object, and provides the selector circuit 141 to select credible location data from the data outputted by the multiple image processing devices 24.

The composition of the image processing device is almost the same as the embodiment shown in FIG. 1, however, it can output area data to show the credibility of the location data.

Figure 24:
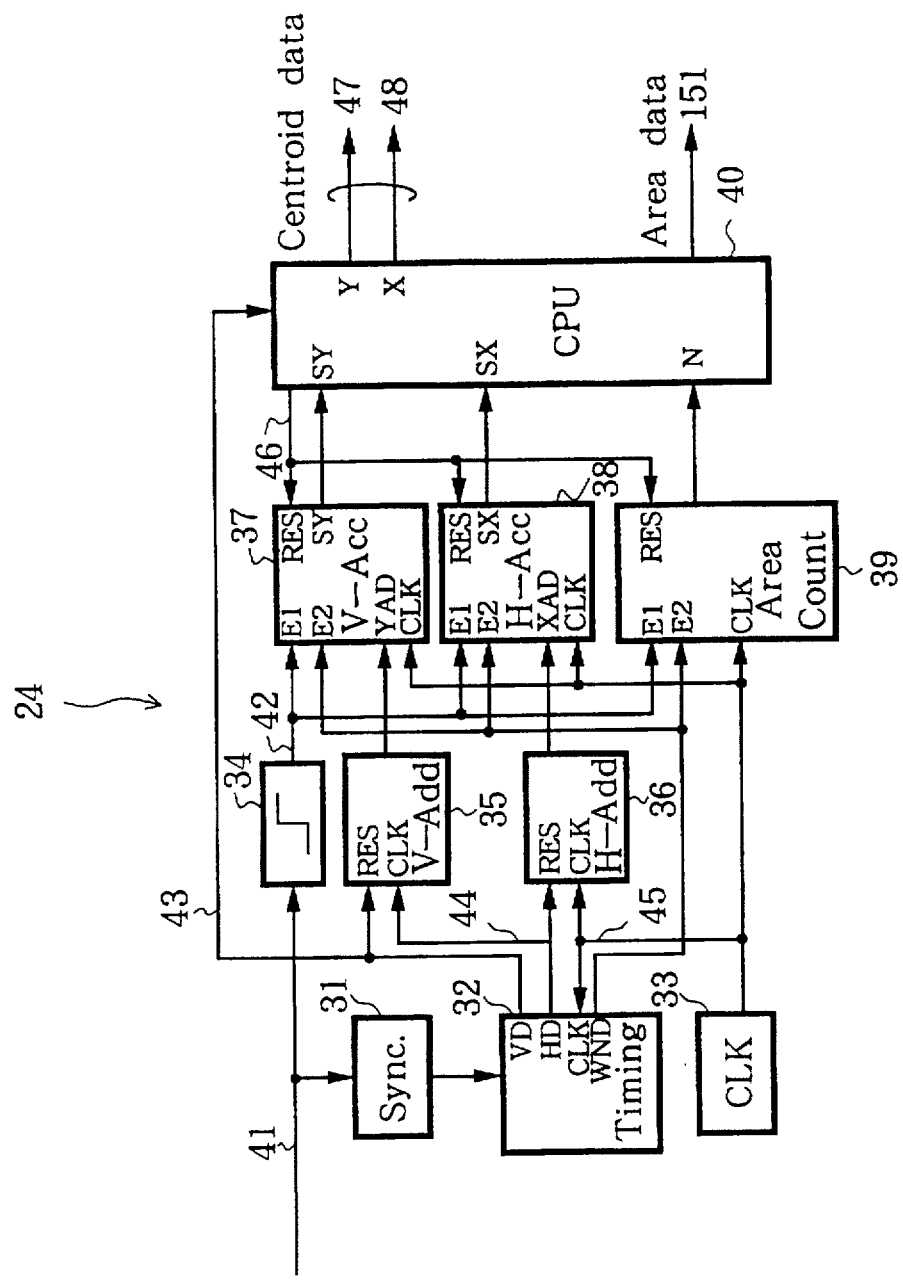
FIG. 24 is a block diagram showing an example of the structure of the image processing device which output the area data as well as centroid data.

It is described by referring to FIG. 24.

FIG. 24 is a block diagram showing the detail of the image processing device 24 used for the embodiment shown in FIG. 23. In this composition, the binarization threshold values in the binarization circuit 34, or the valid ranges in the timing generation circuit 32 are differently set for each image processing device 24. Also, the central processing unit 40 outputs the vertical direction centroid data 47 and the horizontal direction centroid data 48 as the centroid data, and outputs its area data 151.

In this embodiment, it is possible to measure the centroid location by using different binarization threshold values or different valid ranges for the same image signal by connecting multiple image processing devices 15 to one video camera 11. It is described below.

As shown in FIG. 23, in this embodiment, multiple image processing devices 24 are connected to one video camera 21. Each image processing device 24 has an independent binarization threshold value in its binarization circuit 34, or an independent valid range in its timing generation circuit 32. Each image processing device 24 inputs the same image signal from the video camera 21 and obtains the centroid data by using its own binarization threshold value and the valid range. These centroid data are input to a selector circuit 141, and the credible one is selected. The selector circuit 141 captures the centroid data from the multiple image processing devices 24 in various ways: capturing multiple centroid data with time-sharing by switching automatically after the image processing device 24 finished calculating the centroid data, capturing the centroid data by specifying individual image processing device 24, capturing multiple centroid data in parallel using multiple signal lines, etc. By using multiple image processing devices 24 divided for multiple sets, it is also possible to process with different binarization threshold values and different valid ranges for the moving objects as many as the number of the sets.

Though it is not shown in the figure, it is desirable to provide display devices to display the contents of processing of the image processing devices 24 such as binarization threshold values and valid ranges. In such cases, it is not necessary to provide as many display devices as the image processing devices 24. It is desirable to display many functions and states with as few devices as possible because display devices occupy a large volume. For that, it is desirable to display the contents of processing with overlapped and with its display colors changed.

Figure 25A:
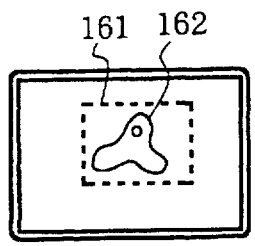
Figure 25B:
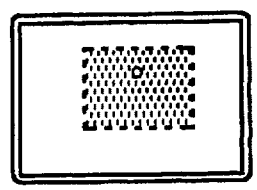
Figure 25C:
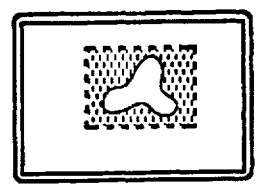
Figure 25D:
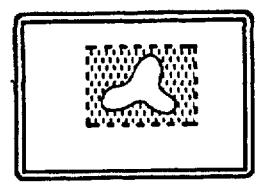
Figure 25E:
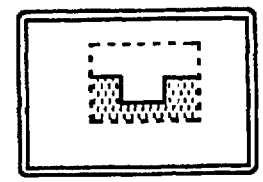

FIG. 25a and FIG. 25e illustrate the results of measurement with the different binarization threshold values for the same valid range for four image processing devices. Here, FIG. 25a shows the input image. FIG. 25b to FIG. 25e show the images obtained using different binarization threshold values. The valid range 161 is common for all four image processing devices, and there is a measurement target 162 in the valid range 161. In the image processing device with its binarization threshold value set higher, as shown in FIG. 25b, the centroid is obtained using only the region of high brightness of the measurement target. In the image processing devices with its binarization threshold value set little higher, or little lower, as shown in FIG. 25c, and FIG. 25d, it is possible to extract the measurement target clearly. In the image processing device with its binarization threshold value set lower, as shown in FIG. 25e, not the measurement target but the background is used to calculate the centroid. Among these example, the centroid data outputted by the image processing device in FIG. 25c and FIG. 25d are credible. Generally, when calculating the centroid for the appropriate binarization threshold value or near that value, the area obtained simultaneously does not change as the binarization threshold value changes if it is near the appropriate threshold value. That is, in practice, it is considered that the centroid is calculated with appropriate binarization threshold value if the binarization threshold value or values near it is used for obtaining the centroid by selecting it with the method considered to be appropriate such as the usual automatic binarization threshold setting method.

There are algorithms to define the binarization threshold value automatically. However, there does not exist an algorithm which is always accurate for all targets. In this embodiment, using multiple image processing devices 24, binarization threshold value is defined by using "Ohtsu method" which gives a stable setting value automatically, for example, for one image processing device, and the binarization threshold value of other grades near the value is used for other image processing devices 24. By doing this, it is expected that some of them have the appropriate threshold value.

When defining the binarization threshold value automatically, even with the "Ohtsu method" and other methods, some statistics about the image, such as the zero-th moment and the first moment of the histogram, are needed, and it requires much time because many floating point number calculations are required. Even if hardware is devised specially for obtaining the statistics, such as a histogram, it requires about 10 msec. for the calculation. Therefore, it is impossible to use the calculation result, which uses the statistics at the N-th field, for the N+1-th field. That is, calculate the setting value at the N+1-th field automatically using the statistics obtained at the N-th field, and use the result for the N+2-th field. When defining the binarization threshold value automatically, the frequency of brightness change of the target is limited to 1~5 Hz, where it does not change largely for at least three fields.

On the contrary, this embodiment uses not only the automatic binarization threshold value, but the binarization threshold values near the value for measuring images. Because of this, it is not necessary to consider the delay of the calculation.

Also, in this embodiment, it is possible to make the size of circuit much smaller than obtaining the center of gravity of the target by using gray scales because centroid data is obtained by binarization. When calculating the location of center of gravity by using gray scales, the location of center of gravity is obtained by adding weight to each pixel based on its brightness which constitute the target. Therefore, in this calculation, the location of center of gravity is not affected by the change of brightness. However, this calculation needs sum of products, so it needs multipliers. On the contrary, in this embodiment, only adders are used in the image processing device 15, therefore, the size of the circuit which uses four or eight adders is smaller than the one which uses multipliers.

The selector circuit 141 uses the area data obtained simultaneously and averages the location of centroid obtained as above, except the one of which area data is close to the area of the valid range or it is too small, and sets it as the final centroid data of the measurement target.

Figure 26A:
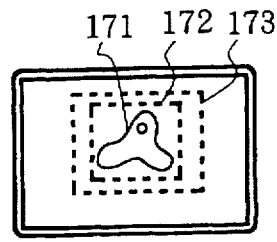
Figure 26B:
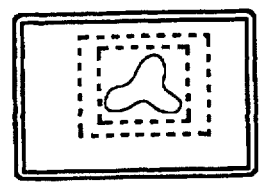
Figure 26C:
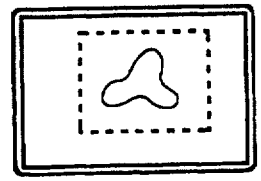

FIG. 26a and FIG. 26c are measurement examples where different valid ranges are used for two image processing devices 24. FIG. 26a is an input image, FIG. 26b and FIG. 26c are the measurement examples of different valid ranges. In these examples, as shown in FIG. 26a, different valid ranges: the first valid range 172 and the second valid range 173, are used for the input image 171. For these two valid ranges 172, 173, images shown in FIG. 26b and FIG. 26c respectively, are obtained. These two valid ranges 172, 173 are defined so that their center position overlap with each other.

When there is no noise around the measurement target, even if different valid ranges are used for two image processing devices 24, the same centroid data is output. Therefore, the selection circuit 141 averages the centroid data output by the image processing devices 24 of which valid ranges are set differently, and treats them as the centroid location data of the measurement target.

Here, it is considered that the noise may have the same brightness or the same color as the measurement target. Normally, these noises can not appear suddenly near the measurement target, however, in most cases, they approach from the location away from the measurement target. In such cases, noises invade the valid range which is set widely, therefore, the area data output by the image processing device of which valid range is set widely becomes large. In such cases, the selection circuit 141 should select the image processing device 24 of which valid range is small among them, and should treat the output centroid data as the centroid location data of the measurement target. Moreover, after that, if the area data output by the image processing device of which valid range is set small becomes larger, it means that the centroid location is calculated using the noises other than the measurement target, therefore, the selection circuit 141 should judge that the reliability of the centroid data becomes low. In such cases, it should indicate that the reliability of the data decreases by, for example, adding a flag to the centroid data output by the location calculation device 26.

Not selecting the output of the image processing device 24 in the camera head/calculation device 12, but, by using the composition shown in FIG. 1, it is also possible to send the output of the image processing device 24 in each camera head/calculation device 24 through the location calculation device 26, the input-output device 28, and the data link 13, to a certain camera head/calculation device 12, and in the location calculation device 26 of that camera head/calculation device 12, select the reliable location data among the outputs of multiple image processing devices 24.

Figure 27:
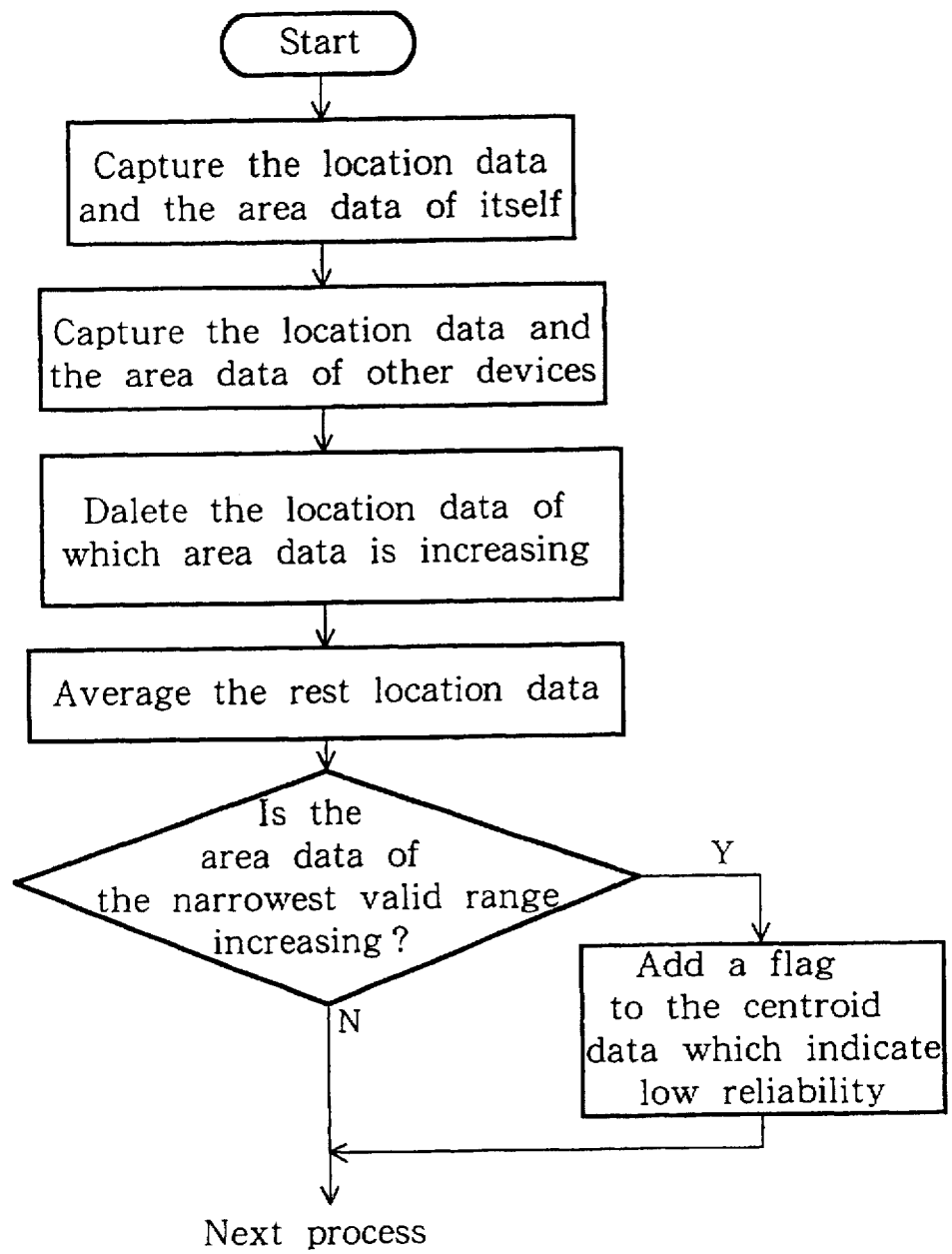
FIG. 27 is a flowchart showing an example of the selection operation of the location data by the location calculation device.

FIG. 27 is a flowchart showing one of the examples of the operation described above, and shows the operation of the location calculation device 26 which select the location data. This operation is essentially the same as the one described referring to FIG. 26a and FIG. 26c, and the valid range of the image processing device 24 of each camera head/calculation device 24, where it is possible to detect the moving object, are different. The location calculation device 24 captures the location data and the area data from the image processing device 245 in the camera head/calculation device 12 of which it belongs, and also captures location data and the area data from other camera head/calculation devices 12. Next, ignoring the location data of which area data is increasing, obtains the average of the location data. It judges that the reliability of the centroid data declines if the area data from the camera head/calculation device 12 of which valid range is set smallest is increasing.

Not only the location calculation device 26 but also the upper calculation device 11 can collect and select the location data.

Figure 28:
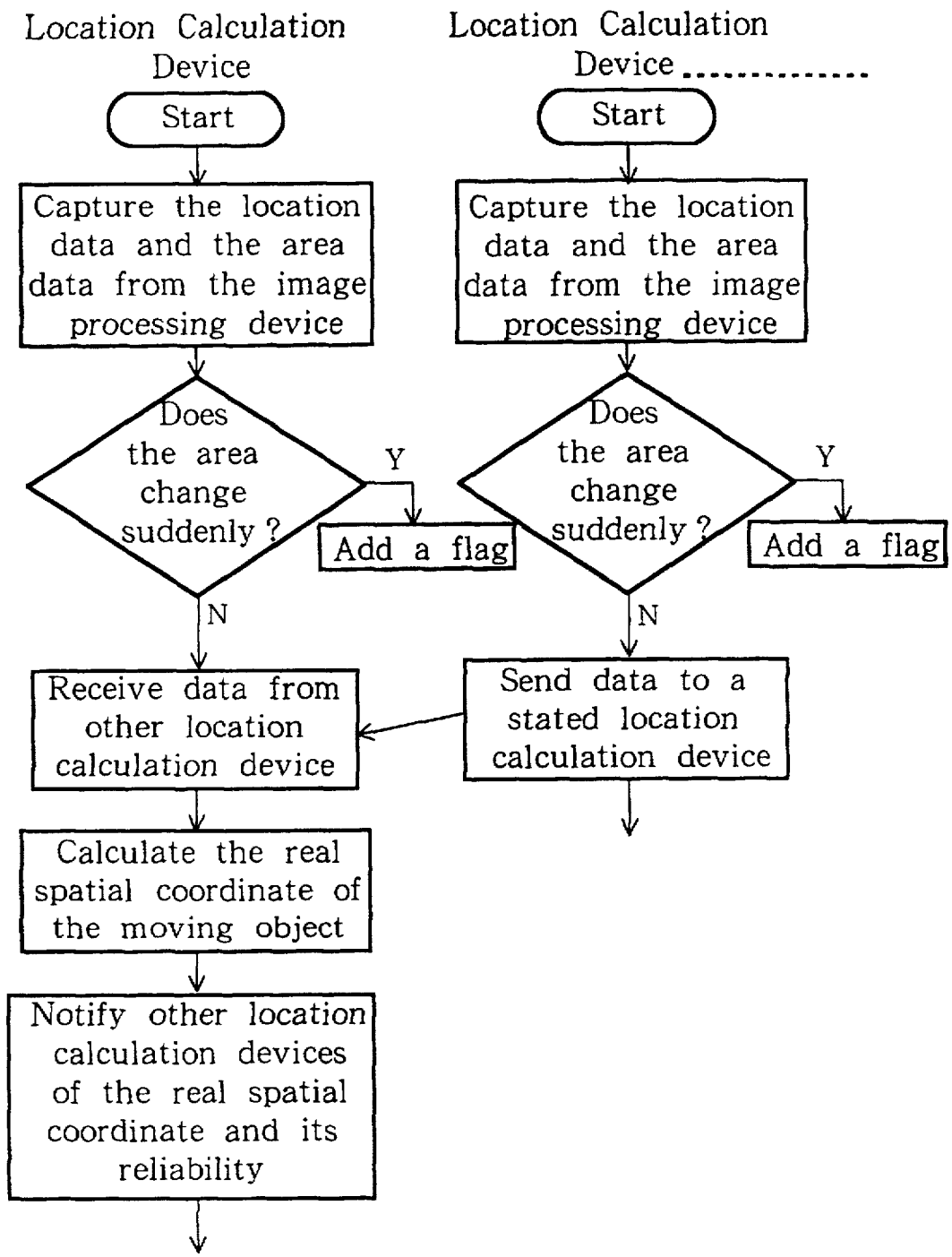
FIG. 28 is a flowchart showing an example of the operation which judge the certainty of the location based on the change of area.

FIG. 28 is a flowchart showing how the location calculation device 26 judges the reliability of the location obtained by the image processing device 24 using the changes of the area obtained by the image processing device 24. The location calculation device 26 transfers data to the location calculation device 26 which is installed in other camera head/calculation device 12 each other, and obtains the coordinate in the real space of the moving object by using the location of each video camera 21 and the location of the moving object in the screen obtained by the image processing device corresponding to it. These calculations are done by one location calculation device 26, and the result is sent to other location calculation devices 26. Also, these calculation can be done by the upper calculation device 11.

FIG. 29, FIG. 30a, FIG. 30c, and FIG. 31 are figures illustrating these operations.

Here, three video cameras are used for measuring the location of one measurement target. FIG. 29 is a plan view showing the measurement condition, FIG. 30a and FIG. 30c are images obtained by the three video cameras respectively, and FIG. 31 shows the change of the area of the measurement target in the three images.

In this example, as shown in FIG. 29, three camera heads 181, 182, and 183 are used to capture the same measurement target 184. Here, assume that there is an obstacle 185 between the camera head 183 and the measurement target 184. The images obtained by the three camera head 181, 182, and 183 are different depending on the direction of it, the capturing range, and the distance to the measurement target. Especially, in the image captured by the camera head 183, part of the measurement target 184 is hiding behind the obstacle 185 as shown in FIG. 30c. FIG. 31 shows the changes of the area data of the moving object C1~C3 obtained by the camera head 181~183. The area data C3, which is obtained by the image of the camera head 183, is decreasing because part of the measurement target 184 is invisible by the obstacle 185 from the time t1 to t2.

The way to measure the coordinate of the measurement target in such cases is explained next. The area of the measurement target obtained by each image processing device 24 using images obtained with the camera heads 181~183 are different depending on the direction, as shown in FIG. 30a and FIG. 30c. Also, they are different depending on the capturing range and the distance to the measurement target of the camera heads 181~183. However, as long as the measurement target is observed properly, the area of the measurement target changes smoothly as time passes. In such cases, as described before, because the three-dimensional coordinate of the measurement target is calculated from the centroid data of the measurement target output by the two camera heads, three three-dimensional coordinates of the measurement target are calculated from the combination of C1 and C2, C2 and C3, and C3 and C1. The three-dimensional coordinate of the moving object can be obtained by averaging them. If the measurement target is interrupted by an obstacle, the area data of the measurement target does not change smoothly as time passes. In this case, the centroid data of the measurement target observed by the camera head 183 is not correct. Then, the coordinate of the moving object can be obtained using only the result of C1 and C2. Using the area data of the measurement target, if the centroid data observed by the two camera heads among three of them is judged to be incorrect, correct three-dimensional coordinate of the measurement target can no longer be calculated. In such cases, if the centroid data of the measurement target has been obtained even if the area is decreasing, three-dimensional coordinate can be calculated by using this, and it should be indicated that the reliability is low by adding a flag.

In this embodiment, the image processing device 24 and the location calculation device 26 are provided for each camera head (video camera 21, the electric zoom lens 22, electric universal head 23, and the drive control device 25), though, it is also possible to connect multiple camera heads and image processing devices 24 to one location calculation device 26.

In the description above, the location of the centroid is used as the location of the moving object measured by the image signal outputted by the video camera. However, by using pattern matching, the location where the shape matches most can be used as the location of the moving object. Also, it is possible to increase the reliability of coordinate data by obtaining the location of moving object in the screen by combining different ways. When pattern matching is used, the reliability of each coordinate data can be judged by referring to the correlation value where the shape matches most. The correlation value can be calculated by the normalized correlation algorithm which is widely known.

In the normalized correlation, the correlation value is between 1 and 0. When the value is decreasing, it is considered that the target are lost, or its state is changing by transformation, and the reliability of the measurement data is considered to be decreasing.

Moreover, if correlation values are used, shapes can be recognized. Therefore, it is possible to calculate the correlation value as the similarity of the shape registered in advance. If it is assumed to be measured correctly when the target seems a triangle, the correlation value by pattern matching with a triangle can be considered as the reliability of the measured location data. When measuring from multiple different directions, the location data from the direction where it seems most triangular can be relied on most. Also, the three-dimensional coordinate can be calculated by selecting the data only from the direction of which similarity to triangle is high.

Also, as the reference patterns for pattern matching, multiple representative patterns from different directions or by transformations can be prepared to cope with the change of the situation. For example, when the human face is a target, the faces from different angles or various expressions can be used as the reference patterns. In this case, among multiple highest correlation values for each reference pattern, the highest correlation value can be used as the reliability of the measurement data, therefore, the location data at that time can be used as the most reliable data.

In the above embodiments, the capturing direction can be changed by using a movable universal head. However, if the capturing range is fixed, it can be embodied in the same way. Also, when measuring with multiple camera heads, by defining capturing ranges differently, it is possible to obtain equivalently different valid ranges even if the valid ranges of the image processing device connected to the camera head are the same size. By using images output by each camera head which capture the measurement target from different direction, and investigating the area data of the measurement target, it is possible to judge from which direction the noise object are approaching to the measurement target.

As described above, the location of the moving object in the screen included in the image signal is obtained by different ways, and the reliable data among the multiple obtained data is selected. The size of the circuit and the software to achieve it is not so large, and yet, it is possible to enhance the reliability of the measured coordinate data.

In order to calculate the three-dimensional spatial coordinate of the targeted object from the captured images, various parameters, such as the coordinate transformation coefficients, for transforming to the three-dimensional real space coordinate based on the information, such as the rotation angle and the location of capturing plane obtained by the camera device and the universal head, are required. However, in the above description, the way to obtain these parameters is not mentioned. Also, because these parameters have errors for each camera head or universal head when they are produced, it is not appropriate to use values when they are designed. In addition, these parameters change as time passes or the temperature changes. Therefore it is necessary to obtain these parameters without decomposing devices on the spot.

Also, to obtain these parameters precisely means to enhance the measurement precision of the moving object, and also, it is necessary to enhance the precision of auto-tracking control when the moving object is captured with auto-tracking, and also, it is necessary to obtain the parameters which are different for each device, on the spot.

Next, the embodiments for solving these problems and obtaining three-dimensional spatial coordinate information precisely, the embodiments where it is possible to obtain the coordinate transformation matrices for calculating the three-dimensional spatial coordinate of the moving object while capturing, and the embodiments where it is possible to track the moving object precisely, are described. Here, the measurement targets are for sports, such as swimming, and the vertical movement of athletes are smaller than the horizontal movement, and it can be considered as a flat plane.

Figure 32:
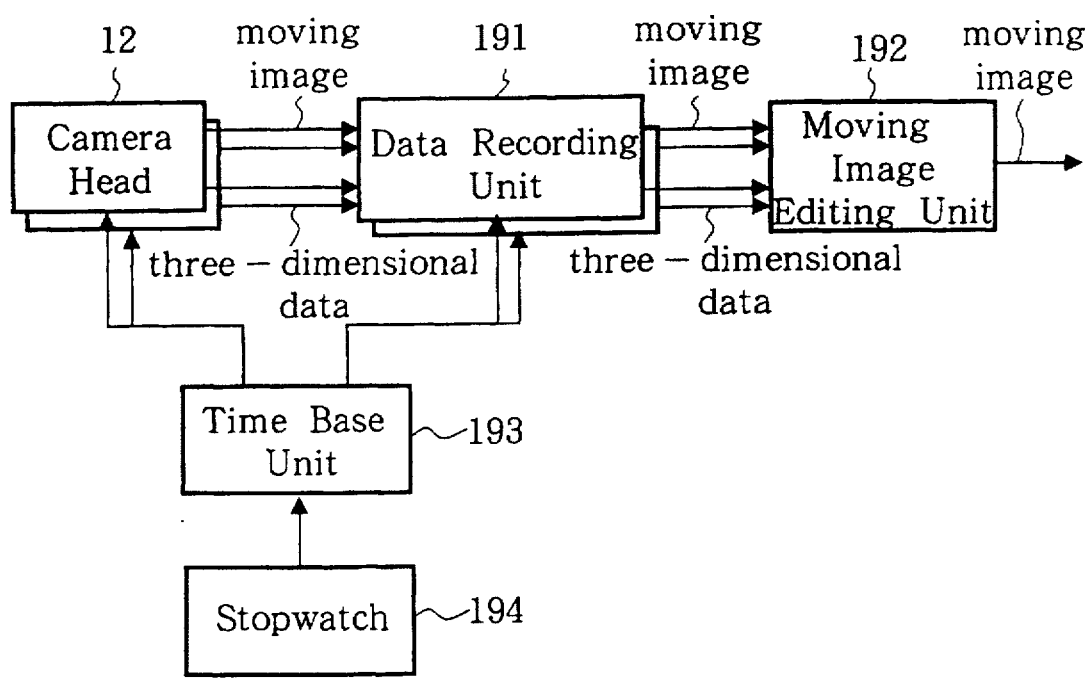
FIG. 32 is a block diagram showing the upper calculation device in the embodiment shown in FIG. 1 and FIG. 26 in detail.

FIG. 32 shows a block diagram showing more detail of the upper device 11 in the embodiment shown in FIG. 1. The upper device 11 provides the data recording unit 191, the moving image editing unit 192, the time base unit 193, and the stopwatch 194 for managing time.

Figure 33:
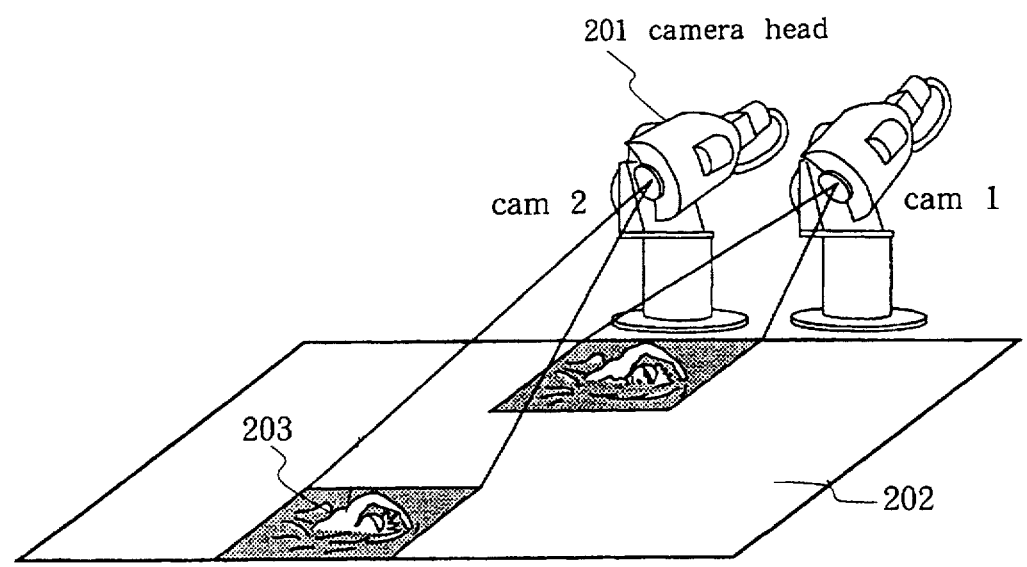
FIG. 33 is a figure illustrating the appearance when capturing moving objects.

FIG. 33 shows a capturing system. The three-dimensional location of the targeted object 203 is measured with the camera head 201 with its images simultaneously. Also, the camera head 201 moves automatically with the movement of the targeted object 203, and tracks the targeted object.

The movement of the targeted object 203 can be considered to be a flat plane 202. If the location of the camera head 201 from the flat plane 202 and the direction of the targeted object 203 from the camera head 201 are known, it is possible to obtain the three-dimensional location of the targeted object by obtaining the intersection of the flat plane and the straight line. Also, simultaneously, it is possible to calculate the part of the flat plane 202 where it is captured from the angle of view of the lens.

Figure 34:
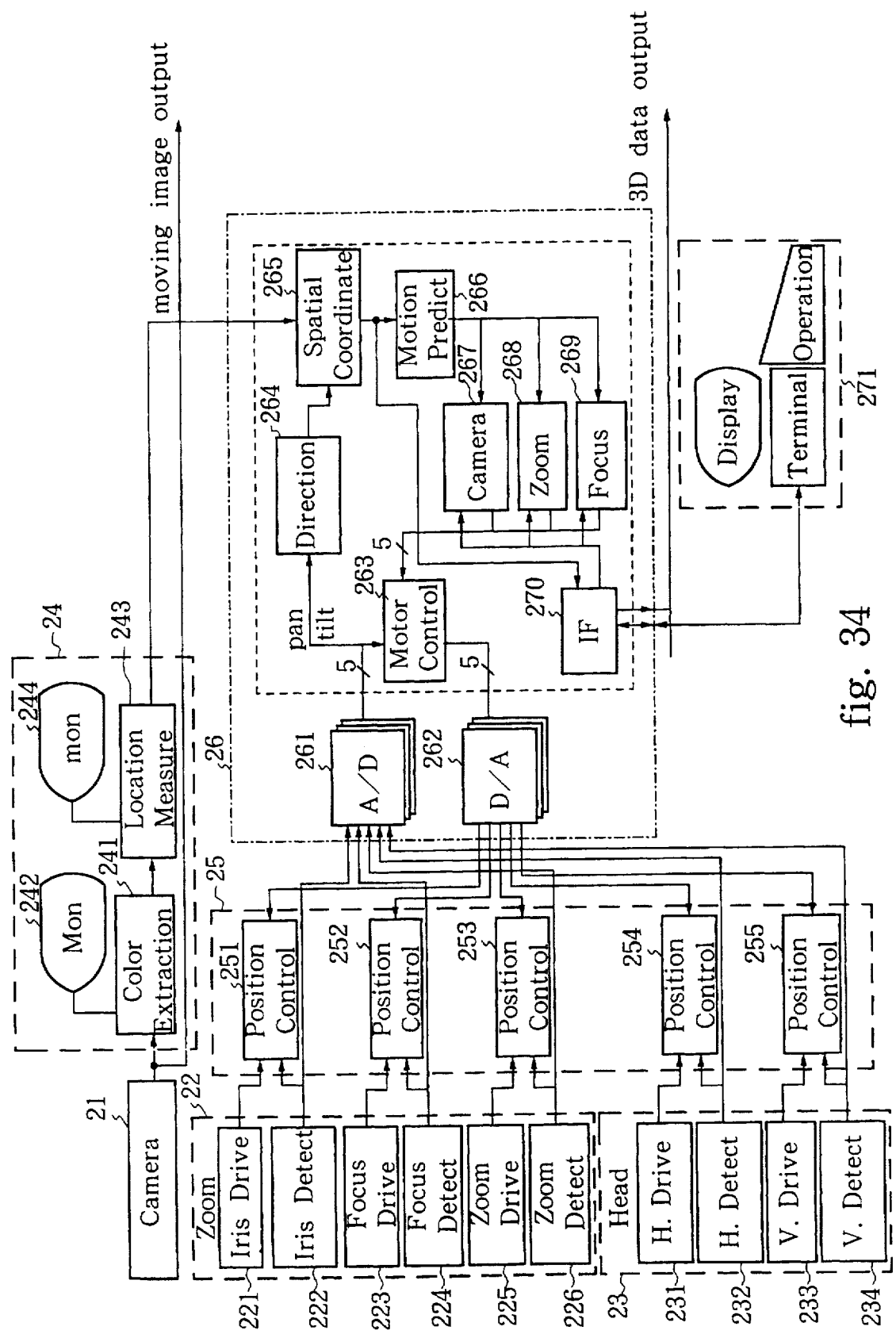
FIG. 34 is a block diagram showing the detail of the camera head/calculation device.

FIG. 34 shows more detail of the composition of the camera head/calculation device 12. Here, a color video camera is used as the video camera 21.

The output of the video camera 21 is provided to the data recording unit 191 or moving image editing unit 192, as a moving image through the image processing device 24. The image processing device 24 includes a learning color extraction device 241 which extracts the targeted object from the background, and the image location measurement device 241 which calculates the location of the subject in the screen. The viewing TV monitor 240 is connected to the learning color extraction device 241, and the operation TV monitor 244 is connected to the image location measurement device 243. The output of the image location measurement device 243 is input to the spatial coordinate calculation circuit 265 which calculates the spatial coordinate of the targeted object in the location calculation device 26.

The electric zoom lens 22 includes an iris driving motor 221, the iris position detection potentiometer 222, the focus driving motor 223, the focus position detection potentiometer 224, the zoom driving motor 225, and the zoom position detection potentiometer. The electric universal head 23 includes universal head horizontal axis driving motor 231, universal head horizontal axis position detection potentiometer 232, the universal head vertical axis driving motor 233, and universal head vertical axis position detection potentiometer 234.

The drive control device 25 includes a position control servo circuit 251–255, and the control output of the location calculation device 26 is lead to these position control servo circuits 251-255. The position control servo circuit 251-255 are used for position control of the iris driving motor 221, focus driving motor 223, zoom driving motor 225, universal head horizontal axis driving motor 231, and the universal head vertical axis driving motor 233, respectively.

The location calculation device 26 includes an A/D converter 261 which converts the outputs of iris position detection potentiometer 222, focus position detection potentiometer 224, zoom location detection potentiometer 226, universal head horizontal axis location detection potentiometer 232, and the universal head vertical axis position detection potentiometer 234, to digital signal. The control signal to each motor is output to the position control servo circuits 251-255 from the D/A converter 262.

The location calculation device 26 includes the camera's direction calculation circuit 264 which calculates the direction of the video camera 21 based on the output of the A/D converter 261, the spatial coordinate calculation circuit 265 which calculates the three-dimensional spatial location coordinate of the targeted object based on the output of the above camera's direction calculation circuit 264 and the output of the image location measurement device 243, the movement prediction circuit 266 which predict the moving location of the targeted object based on the above calculation output, the camera's direction decision circuit 267 which decide the direction of the video camera based on the above movement prediction result, zooming decision circuit 268 which decide the value of zoom of the electric zoom lens 22, and the focus decision circuit 269 which decide the value of focus. The outputs of these circuit 267-269 are input to the motor control circuit 263 which decide the control value for each motor. The motor control circuit 263 decides the control value for each motor, and outputs the control signal to each location control servo circuits 251-255 through the D/A converter 262.

The calculated three-dimensional spatial location coordinate of the moving object is output to the data recording unit 191 or the moving image editing unit 192 as the three-dimensional data output from the interface 270. The interface 270 is connected to the control terminal device 271 which includes the display unit which displays the location of the targeted object, the terminal device, and the operation unit, and it gives the control signal given from there to the direction decision circuit 267, zoom decision circuit 268, focus decision circuit 269, for each camera. As described here, it is possible to operate manually in this embodiment.

The focus of the lens of the video camera 21 can be fixed, though, zoom lenses may be better if a wide area is captured. In this embodiment, the electric zoom lens 22 is provided with a potentiometer, by which it is possible to always obtain the current angle of view by reading the voltage of the rotation angle of zoom ring. Also, it composes the servo by using the data, and it is possible to move the zoom to any position specified by the location calculation device 26. In this example, potentiometers are used for the sensor of rotation angles, however, anything else, such as rotary encoders, can be used. In this example, the angle of view of the lens is detected mechanically by the rotation angle of the zoom lens. However, other methods which do not affect the image can be used for measuring optically in real time, such as, using the part where it is not captured, using the wave length of which sensitivity is zero for the camera's device, or using blanking period.

The angle of view of the lens is mechanically connected to the output of the sensor. Therefore, they have variance and secular changes. Variance can be treated by checking in the factory or by having correction data. As for secular changes, it is possible to modify the correction data by capturing the object of which size is known while changing the zoom, when the camera head is calibrated for the three-dimensional coordinate calculation.

The lens, the focus, and the iris include a motor and a potentiometer, and the servo is provided. They can be moved by the location calculation device 26 as well as the zoom, and the location calculation device 26 can obtain the current value. A so called auto-focusing algorithm can be used for controlling focuses, such as by checking the high-frequency component of the image obtained by the camera. However, in this system, because the three-dimensional location of the targeted object is known and the distance between the camera and the targeted object can be calculated, it can be controlled based on the distance. Also, similarly, irises can be controlled based on the image of the camera. However, a so called auto-iris algorithm is not optimal when direct reflection of the lighting comes in, in swimming, etc. Here, beforehand, an illuminance map of the pool is created by measuring the illuminance entirely or at some points of the movable range, or the pool, of the targeted object. Then iris is controlled based on the location of the targeted object. White balance can be used in the same way. If the lighting is uniform, white balance can not change. However, if there are multiple lightings of which color temperatures are different, then it is necessary to change the white balance based on the spot. With the algorithm for auto-white balancing using captured images, it is difficult to treat the image which is occupied with a single color other than white, such as a pool. In this example, in the same way as the control of irises, the white balance of a camera is adjusted by generating a map of white balance on the entire pool.

As described above, the electric universal head can change its direction of the camera on the pan direction of the horizontal direction and the tilt direction of the vertical direction. A potentiometer is provided for each axis, by which it is possible to obtain the current direction of the camera. Also, like the lenses, a servo system is provided, and it is possible to move it to any direction by the head controller. Not like the lens system, universal heads have large inertia, therefore, it takes time to get to the location specified by the servo circuit. Therefore, not the location specified to the servo system, but the value of the potentiometer is used to obtain the direction of the camera to synchronize images. Here, potentiometers are used as the rotation angle sensor, however, anything else, such as optical rotary encoders, can be used as long as it can obtain the angle information.

As shown in FIG. 34, the location calculation device 26 provides five A/D converters 251 for reading potentiometers and five D/A converters 262 for generating voltages for specifying location to the servo system. In this example, analog voltage is used as the interface to the servo system, however, parallel or serial digital signal can be used.

Next, auto-tracking control is explained.

In auto-tracking, it is necessary to separate the targeted objects and the background in the image obtained with a camera automatically. In this example, a color video camera is used as the video camera 21, and the learning color extraction device 241 separates it by using colors. The target object has a color that the background does not have, such as a swimming cap. Normally, swimming caps have conspicuous colors in the swimming pool, therefore, it is appropriate to use it to separate from the background. Also, in this example, colors are used to separate the targeted objects from the background. However, brightness or correlation with some specific patterns can also be used. The location of the targeted object, which has been separated from the background, is calculated by the image location measurement device 243. In this example, the location of the centroid of the separated object in the image is calculated.

Auto-tracking controls the universal head and the lens so that the center of image is always captured at the specific position.

By using only the data of image location measurement device 243, when controlling the universal head so that the difference of the location of the targeted object in the image and the objective location decreases, if the distance between the targeted object and the camera changes, or the zoom of the lens changes, the ratio of the difference in the screen and the rotation of the universal head may change, therefore, it is difficult to control optimally because the gain in the control loop will change. Therefore, in this example, the three-dimensional location measurement of the targeted object and the control of the universal head are separately done, as follows.

First, the actual three-dimensional location of the targeted object is obtained from the location of the targeted object in the image and the parameters of lens. Next, the direction and the slope of the camera where the obtained three-dimensional location is on the targeted location, such as the center of image, is calculated. Then the universal head is controlled so that the camera is directed to that direction. Also, in this example, because the movement of the targeted object is limited to a flat plane, the location of the targeted object in the constraint plane is calculated. Thus, if the location of the targeted object is known, then the distance between the targeted object and the camera is known, and the focus of the lens can be controlled so that it matches the distance. Also, the zoom is controlled based on the distance so that the targeted object is captured in about the same size.

When it is controlled, the objective value is specified by the voltage to the servo system. If it is specified at the interval of 1/60 of a field, it is too long to control smoothly. Because the three-dimensional location of the targeted object can be measured at the interval of no more than one field, the movement of the targeted object in the three-dimensional space is predicted. By using this predicted value to specify objective value to the servo system, it is possible to narrow the interval regardless of the field cycle. In this example, it is about 4 m sec. interval, and it is possible to get smoother movement by specifying objective value 4 times for each field. The first order interpolation, where the difference at the previous field is extended as it is, is used to predict the movement of the targeted object, however, it is also possible to use the prediction method which comply with the physical low if the characteristics of the targeted object is known, for example, when the moving object is always forced with gravity in the gravity field. It is also possible to predict with Kalman filter.

Figure 35:
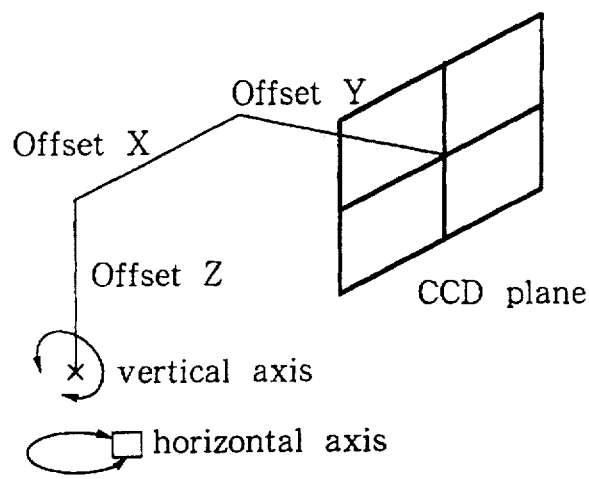
FIG. 35 is a figure showing the relation of the capturing plane of the camera and the coordinate system.
Figure 36:
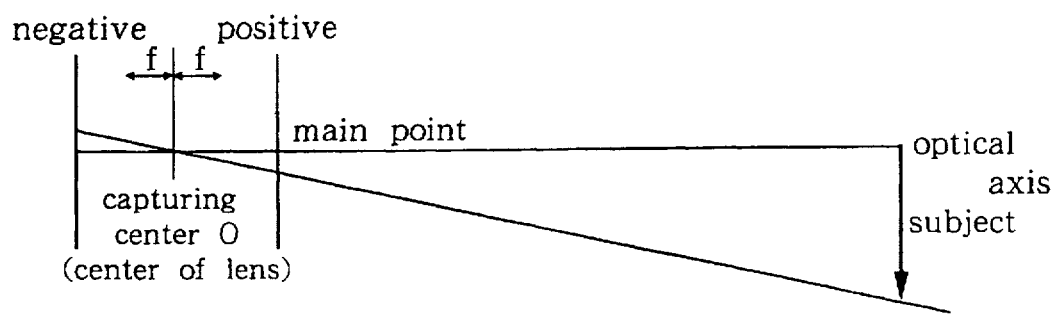
FIG. 36 is a figure showing the relation of projection of the subject based on the pin-hole camera model.
Figure 37:
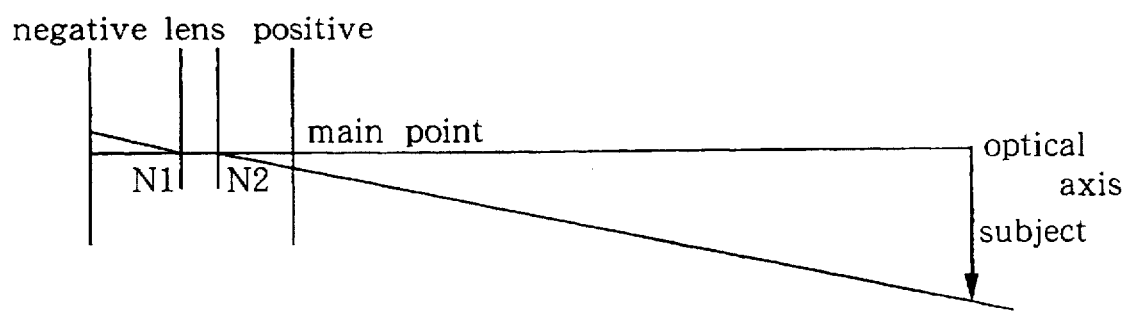
FIG. 37 is a figure showing the relation of projection of the subject based on the zoom lens.

Next, the method to calculate the three-dimensional coordinate of the targeted object is described. Here, a right-hand coordinate system is used as the coordinate system, and the rotation center of the universal head is on its origin. The Y axis is set perpendicularly to the constraint plane where the targeted object is moving. Two axes of the universal head are assumed to be 0 degree for Y axis direction.(If two axes are both 0 degree, the optical axis of the camera is parallel to Y axis.) As shown in FIG. 35, the capturing plane of the camera (CCD plane) is on the location at OffsetX, OffsetY, OffsetZ, for X,Y,Z direction respectively, from the rotation center if two axes of the universal head are 0 degree. As shown in FIG. 37, two projection centers: N1 and N2 must be considered for zoom lens. However, to make calculation easy, in this example, the distance to the subject is assumed to be much longer than the distance of N1 and N2, and by using the approximation that one thin lens is used for the projection center, and the ray is near the axis, a pinhole camera model as shown in FIG. 36 is used. In the actual capturing system, the lens is not so ideal, but has non-linearity. To consider the non-linearity, instead of linear numerical calculation, it is necessary to process a large numeric table. But if the auto-tracking is controlled well so that the targeted object is at the center of the image, it is possible to use the part of the lens which has the best characteristic of the lens because the three-dimensional location measurement target is near the center of the lens. Therefore, it is not difficult to select a lens which is well enough if it is approximated linearly to obtain the optical precision higher than the strength of the place where the universal head is installed or the precision of the angle sensor.

Figure 38:
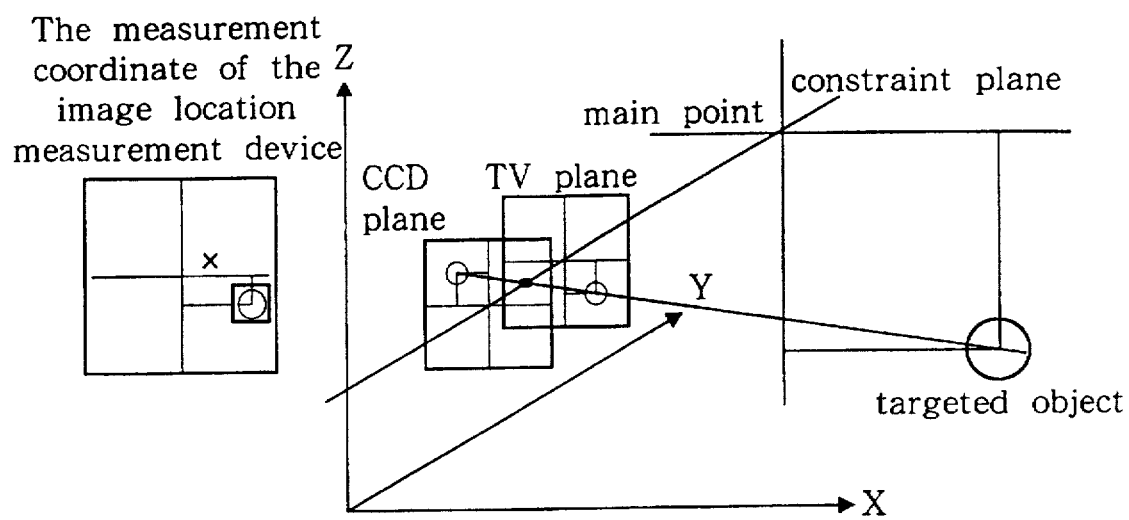
FIG. 38 is a figure showing the transformation of the subject to the VT plane by the image location measurement device.
Figure 39:
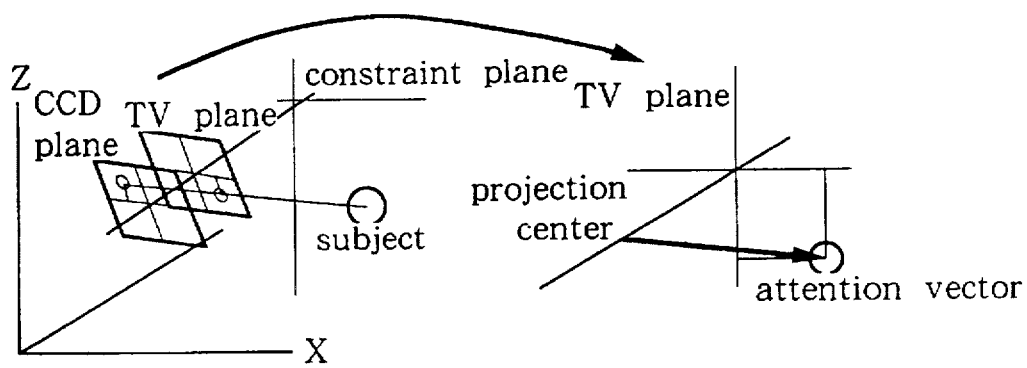
FIG. 39 is a figure showing the attention vector of the subject.
Figure 40:
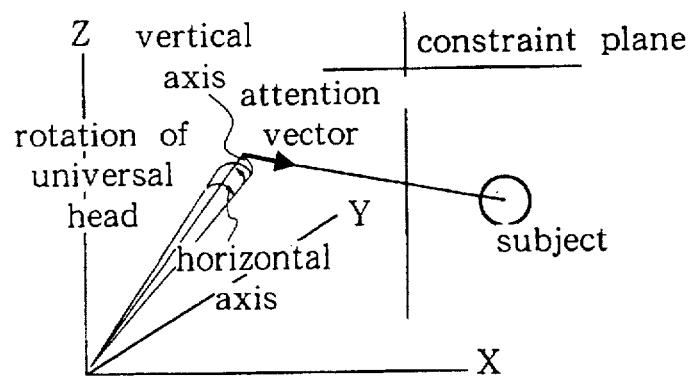
FIG. 40 is a figure showing the relation of the attention vector and the subject on a constraint plane.
Figure 41:
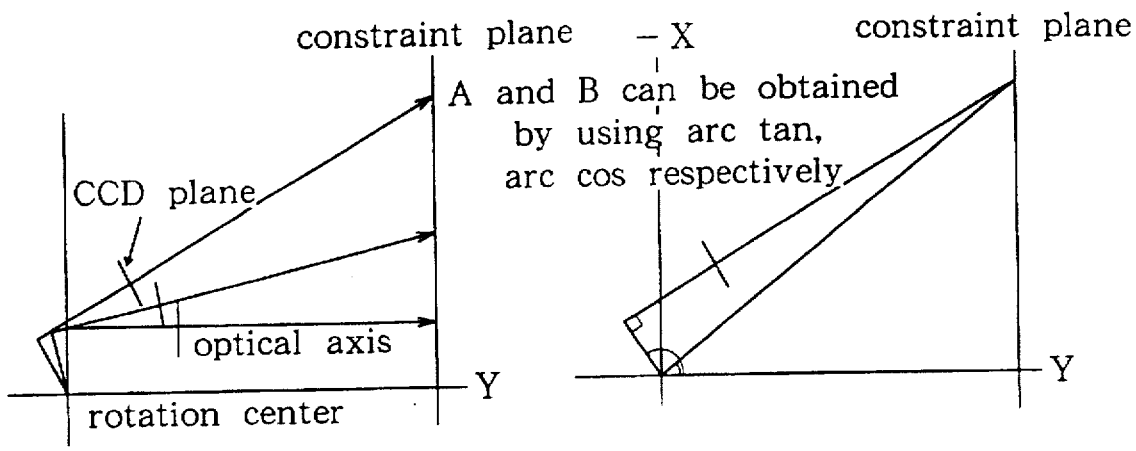
FIG. 41 is a figure showing the calculation of the three-dimensional spatial coordinate of the subject.
Figure 42:
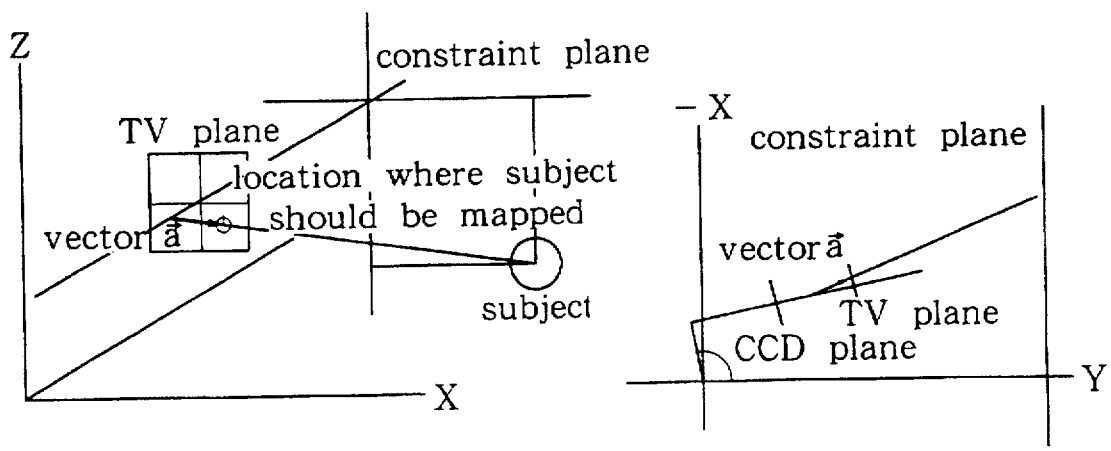
FIG. 42 is a figure showing the calculation of the three-dimensional spatial coordinate of the subject.

To obtain the three-dimensional spatial coordinate of the targeted object, as shown in FIG. 38, obtain the location of the targeted object in the screen with the image location measurement device, and transform the location to the location on the projection plane (plane VT) which is a flat plane in the space of the image location measurement device. Here, because the plane VT is on the point symmetry of the projection center to the COD plane, the size of the image on the plane VT is the same as the size of the image which is formed with the lens on the capturing device. Also, because the center of the image does not always agree with the intersection of the optical axis and the projection plane (main point), it is necessary to correct the gap by moving the location of the image location measurement device in parallel. As shown in FIG. 39, assume a vector from the projection center to the location of the targeted object on the plane VT and call it the attention vector. Next, rotate the attention vector as much as the slope of the universal head at the center on the rotation center of the universal head. As shown in FIG. 40, the location of the targeted object in the three-dimensional space is the intersection of the line which is extending the attention vector and the constraint plane. Also, instead of the attention vector, by using the vector to four corners of the plane VT, it is possible to calculate the visual field of the constraint plane which shows the captured range. Next, assuming that the objective point is on the obtained three-dimensional spatial location of the targeted object, obtain the angle to control the universal head so that the objective point is captured on the specified spot in the screen such as the main point. When it is brought to the main point of the image, obtain the rotation angle of the two axes of the universal head where the center line of the camera which passes on the main point is crossing on the objective point on the constraint plane as shown in FIG. 41. In FIG. 41, angle A can be obtained with arc tangent using the distance to the constraint plane and the distance from Y axis of the objective point on the constraint plane. Simultaneously, the distance d which is from the rotation center to the objective point can be obtained. Angle B can be obtained with arc cosine using the distance d and the distance from the rotation center of the camera center line. If it is brought to the point other than the main point, obtain the rotation angle where the vector a, which is from the projection center to the specified point on the plane VT as shown in FIG. 42, is crossing on the objective point on the constraint plane.

Thus, the servo circuit 20 can be controlled so that the calculated rotation angle is achieved.

Next, parameters actually used are described. In the calculation of the spatial coordinate described so far, and the calculation of the rotation angle of the universal head, there are parameters, such as the coefficients, to transform the location of the projection center, the location of the capturing plane, and the coordinate obtained by the image location measurement device, to the actual spatial coordinate. These parameters deeply affect the precision, and therefore, they must be obtained precisely to gain high precision. However, these parameters always have errors in production, and they may vary when carried. Moreover, when they are operated, various accelerations are added and secular changes and temperature changes are considered. Therefore, it is not good to keep using the value when they are designed. Therefore, in the present invention, these parameters are measured while they are operated, without decomposition. The method for the measurement is described as follows.

The main point is a point which does not move in the image if zoom is changed. Change the zoom so that the fixed targeted object is captured on the temporary main point. If the location in the image has changed by the change of zoom, it means that it is not on the right main point, therefore, change the temporary main point and search for the point which does not change by the zoom.

The projection center and the transformation coefficient of the coordinate of the image location measurement device depend on each other, and if either of them is not obtained precisely, it is impossible to obtain another. Therefore, obtain the temporary coordinate transformation coefficient and the location of the projection center by using design values, etc. Capture the reference point fixed on the constraint plane as the targeted object. Next, rotate and calculate while changing the projection center and the coordinate transformation coefficient gradually. Because the point is fixed, the correct projection center and the coordinate transformation coefficient can be obtained as the constant value which does not depend on the angle of the rotation axis. Here, the zoom is not changed yet. If the zoom is changed, the location of the projection center moves, therefore, next obtain the projection center corresponding to each focus distance while changing the zoom by using the obtained coordinate transformation coefficient.

Here, an example of actual parameters is shown. The zoom of the lens is changed by rotating the zoom ring with a motor, and the rotation angle detected as the voltage with the zoom position detection potentiometer 126, and is read as the digital value with the A/D converter 23. Therefore, the controller can obtain the value of the A/D converter 23 only. The location of the projection center is a function of the zoom of the lens. Therefore, in order to obtain the actual location of the projection center, first obtain the value of the A/D converter 23 of the zoom of the lens. As described above, in the present invention, basically, parameters are actually measured. Therefore, it is not practical to measure all the value of the A/D converters and the location of the projection center because it takes too much time.

Figure 43:
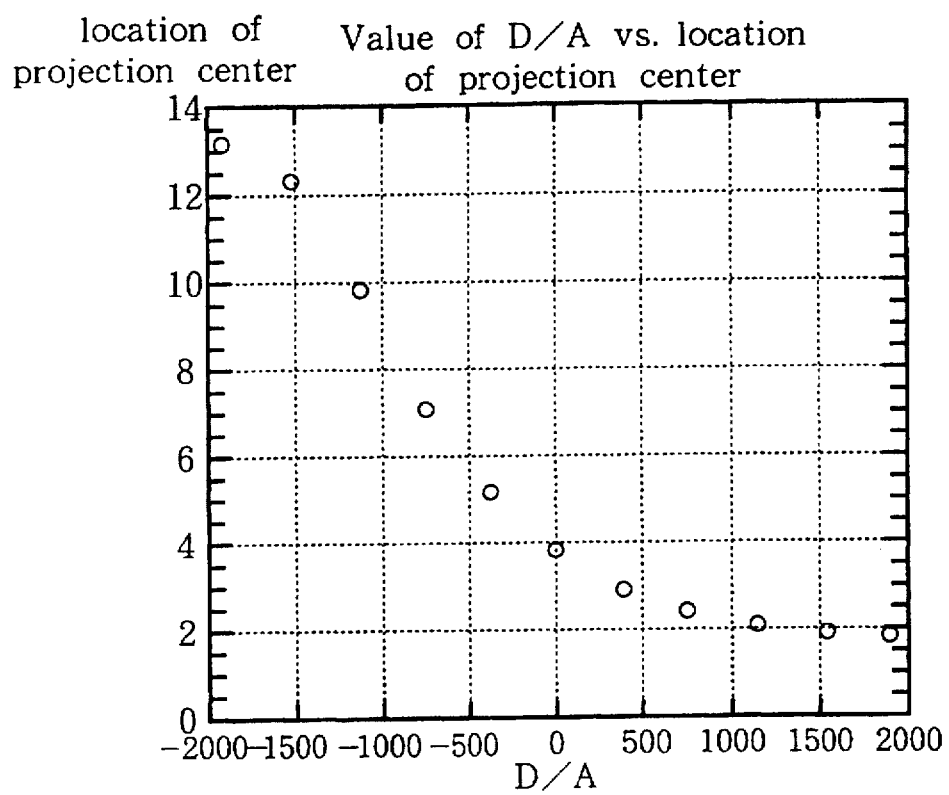
FIG. 43 is a figure showing an example of the observed values of the relation of the value of the A/D converter and the location of the projection center.
Figure 44:
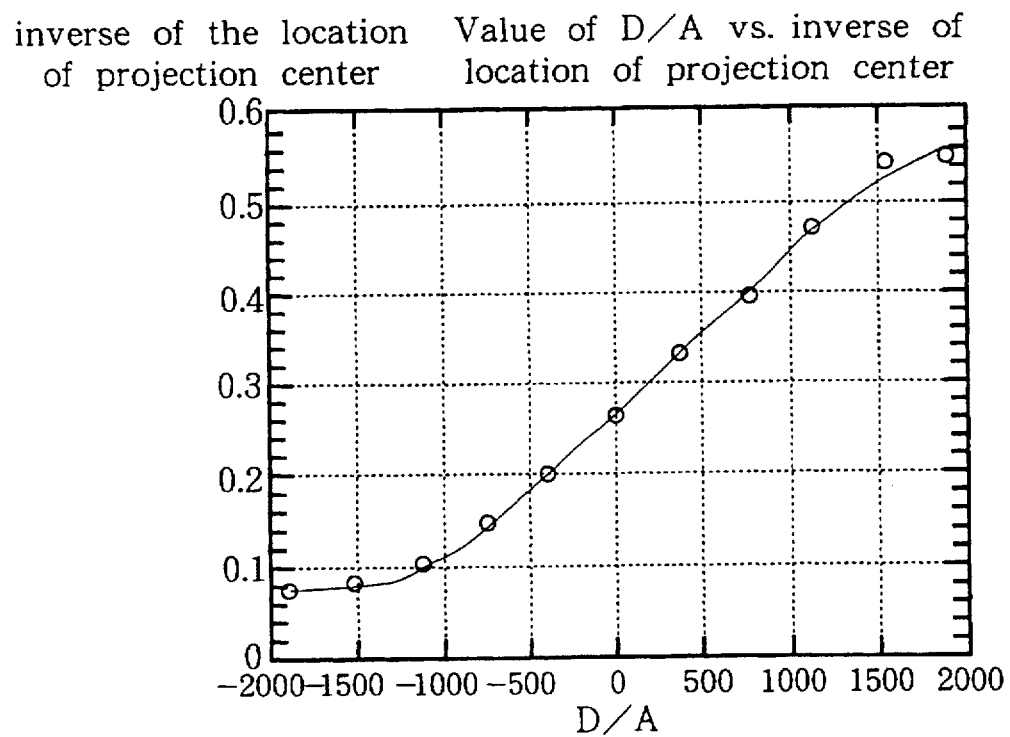
FIG. 44 is a figure showing an example of the relation of the value of the A/D converter and the inverse of the location of the projection center.
Figure 45:
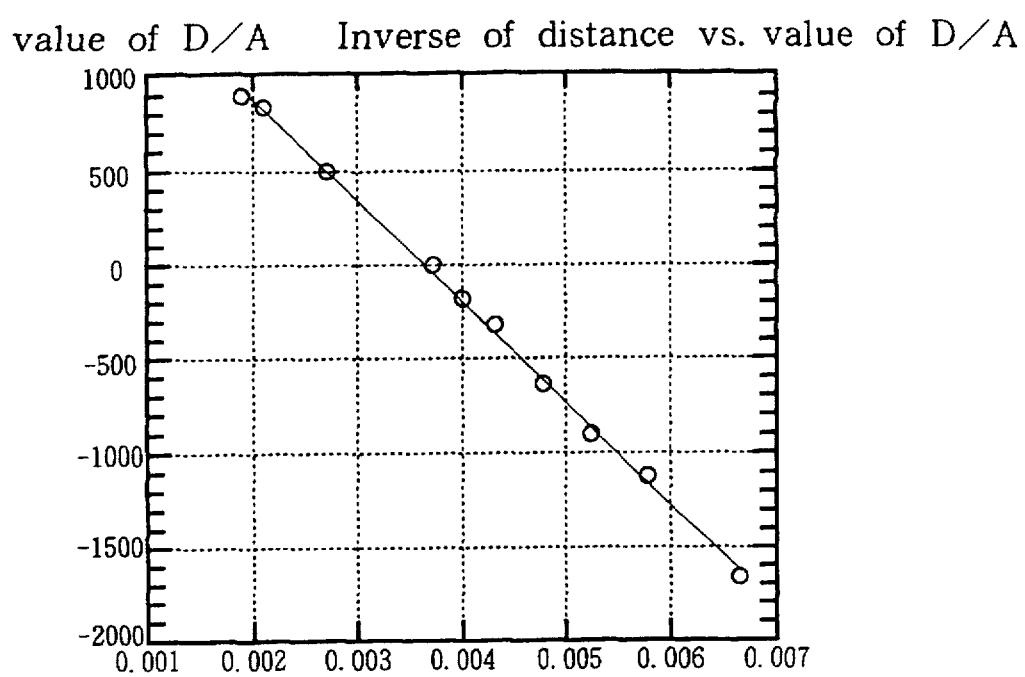
FIG. 45 is a figure showing the relation of the inverse of the distance and the value of the A/D converter.
Figure 46:
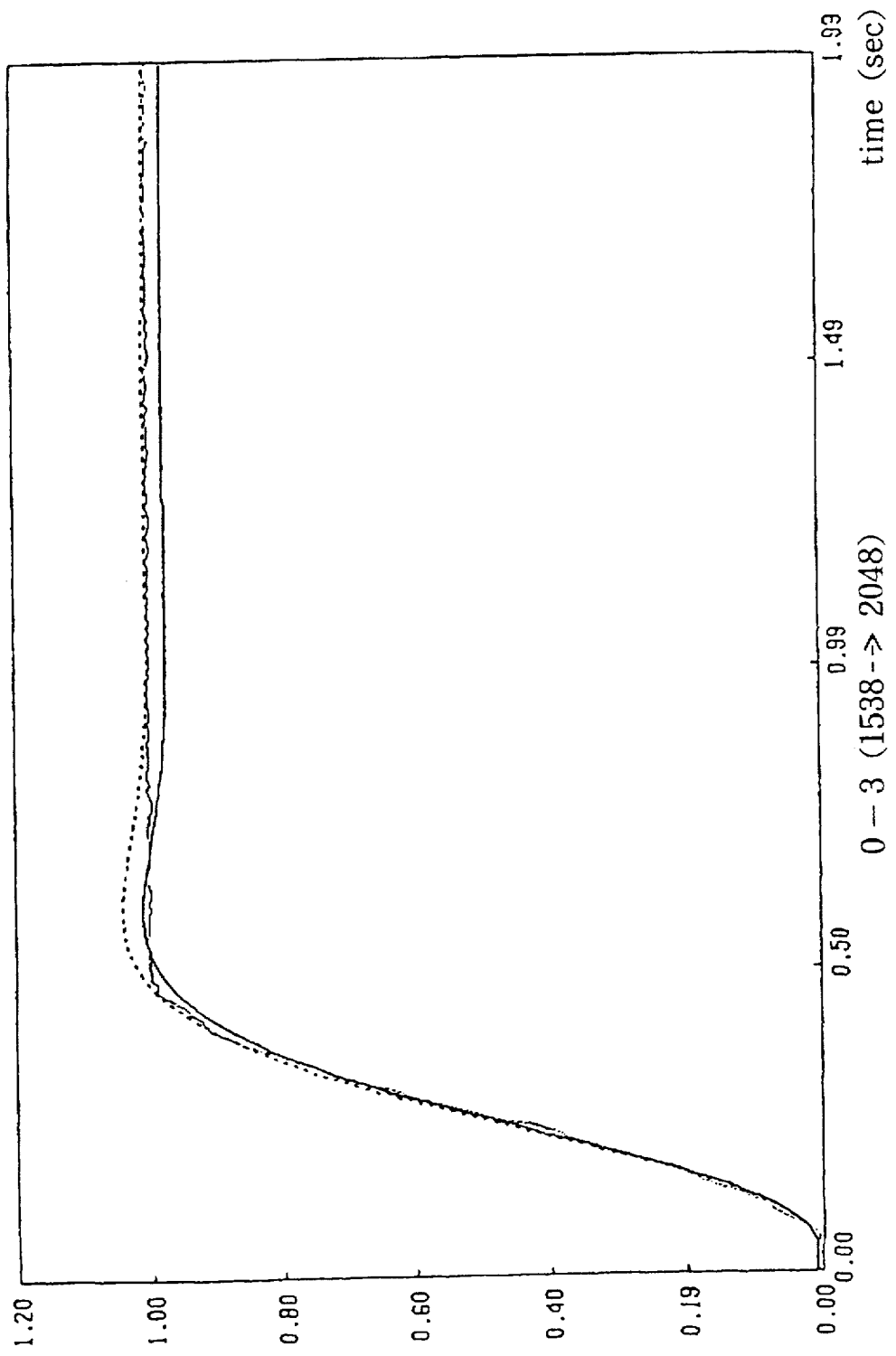
FIG. 46 is a figure showing the observed values of the step response of the horizontal rotation axis, and the characteristic of the model based on the parameters which are defined so that they approximate the observed value.

Therefore, only some points are measured and the relation is obtained based on them. Once the coefficient of the relation is decided, it is possible to have a table where values of all points are calculated beforehand. However, in this example, because the computer has enough calculation speed it is calculated every time. FIG. 43 shows a graph of the measured value of the A/D converter and the location of the projection center. With this lens, the inverse of the location of the projection center can be approximated with the third-order equation of the value of the A/D converter. FIG. 44 shows the relation of the inverse of the location of the projection center and the value of the A/D converter. In it, circles indicate the measured values and the curved line is the line of the third-order equation based on it. Similarly, as for focus, the relation is obtained from the value of the A/D converter and the measured value of the focus of the actual lens. FIG. 45 shows the relation of the inverse of distance and the A/D converter. In this case, the relation can be represented by the first-order equation. The same kind of decision method of parameters are used for servo system. As described before, if the targeted object is near the main point, the precision of tracking targeted object will increase because errors in the optical system affect less. Therefore, it is important to provide appropriate servo systems. Comparing it with the optical system, the servo system is robust for variation. However, it is important to measure parameters in the actual system. Its appearance is shown below. FIG. 46 shows the characteristics of the step response of horizontal rotation axis (thin solid line), and the model where parameters are decided so that they are nearest to the measured value (a thick solid line and a broken line). The transfer function obtained by them is shown in the expression(1). Even if lenses and cameras are partly or completely exchanged for maintenance, it is possible to control optimally by deciding the parameters by measuring the characteristics of the system operated actually.

$$G03 = \frac{0.219564s2 - 22.3778s + 1009.41}{s3 + 23.7241s2 + 228.904s + 1006.42} \quad (1)$$

Next, auto-tracking control is described.

Figure 47:
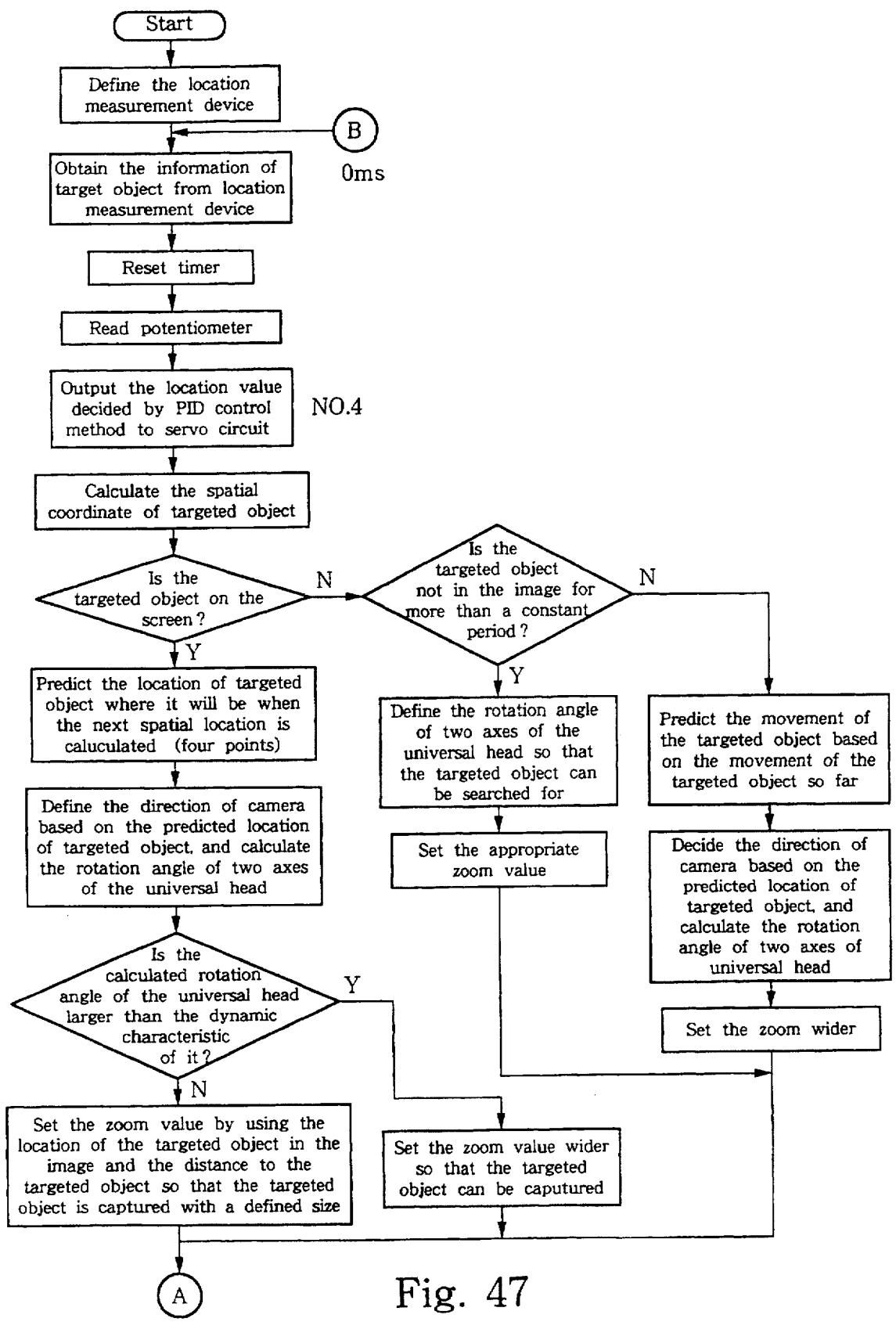
FIG. 47 is a figure showing an example of the flowchart for controlling the camera head.
Figure 48:
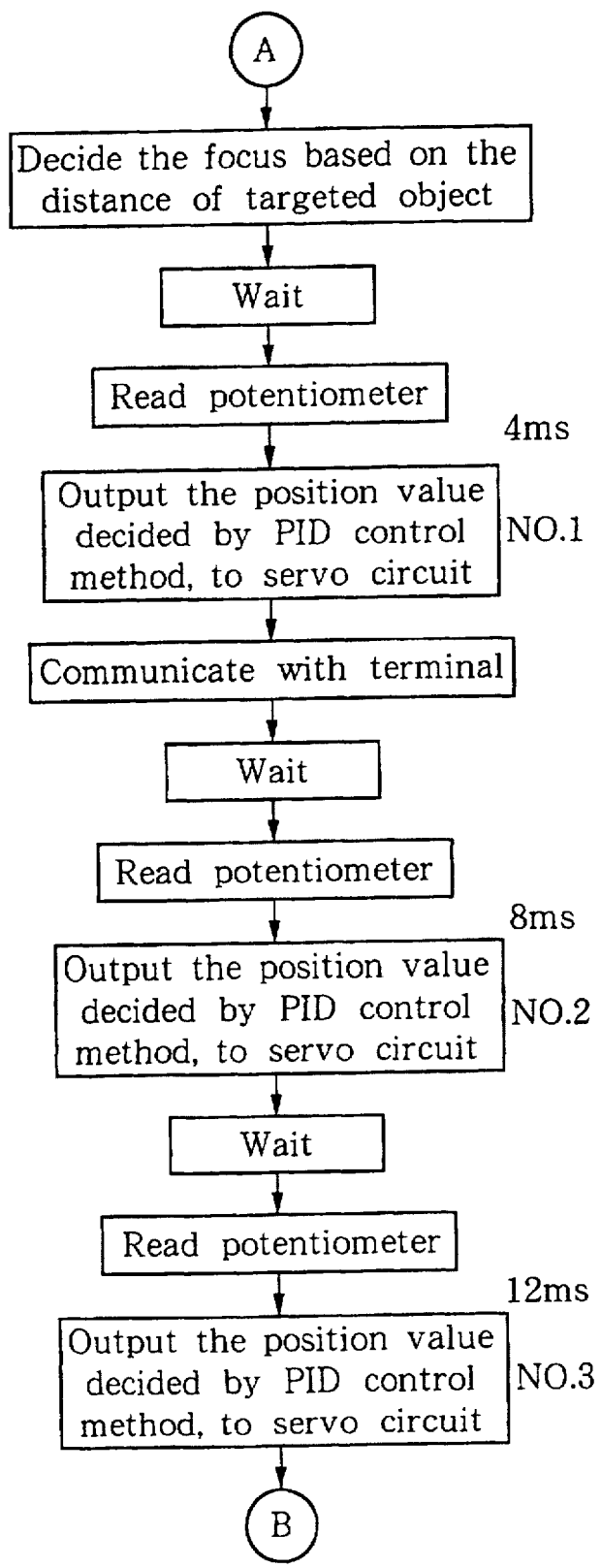
FIG. 48 is a figure showing an example of the flowchart for controlling the camera head.

As described above, field cycle of TV camera is 60 Hz, that is, about 16.7 m sec., therefore, the location of the targeted object is obtained in the interval of 16.7 m sec. However, it is too long for controlling motors, therefore, in this example, by dividing it by 4 equally, it is controlled in the interval of 4 m sec. To be concrete, the value of the potentiometer detecting the rotation angle is read and it sends an order to the motor with PID control based on the difference of that value and the objective value in the interval of 4 m sec. As described above, the objective value is estimated by the data in the interval of 16.7 m sec. Not only the universal head but also zoom of the lens and the focus are controlled for controlling the head. FIG. 47 and FIG. 48 show examples of the flowchart.

After the initial setting and auto-tracking begins, the location of the targeted object is read from the image location measurement device first. The data of the image location measurement device is obtained at the field cycle of TV camera, which is used as the reference for timing (timer reset). On the other hand, the potentiometer of rotating angle is read for controlling motors and orders are sent to the motor after calculating PID control. Here, the last value of the four objective values obtained previously is used as the objective value. The location of the targeted object in the three-dimensional space is calculated from the value of the potentiometer and the information from the image location measurement device. It can be considered that the performance of the universal head can not catch up with the movement of the targeted object, therefore, it is judged whether the targeted object is in the screen or not. If the targeted object is in the screen, four objective values at the interval of 4 m sec. are predicted by the movement of the targeted object. In this example, they are predicted by the first-order extrapolation completion. Four combinations of rotation angle of the universal head are calculated to match the direction of the camera to the objective value. This rotation angle is the objective value for the motor. If the rotation angle of the universal head is obtained, it is possible to judge whether that angle can be achieved in the movement characteristic of the system. If the movement of the targeted object is faster than the characteristic of the system, and it will get out of the screen at that speed, avoid loosing sight by moving the zoom wider and broaden the view.

Otherwise, calculate the position of zoom so that the size of the targeted object does not change, by using the distance of the targeted object and the camera. Also, in the same way, calculate the position of focus to match the distance. In the same way as the universal head, these values are used as the objective values, and the control should be done to match these objectives. Thus the calculation of data of the image is finished and all you should do is to control motors at the interval of 4 m sec.

Above is the case when the targeted object is in the screen, however, if the targeted object can not be seen, do as follows. Two kinds of process can be considered based on the period when the targeted object can not be seen. That is, the case where it is really lost, and the case where it is accidentally lost, e.g. some obstacles are passing in front of the camera in an instant, which cause the lost. The period when the targeted object is invisible can be measured easily in the unit of 16.7 m sec. of the field frequency. If the period is short, predict the location of the targeted object based on the movement of the targeted object so far and control as if the targeted object is there, and moving the zoom a little wider at the same time, and broaden the range of prediction. If the period when it is invisible is long, judge that it is lost, and proceed the process based on the algorithm defined in advance. For example, the processes such as, scanning the range defined in advance and searching for the targeted object automatically, stopping when it is lost, or returning to the origin, can be considered. Actual calculation speed is 2~3 m sec. when micro computers are used in the system where floating co-processors are used. Therefore, in the process of the unit of 4 m sec. in a field, three of them do nothing and just waiting as time passes for this process. If a certain process is known that it can be finished within 4 m sec., it can be done during that period. In this example, communication processes for sending three-dimensional information to outside are done.

In the above examples, image data are captured by using the auto-tracking camera head, however, it is difficult to extract from the background for some targeted objects. For such targeted objects, the precision can become lower by the effect of the noise if auto-tracking is used. Therefore, by using the same kind of the head, a human can track the targeted object.

However, when a human track the targeted object, in most cases, it is tracked by using information of other than monitors, such as the movement by looking directly and the surroundings, and judging totally. Therefore, it is possible to increase the tracking ability by operating the camera directly by a human who is actually on the camera's location, not operating remotely. Therefore, by using the camera which is suitable for a human to operate, angle sensors should be attached on the rotation axes of the camera and the lens. In such cases, it is impossible to detect the location of the targeted object in the image, therefore it is impossible to calculate the precise three-dimensional location of the targeted object. However, it is possible to calculate the field of view of the camera in the three-dimensional space based on the direction of the camera and the angle of view. Also, normally it is considered that the targeted object is captured so that it is near the center of the field of view, therefore, it is possible to calculate the center coordinate of the field of view and control the focus automatically.

Thus, it is possible to:

(1) enhance the measurement precision of moving objects;

(2) obtain the parameters for obtaining the three-dimensional spatial location coordinate of the moving object, which are different for each camera device;

(3) control the auto-tracking of the camera head precisely and smoothly; and (4) extract the targeted moving objects' from the background correctly.

We claim:

1. A moving object measurement device comprising:

first capturing means which captures an image of the moving object;

driving means to define a capturing direction and a capturing range of the capturing means;

image processing means to calculate a location of the moving object in an image included in the image signal obtained by the capturing means;

location calculation means which calculates coordinates of the moving object in real space based on location information on the location obtained by the image processing means and the capturing direction and the capturing range of the capturing means responsive to obtaining the image signal;

three-dimensional area setting means to set an area where the moving object can move in a three-dimensional real spatial coordinate system;

area mapping means to map the area in the three-dimensional real spatial coordinate system to a two-dimensional area corresponding to the capturing direction and the capturing range of the capturing means; and two-dimensional area setting means to provide the two-dimensional area to the image processing means, wherein the image processing means includes area limiting means to limit a calculation of the location of the moving object to the two-dimensional area set by the two-dimensional area setting means.

2. A moving object measuring device according to claim 1, further comprising three-dimensional vector setting means to define a moving velocity vector of the moving object in the three-dimensional real special coordinate system;

vector mapping means to map the moving velocity vector in the three-dimensional real spatial coordinate system to a two-dimensional moving velocity vector corresponding to the capturing direction and the capturing range of the capturing means;

vector setting means to set the two-dimensional moving velocity vector for each corresponding capturing means, wherein the image processing device further includes means to detect a change of the location of the moving object between a current screen and a screen that is pre-defined steps before in the two-dimensional area limited by the above area limiting means; and means to start the location calculation means if a detected change of location is within the capturing range defined in advance for the two-dimensional moving velocity vector set by the vector setting means.

3. A moving object measurement device according to claims 1 and 2, wherein the above capturing means includes a universal head adapted to rotate about at least one axis and a capturing device fixed on the universal head, and the driving means includes angle setting means to set the rotation angle around each axis of the above universal head and a zoom lens means attached to the capturing device.

4. A moving object measurement device according to claim 3, wherein the angle setting means includes, for at least one axis, a motor to rotate the above universal head, an angle encoder to detect the actual rotation angle, angle control means to control the motor to reduce the difference of a detected angle and an objective azimuth angle set by the angle setting means, and the zoom lens means includes a zoom driving motor to set the zooming position, a zoom encoder to detect the actual zooming position, and zooming control means to control the zooming drive motor to reduce a difference of a detected zooming position and an objective position set by the driving means, and the output of the angle encoder and the output of the zooming encoder are supplied to the location calculation means as the location information on the capturing direction and the capturing range of the capturing means.

5. A moving object measurement device according to claim 1 further comprising motion data setting means to determine motion data predicted for the moving object in the three-dimensional real spatial coordinate system, and drive control means to control the driving means based on the motion data.

6. A moving object measurement device according to claim 5, wherein the motion data setting means includes vector setting means to define a moving velocity vector that the moving object can have, and the drive control means includes vector mapping means to map the moving velocity vector to the two-dimensional moving velocity vector corresponding to the capturing range of the above capturing means, and drive limiting means to control the driving means to prevent the direction of the capturing means from changing velocity more than the mapped two-dimensional moving velocity vector.

7. A moving object measurement device according to claim 1 further comprising a drive control means to control at least the capturing direction or the capturing range of the above capturing means by the above driving means based on the location in the image obtained by the above image processing means.

8. A moving object measurement device according to claim 7, wherein the above image processing means includes means to calculate weighted averages of locations in the image of multiple moving objects.

9. A moving object measurement device according to claim 1 further comprising drive control means to control setting of at least the capturing direction and the capturing range of the above capturing means with the above driving means based on a coordinate in real space obtained by the location calculation device.

10. A moving object measurement device according to claim 9 further comprising vector setting means to set a moving velocity vector that the moving object can have, wherein the driving control means includes vector mapping means to map the moving velocity vector to the two-dimensional moving velocity vector corresponding to the capturing range of the above capturing means, drive limiting means to control the driving means to prevent the direction of the capturing means from changing in the velocity more than the mapped two-dimensional moving velocity vector.

11. A moving object measurement device according to claim 1 further comprising recording means to record motion data measured with the image measuring means, and means to detect that the moving object moves out of the capturing range of the capturing means, wherein the above drive control means includes means to control the capturing means based on past motion data recorded in the recording means.

12. A moving object measurement device according to claim 11, wherein the means to control the capturing means includes means to predict a moving direction of the moving object based on the past motion data.

13. A moving object measurement device according to claim 11, wherein the means to control the capturing means includes means to control the capturing direction of the capturing means so that the capturing directions becomes a direction defined in advance.

14. A moving object measurement device according to claims 1 and 13, further comprising means to set shape and a motion data of the moving object in the three-dimensional real spatial coordinate system, means to map the shape and the motion data in the three-dimensional real spatial coordinate system to the two-dimensional area data corresponding to the capturing range of the capturing means, and means to overlap the mapped shape and motion data with the image signal output by the capturing means.

15. A moving object measurement device according to claim 1 further comprising a plurality of capturing means, the image processing means, and the motion data calculation devices, and also includes precision estimation means to estimate a measurement precision of the motion data obtained by the motion data calculation means in the three-dimensional real space coordinate system-based on a location of the above capturing means, a precision mapping means to map the measurement precision in the three-dimensional real spatial coordinate system to the two-dimensional area data corresponding to each capturing area of the capturing means, and means to overlap the precision information based on the mapped measurement precision with a image signal output by the capturing means.

16. A moving object measurement device according to claims 1 and 15 further compromising a plurality of capturing means, each of which captures the moving object, and a plurality of driving means to set a capturing area of the multiple capturing means individually, and also includes means to overlap information on the capturing area of other capturing means with at least one output image signal of the first capturing means.

17. A moving object measurement device according to claim 16, wherein the overlapping means includes means to obtain a mutual relation of the capturing area of the plurality of capturing means by capturing setting value by the driving means, means to distribute the mutual relation corresponding to each capturing means, and processing means to process an image output by a corresponding capturing means based on the mutual relation distributed by the distribution means.

18. A moving object measurement device according to claim 1 further comprising multiple image processing means, wherein each of the image processing means has a different threshold value to separate the moving object from a background and provide means to select credible location data from data output by the multiple image processing means.

19. A moving object measurement device according to claim 1 further comprising multiple image processing means, wherein each of the multiple image processing means has a different valid range which can detect the moving object, and means to select credible location data from data output by the multiple image processing means.

20. A moving object measurement device according to claim 1 further comprising a plurality of the capturing means and a plurality of the image processing means, wherein each of the image processing means has a different valid range which can detect the moving object, and means to select credible location data from the data outputted by the multiple image processing means.

21. A moving object measurement device according to claim 1, wherein the image processing means includes means to calculate an area of the moving object in a screen included in the image signal obtained by the capturing means, and means to judge the credibility of the location obtained by the image processing means by the change of the area obtained by the image processing means.

22. A moving object measurement device according to claims 1 and 21, wherein the location calculation means sets a projection center of a camera lens of the capturing means, and includes means to transform a subject of the moving object captured with a symmetry point on this projection center, to a location on a projection plane which is on the symmetry point of a surface of the capturing device, and setting a vector from the projection center to the subject of the image transformed by the transformation means, means to calculate a distance between the vector and constraint plane on which the moving object exists, and the three-dimensional spatial coordinate of the targeted object based on a rotation angle of the above camera.

23. A moving object measurement device according to claims 1 and 21, wherein the location calculation means includes a means to define transformation variables required for calculating a location of a projection center in the image, which is a center location of a lens included in the capturing means and the three-dimensional spatial coordinate of the moving object, and calculates a spatial location coordinate by capturing a reference point, which is fixed on a constraint plane and has a known spatial location coordinate, and means to calculate the projection center and transformation variables by capturing a reference point again while changing the projection center of the camera and the transformation variables gradually based on the calculation result.

24. A moving object measurement device according to claims 1 and 21, further comprising means to operate the driving means of the capturing means for multiple operation points and to obtain a value to drive the driving means as an electric signal, wherein the location calculation means includes means to obtain a relation of the electric signal for the multiple operation points and the location of a projection center of a lens including in a camera in the capturing means, and to calculate a three-dimensional spatial coordinate of the moving object by obtaining relation of a location of the projection center and a value to drive the driving means based on the relation of the multiple operation points.

25. A moving object measurement device according to claim 1, further comprising movement prediction means to predict a moving direction of the moving object based on the real spatial coordinate of the moving object obtained by the location calculation means, and drive control means to control the driving means using a prediction result of the movement prediction means, wherein the movement prediction means includes means to predict the location of the moving object for multiple times at an interval shorter than the location calculation of the location calculation means, and the drive control means includes means to send a control objective value to the driving means based on the predicted location of the moving objects at the interval shorter than the location calculation of the location calculation means.

26. A moving object measurement device according to claims 1 and 25, wherein the capturing means includes color camera and the image processing means includes a color extraction means to separate the moving object from a background using colors from the captured images.

27. A moving image measurement device according to claim 1, further comprising movement prediction means to predict a moving direction of the moving object based on the real spatial coordinate of the moving object obtained by the location calculation means, and drive control means to control the driving means based on a result of a prediction of movement by the prediction means, wherein the drive control means includes means to obtain one of illumination distribution information and white balance distribution information in the capturing range of the capturing means in advance and to adjust one of a diaphragm and a white balance of a camera included in the capturing means by controlling the driving means based on one of the illumination distribution and white balance information.

28. A moving object measurement device according to claim 4 further comprising motion data setting means to determine motion data predicted for the moving object in the three-dimensional real spatial coordinate system, and drive control means to control the driving means based on the motion data.

29. A moving object measurement device according to claim 4 further comprising a drive control means to control at least the capturing direction or the capturing range of the above capturing means by the above driving means based on the location in the image obtained by the above image processing means.

30. A moving object measurement device according to claim 4 further comprising drive control means to control setting of at least the capturing direction and the capturing range of the above capturing means with the above driving means based on a coordinate in real space obtained by the location calculation device.

31. A moving object measurement according to claim 4 further comprising recording means to record motion data measured with the image measuring means, and means to detect that the moving object moves out of the capturing range of the capturing means, wherein the above drive control means includes means to control the capturing means based on past motion data recorded in the recording means.

32. A moving object measurement device according to claim 14 further comprising a plurality of capturing means, the image processing means, and the motion data calculation devices, and also includes precision estimation means to estimate a measurement precision of the motion data obtained by the motion data calculation means in the three-dimensional real space coordinate system-based on a location of the above capturing means, a precision mapping means to map the measurement precision in the three-dimensional real spatial coordinate system to the two-dimensional area data corresponding to each capturing area of the capturing means, and means to overlap the precision information based on the mapped measurement precision with a image signal output by the capturing means.

33. A moving object measurement device according to claim 15 further compromising a plurality of capturing means, each of which captures the moving object, and a plurality of driving means to set a capturing area of the multiple capturing means individually, and also includes means to overlap information on the capturing area of other capturing means with at least one output image signal of the first capturing means.

34. A moving object measurement device according to claim 17, wherein the overlapping means includes means to obtain a mutual relation of the capturing area of the plurality of capturing means by capturing setting value by the driving means, means to distribute the mutual relation corresponding to each capturing means, and processing means to process an image output by a corresponding capturing means based on the mutual relation distributed by the distribution means.

35. A moving object measurement device according to claim 17, further comprising a plurality of the capturing means and the image processing means, wherein each of the image processing means has a different valid range which can detect the moving object, and means to select credible location data from the data outputted by the above multiple image processing means.

36. A moving object measurement device according to claim 17, wherein the image processing means includes means to calculate an area of the moving object in a screen included in the image signal obtained by the capturing means, and means to judge the credibility of the location obtained by the image processing means by the change of the area obtained by the image processing means.

37. A moving object measurement device according to claim 24, further comprising movement prediction means to predict a moving direction of the moving object based on the real spatial coordinate of the moving object obtained by the location calculation means, and drive control means to control the driving means using a prediction result of the movement prediction means, wherein the movement prediction means includes means to predict the location of the moving object for multiple times at the interval shorter than the location calculation of the location calculation means, and the drive control means includes means to send a control objective value to the driving means based on the predicted location of the moving objects at the interval shorter than the location calculation of the location calculation means.

38. A moving image measurement device according to claim 1 further comprising movement prediction means to predict a moving direction of the moving object based on the real spatial coordinate of the moving object obtained by the location calculation means, and drive control means to control the driving means based on a result of a prediction of movement by the prediction means, wherein the drive control means includes means to obtain one of illumination distribution information and white balance distribution information in the capturing range of the capturing means in advance and to adjust one of a diaphragm and a white balance of a camera included in the capturing means by controlling the driving means based on one of the illumination distribution and white balance information.

* * * * *